United States Patent [19]
Levie et al.

[11] Patent Number: 6,065,679
[45] Date of Patent: *May 23, 2000

[54] MODULAR TRANSACTION TERMINAL

[75] Inventors: Stephen Alan Levie, Burnsville; Bradley Dale Brown, Minnetonka; Gregory John Loxtercamp, Minneapolis; Michael E. Hermansen, Shorewood; Emmett E. O'Hare; Ahmad Ghanbarzadeh, both of Eden Prairie, all of Minn.

[73] Assignee: IVI Checkmate Inc.

[*] Notice: This patent issued on a continued prosecution application filed under 37 CFR 1.53(d), and is subject to the twenty year patent term provisions of 35 U.S.C. 154(a)(2).

[21] Appl. No.: 08/706,506

[22] Filed: Sep. 6, 1996

[51] Int. Cl.$^7$ ...................................................... G06K 7/10
[52] U.S. Cl. .................. 235/462.47; 235/472.01
[58] Field of Search ...................... 235/449, 472, 235/472.01, 462.47

[56] References Cited

U.S. PATENT DOCUMENTS

| | | |
|---|---|---|
| D. 330,722 | 11/1992 | Je . |
| 4,454,414 | 6/1984 | Benton . |
| 4,689,478 | 8/1987 | Hale et al. . |
| 4,773,032 | 9/1988 | Uehara et al. ...................... 364/709.04 |
| 4,855,996 | 8/1989 | Douskalis .................................. 370/545 |
| 4,912,309 | 3/1990 | Danielson et al. . |
| 4,916,692 | 4/1990 | Clarke et al. ............................ 370/451 |
| 5,043,721 | 8/1991 | May .................................... 340/825.44 |
| 5,047,615 | 9/1991 | Fukumoto ................................ 235/472 |
| 5,227,614 | 7/1993 | Danielson et al. ...................... 235/380 |
| 5,233,167 | 8/1993 | Markman et al. . |
| 5,266,789 | 11/1993 | Anglin et al. . |
| 5,331,136 | 7/1994 | Koenck et al. . |
| 5,331,544 | 7/1994 | Lu et al. . |
| 5,371,348 | 12/1994 | Kumar et al. ....................... 235/472.01 |
| 5,386,106 | 1/1995 | Kumar ..................................... 235/472 |
| 5,420,605 | 5/1995 | Vouri et al. . |
| 5,488,558 | 1/1996 | Ohki . |
| 5,566,069 | 10/1996 | Clark, Jr. et al. ....................... 364/420 |
| 5,680,633 | 10/1997 | Koenck et al. .......................... 235/472 |

*Primary Examiner*—Donald Hajec
*Assistant Examiner*—Mark Tremblay
*Attorney, Agent, or Firm*—Nixon & Vanderhye P.C.

[57] ABSTRACT

A modular terminal apparatus including a core unit interchangeable with a plurality of communication modules.

31 Claims, 16 Drawing Sheets

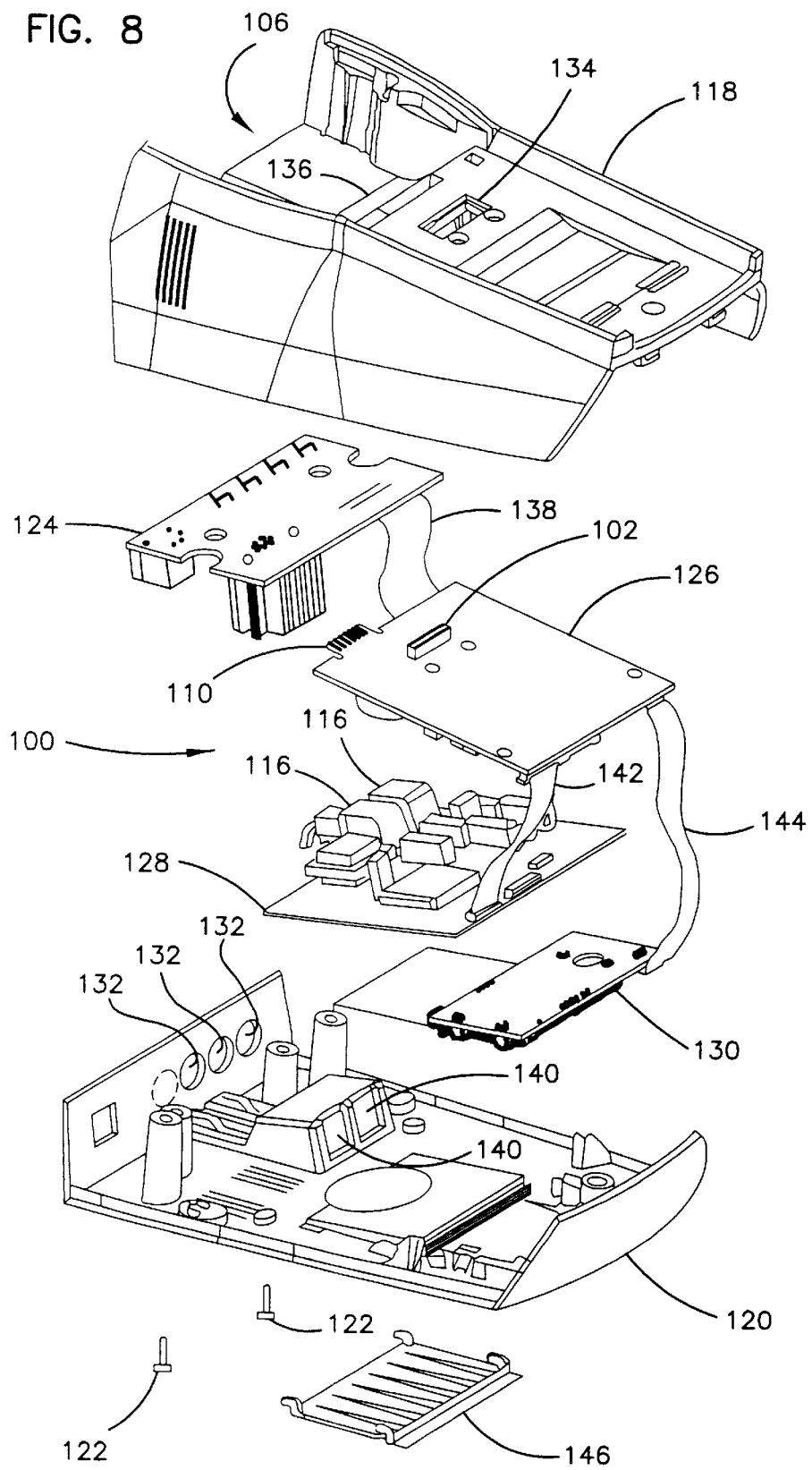

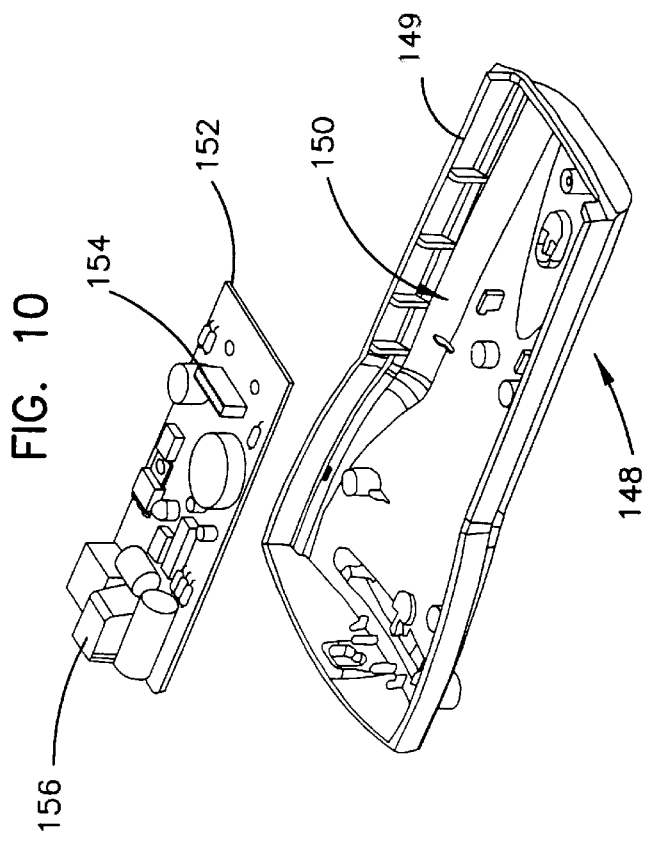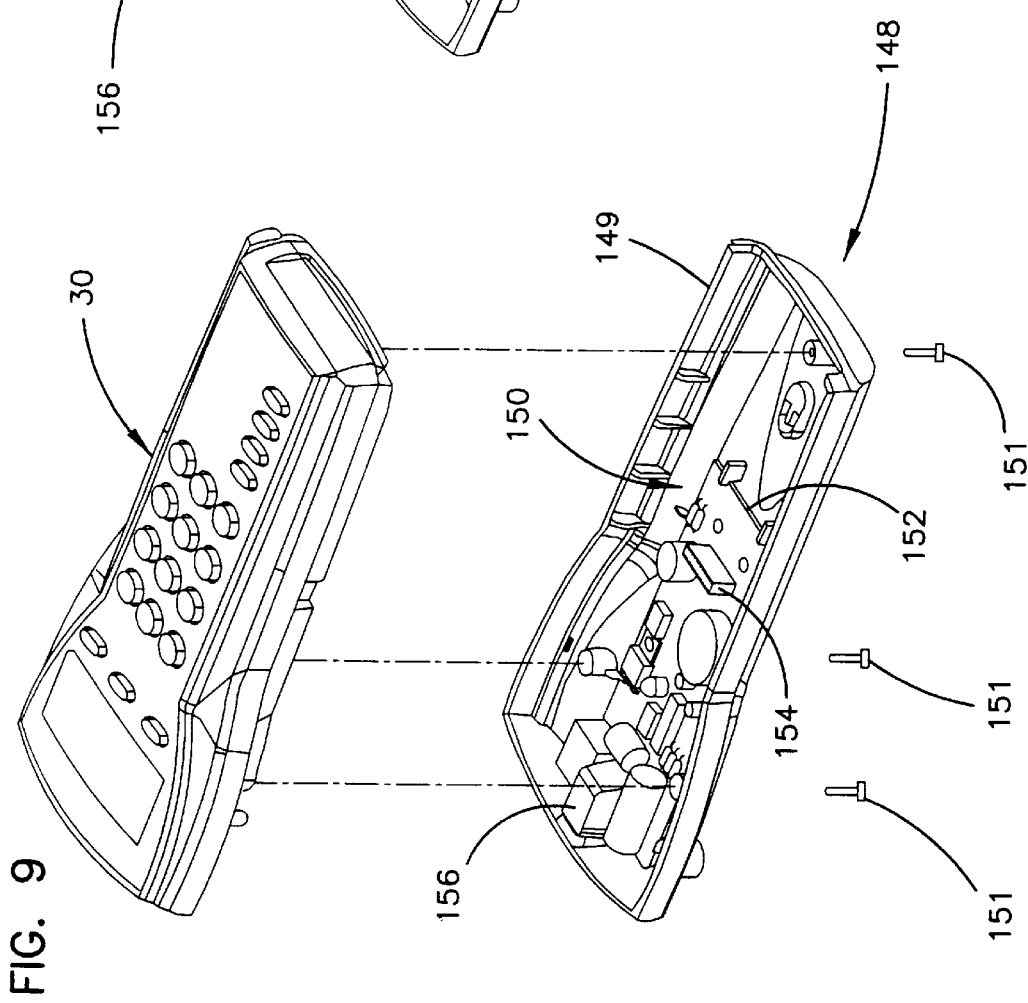

MODULAR TRANSACTION TERMINAL

FIELD OF THE INVENTION

The present invention relates generally to a transaction terminal apparatus and method. More particularly, the present invention relates to a modular transactional terminal such as a modular point-of-sale terminal.

BACKGROUND OF THE INVENTION

Terminals such as point-of-sale terminals have many applications. One of the most common is in retail transactions. Frequently upgrades to the software and/or hardware are made. Moreover, merchants have different functional configuration needs. Various approaches have been used to provide for upgrades to the software/hardware and reconfiguration of terminals. However, this typically is a time consuming process and often requires the purchase of new and different hardware and software.

There is a need for a modular point-of-sale terminal which readily allows upgrades to be made and the terminal to be readily reconfigured with different functional capabilities. The present invention solves these problems and other problems associated with existing point-of-sale terminals.

SUMMARY OF THE INVENTION

The present invention relates to a modular terminal apparatus and method.

One embodiment of the invention relates to a terminal apparatus, comprising:
 a core unit including;
 a processor and associated memory,
 a keypad for inputting data, and
 a display operatively interconnected to the processor for displaying data;
 a communications module attachable to a bottom surface of the core unit; and
 the core unit and the communications module being interconnected by an electrical bus enabling control of the communications module by the processor of the core unit, the core unit being interchangeable with various communications modules.

In one embodiment, the communication module includes a modem apparatus, the modem apparatus enabling communication with a remote host.

In yet another embodiment, the communication module includes a network interface communication board enabling a plurality of the core units and their associated communication modules to be interconnected in a local area network arrangement. In one embodiment, at least one of the plurality of communication modules interconnected in the local area network arrangement includes a modem apparatus, the modem apparatus enabling communication with a remote host.

In one embodiment, the communication module includes a removable integral printer whereby information can be printed, the integral printer being electrically interconnected to the processor of the core unit by the electrical bus.

In one embodiment, the communication module includes an electrical connection for interconnection to an electronic cash register.

In one embodiment, the communication module is electrically interconnected to a battery pack.

In still another embodiment, the core unit includes a magnetic stripe reader and in yet another embodiment the core unit includes a smart card reader.

In one embodiment, the core unit attaches a PIN pad module for entry of a user's PIN during a transaction.

In yet another embodiment, the core unit includes a first electrical bus connector projecting from its bottom surface and the PINpad and communication module includes a second electrical bus connector projecting from its top surface, the first and second electrical bus connectors mechanically and electrically connecting to one another to provide an electrical bus from the processor of the core unit to electrical components in the communication module, the core unit and communication module being attached to one another by removable fasteners.

Yet another embodiment of the present invention relates to a POS modular terminal apparatus, comprising:
 a core unit including;
 a processor and associated memory,
 a key pad disposed on a top surface of the core unit for entry of a user's PIN during a transaction,
 a display displaying information,
 a magstripe reader for reading an encoded magstripe on a card, the magstripe reader being disposed proximate one side of the core unit,
 a smart card reader for reading smart cards, the smart card reader being disposed proximate a front end of the terminal, and
 a bottom surface including an electrical bus connector projecting therefrom; and
 a communication module including a top surface having an electrical bus connector projecting therefrom and electrically interconnectable to the electrical bus connector of the core unit so as to create an electrical bus between the core unit and the communication module, the communication module including communication control circuitry for interfacing with the processor of the core unit by way of the electrical bus, the communication control circuitry being electrically connected to electrical components in the communication module so as to allow control thereover by the processor of the core unit, the communication module being interchangeably connected to the bottom surface of the core unit by fasteners whereby the core unit may be interchangeably connected to different communication modules, the communication module providing power to the core unit, the communication module including electrical connectors for interconnection to an electronic cash register.

In one embodiment time division multiplexing (TDM) communication protocol is used to communicate between the processor of the core unit and the communication circuitry of the communication module.

Another embodiment of the present invention relates to a terminal apparatus, comprising:
 a processor and associated memory;
 a keypad, operatively coupled to the processor, for inputting data to the associated memory;
 a display, operatively coupled to the processor, for displaying data;
 a communications module; and
 a time division multiplex (TDM) bus operatively coupled between the processor and communications module to enable control of the communications module by the processor, the TDM bus having at least two different data transfer rate channels multiplexed together in a frame.

Another embodiment of the present invention relates to a terminal apparatus, comprising:

a display for displaying data;

a keypad for inputting data; and a processor and associated memory, operatively coupled to the display and keypad, for processing application program functions in accordance with an operating system display driver which allows a first application program to exclusively control displayed elements within a first portion of the display and a second application program to exclusively control displayed elements within a second portion of the display.

These and various other advantages and features of novelty which characterize the invention are pointed out with particularity in the claims annexed hereto and forming a part hereof. However, for a better understanding of the invention, its advantages, and the objects obtained by its use, reference should be made to the accompanying drawings and descriptive matter, which form a further part hereof, and in which there is illustrated and described a preferred embodiment of the invention.

BRIEF DESCRIPTION OF THE DRAWINGS

In the drawings wherein corresponding reference numerals generally indicate corresponding parts throughout the several views;

FIG. 8 is an exploded view illustrating the inner components of the communications module of FIG. 4;

FIG. 9 is an exploded view of the core unit and a PIN pad module configured to interface with the core unit;

FIG. 10 is an exploded view of the PIN pad module of FIG. 9;

DETAILED DESCRIPTION OF PREFERRED EMBODIMENT(S)

Referring now to the figures, there is illustrated a preferred embodiment of a modular transaction terminal/apparatus in accordance with the principles of the present invention. For the purposes of illustration, the modular terminal is described throughout the specification in a point-of-sale environment and is often referred to as a point-of sale terminal. However, it will be appreciated that the present invention is not limited to the point-of-sale environment and can be utilized to conduct a variety of alternative electronic transactions within a wide range of fields.

As shown in FIGS. 1–10, the present invention relates generally to a modular point-of-sale system having both smart card and magnetic stripe capabilities. The system includes a core unit that is capable of interfacing with a variety of modular components. Preferably, the core unit does not have any connectivity capabilities other than connecting to the modular components. Exemplary modular components include printer modules, local area network (LAN), modem modules, workstation communication modules and PIN pad modules. The modular nature of the system allows the system to be configured and customized to meet the needs of any user.

Figure 1:
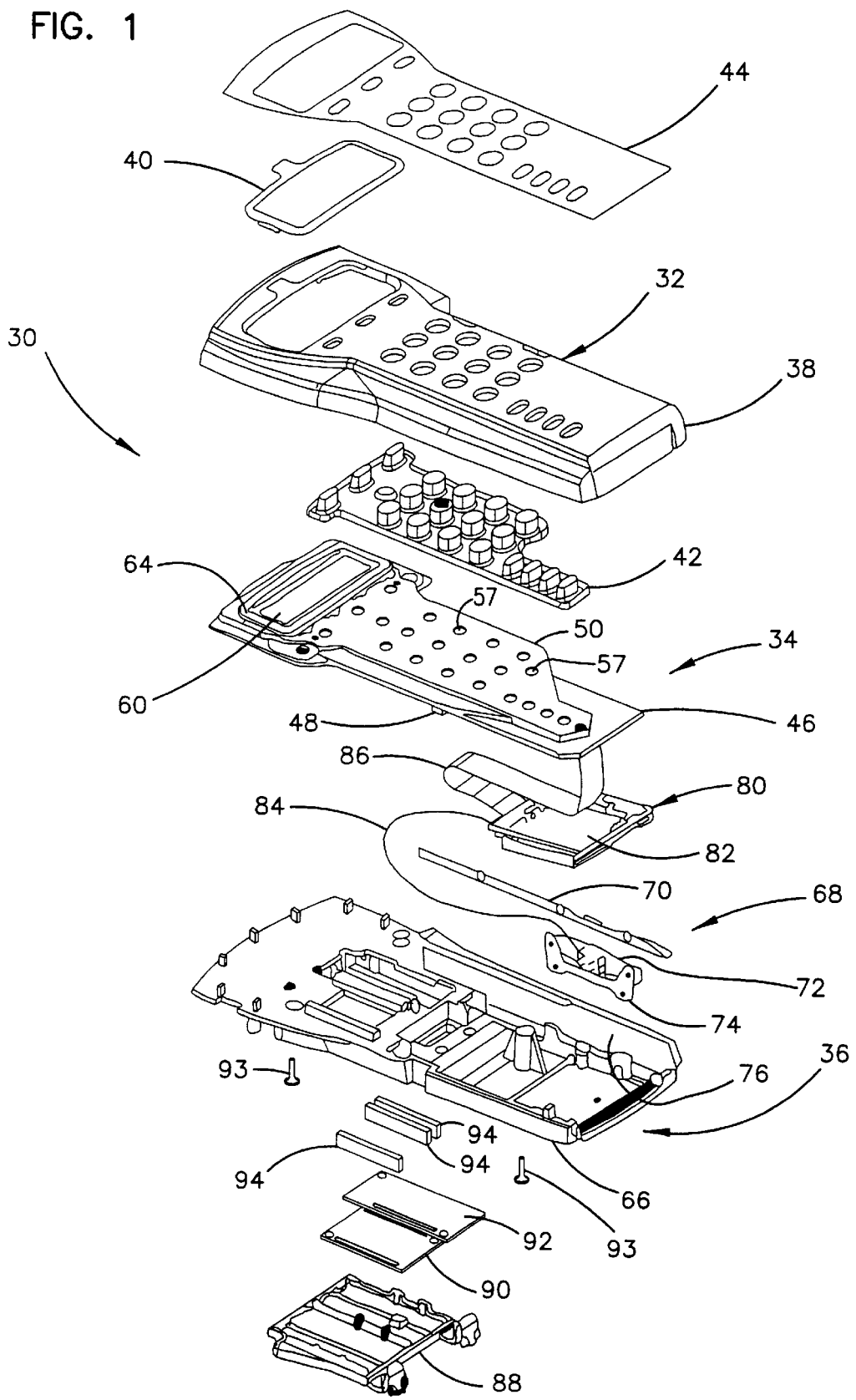
FIG. 1 is an exploded perspective view in of a preferred embodiment of a modular point-of-sale terminal apparatus in accordance with the principles of the present invention, the embodiment shown including a core unit.

FIG. 1 shows an exploded view of an exemplary core unit 30 constructed in accordance with the principles of the present invention. Generally, the core unit 30 can be divided into three sub-assemblies which include a core top cover assembly 32, a core printed circuit board (PCB) assembly 34 and a core bottom cover assembly 36.

As shown in FIG. 1, the core top cover assembly 32 includes a top cover 38 preferably constructed of a plastic material. The top cover 38 includes a rectangular screen opening positioned above a plurality of key openings. A transparent display window 40 is mounted over the screen opening of the top cover 38 while a key pad 42 is mounted within the top cover 38. The key pad 42 is positioned such that keys of the key pad 42 project through the key openings of the top cover 38. The core top cover assembly 32 also includes an overlay 44 affixed to the top surface of the top cover 38. The overlay 44 typically includes defining key functions and other related user information.

Figure 2:
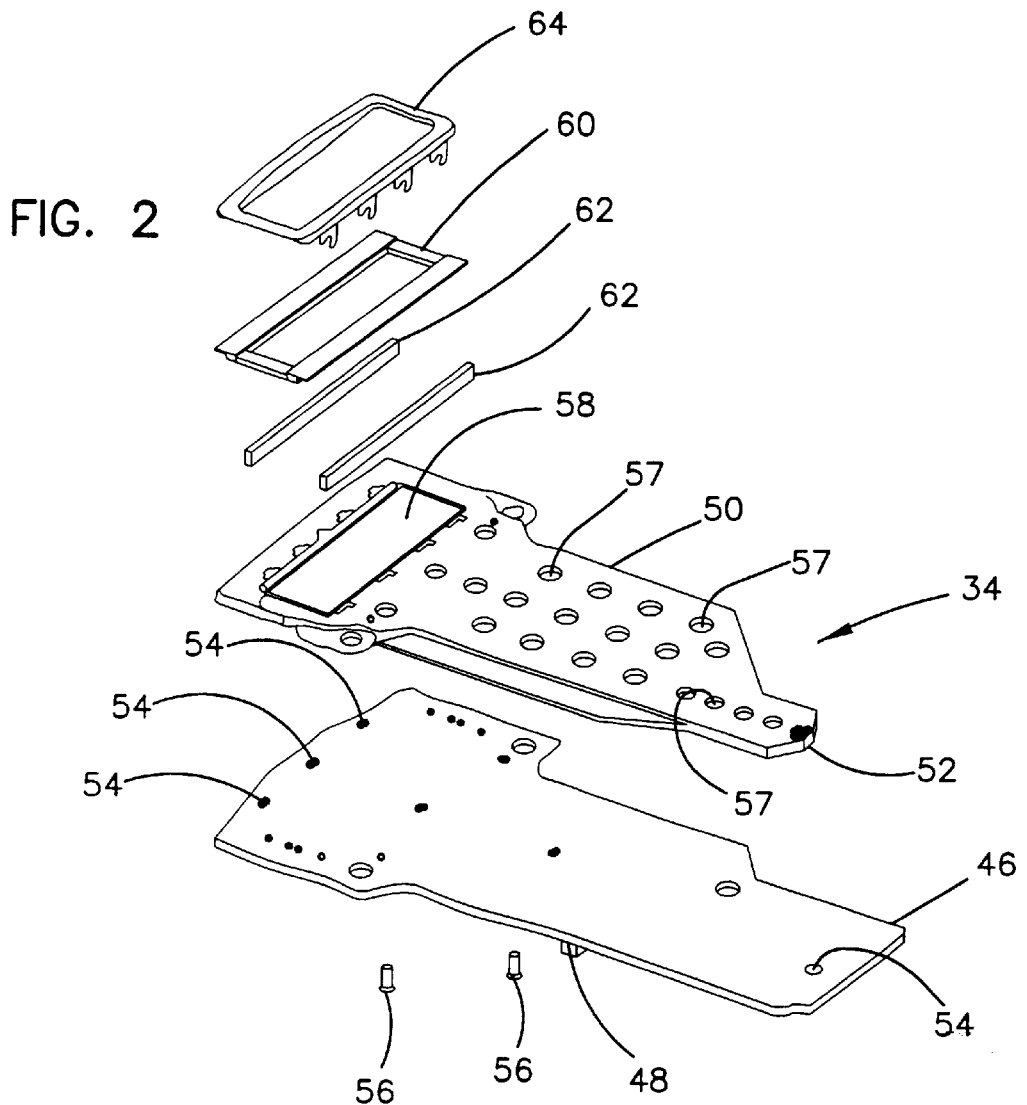
FIG. 2 is an exploded view of a display assembly incorporated within the core unit of FIG. 1.

As shown in FIGS. 1 and 2, the core PCB assembly 34 includes a core PCB 46 having a suitable bus structure, a memory, and a processor which controls the operation of the core unit 30. The core PCB 46 includes contacts for receiving input data from the keys of the key pad 42. The PCB 46 further includes an interface connector 48, such as a male 20 PIN electrical connector, for allowing the core unit 30 to interface with an exterior modular component. Additionally, the core PCB interconnects with a speaker (not shown) for generating an audio output.

The core PCB assembly 34 also includes a light pipe 50 affixed to the top side of the printed circuit board 46. The light pipe 50 is preferably aligned upon the PCB 46 by a plurality of tabs 52 that snap within a plurality of corresponding holes 54 in the PCB 46. The light pipe 50 and the PCB 46 are securely connected by a pair of screws 56.

It will be appreciated that the light pipe 50 of the core PCB assembly 34 defines a plurality of openings 57 for allowing the keys of the key pad 42 to reciprocally engage the key contacts of PCB 46. The light pipe 50 also defines a rectangular liquid crystal display (LCD) cavity 58 positioned above the openings 57. A glass LCD 60 is mounted in the cavity 58. A pair of zebra connectors 62 are mounted on opposite sides of the cavity 58 between the light pipe 50 and the LCD 60. A plastic bezel 64 fits over the LCD 60. The bezel 64 and the light pipe 50 are preferably interconnected via a snap fit connection such that the LCD 60 and the zebra strip connectors 62 are securely retained in the cavity 58.

The core bottom cover assembly 36 includes a bottom cover 66 preferably constructed of plastic and configured to mate with the top cover 38 of the core top cover assembly 32. A swipe style magnetic stripe reader (MSR) 68 is mounted within the bottom cover 66. The MSR 68 includes a MSR track 70 and a MSR head assembly 72. The MSR track 70 preferably extends longitudinally along the length of the bottom cover 66 and preferably is positioned adjacent one side of the bottom cover 66. The track 70 is preferably constructed of metal and functions to protect the casing from excessive wear generated by the repeated swiping of magnetic cards through the MSR 68. As shown in FIG. 1, the track 70 is positioned adjacent to a right side of the bottom cover 66.

Figure 3:
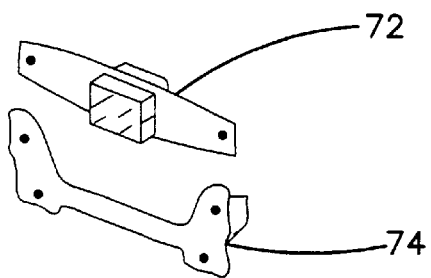
FIG. 3 is an exploded view of a magnetic stripe reader incorporated within the core unit of FIG. 1.

The MSR head assembly 72 is preferably mounted within the bottom cover 66 by a bracket member 74 (shown in FIGS. 1 and 3). It is preferred for the head assembly 72 to be mounted above the track 70 at a location offset from a inner side wall 76 of the bottom casing 66. In use, a magnetic card is slid along the track 70 and between the head assembly 72, and the side wall 76 thereby enabling the head assembly 72 to read the magnetic strip of the magnetic card.

The core bottom cover assembly 36 also includes a smart card reader (SCR) assembly 80 mounted within the bottom cover 66. It will be appreciated that the SCR assembly is configured to read smart cards, also known as integrated circuit cards. The SCR assembly 80 includes a SCR PCB 82 snapped within the bottom cover 66. The MSR head assembly 72 is preferably connected to the SCR PCB 82 via connector 84 while the SCR PCB 82 is preferably connected to the core PCB 48 via a flex ribbon cable 86.

The bottom cover assembly 36 can also optionally include a bottom door 88 for accessing an optional memory PCB 90 and an optional security PCB 92. The optional memory and security PCB's are preferably connected to the core PCB 48 via zebra strip connectors 94. The bottom door 88 and zebra strips 94 allow the PCB's 90 and 92 to be readily interchanged with alternate memory and security PCB's. In this manner, the level of memory and security provided by the core unit 30 can be tailored to a specific user 75 need without requiring replacement of the core PCB 48.

To assemble the core unit 30, the top and bottom covers 38 and 66 are interconnected by screws 93 such that the core PCB assembly 34 is captured between the covers 38 and 66. As assembled, the interface connector 48 of the PCB 46 projects through an opening in the bottom cover 66 such that the core unit can be readily interconnected with a variety of modular accessories. Also, the top and bottom covers 38 and 66 cooperate to define a longitudinal slot 96 for receiving magnetic cards into the MSR 68 and a transverse slot 98 for receiving smart cards into the SCR assembly 80. In the assembled embodiment shown FIG. 4, the longitudinal slot 96 extends along the right side of the core unit 30 while the transverse slot 98 is formed at the end of the unit 30 opposite from the LCD 60. It will also be appreciated that the core unit 30 can be equipped with a privacy shield for preventing third parties from viewing the keypad 42 and display 60 while the core unit 30 is in use.

FIGS. 4–7 illustrate a communications module 100 configured to interface with the core unit 30. The communications module 100 and the core unit 30 together provide a transaction terminal such as a point-of-sale terminal. The standalone terminal and LAN workstation will be approximately 4.75" in width, 8" in length, and 3.75" in height. With an integrated printer attached, the length changes to about 11". The overall unit is lightweight for ease of portability.

The communications module 100 preferably includes an interface connector 102, such as a female 20 PIN connector, suitable for electrically interconnecting with the interface connector 48 of the core unit 30. The interface connector 102 is preferably located within a recessed upper face of the module 100. The communications module 100 and the core unit 30 are mechanically interconnected by inserting the core unit 30 within the recessed upper face of the communications module 100 such that the core unit 30 becomes nested in the module 100. As the core unit 30 is inserted into the communications module 100, the interface connector 48 of the core unit 30 electrically interconnects with the interface connector 102 of the communications module 100 to provide an electrical interface between the module 100 and the core unit 30. Screws 104 are preferably used to securely retain the core unit 30 on the communications module 100.

Figure 4:
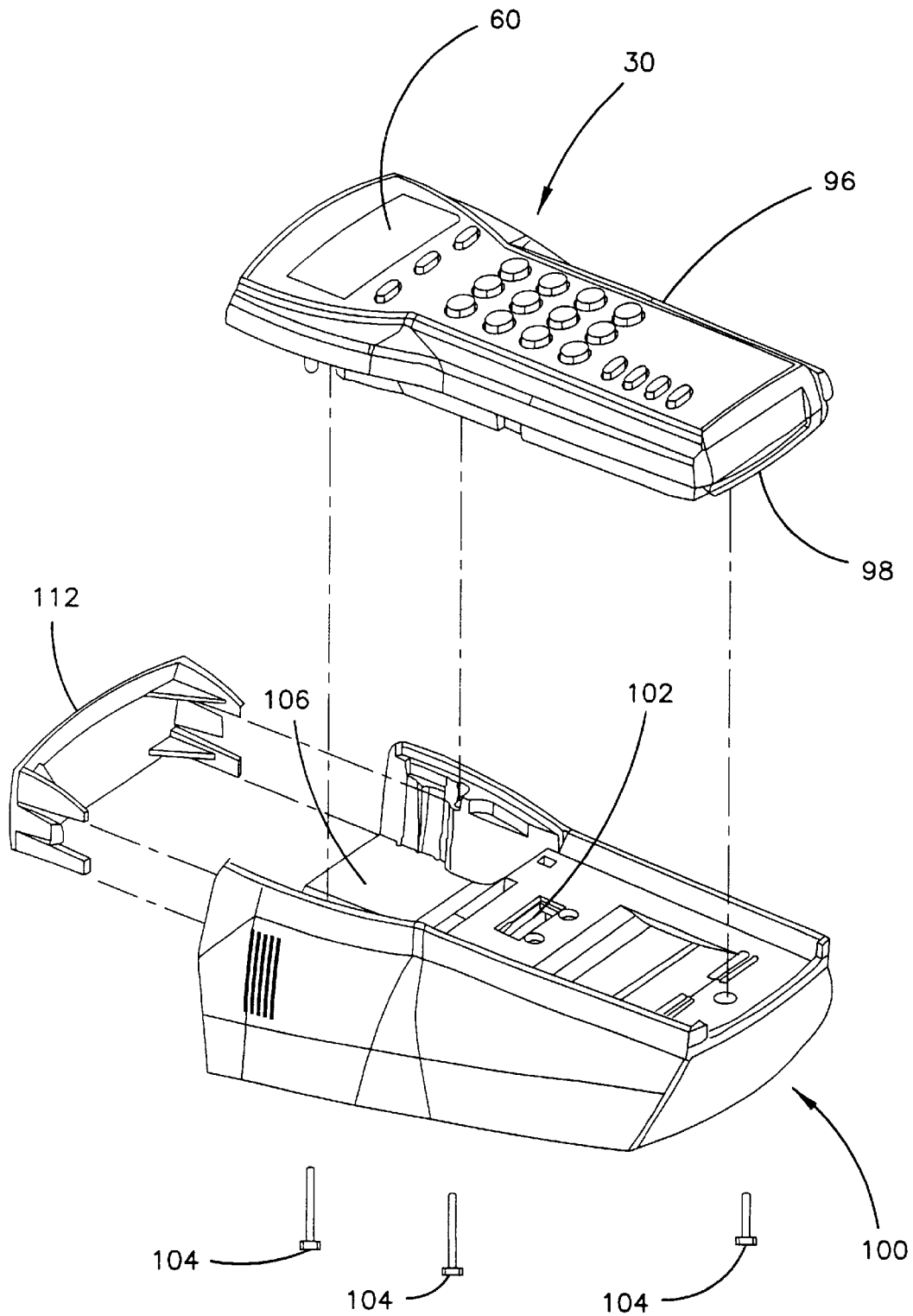
FIG. 4 is an exploded view of a core unit and a communications module configured to interface with the core unit, the core unit and the communications module are shown separate from one another.

The housing of the communications module 100 preferably defines an open ended slot 106 sized to receive a printer module. The slot 106 is formed between a top portion of the housing and the bottom of the core unit 30. A printer connector 110 is located at an interior end of the slot 106 for providing an electrical connection between the communications module 100 and the printer module. When the printer module is not in use, the slot 106 is preferably enclosed by a plug member 112 that snaps within the slot 106 as shown in FIG. 4.

Figure 7:
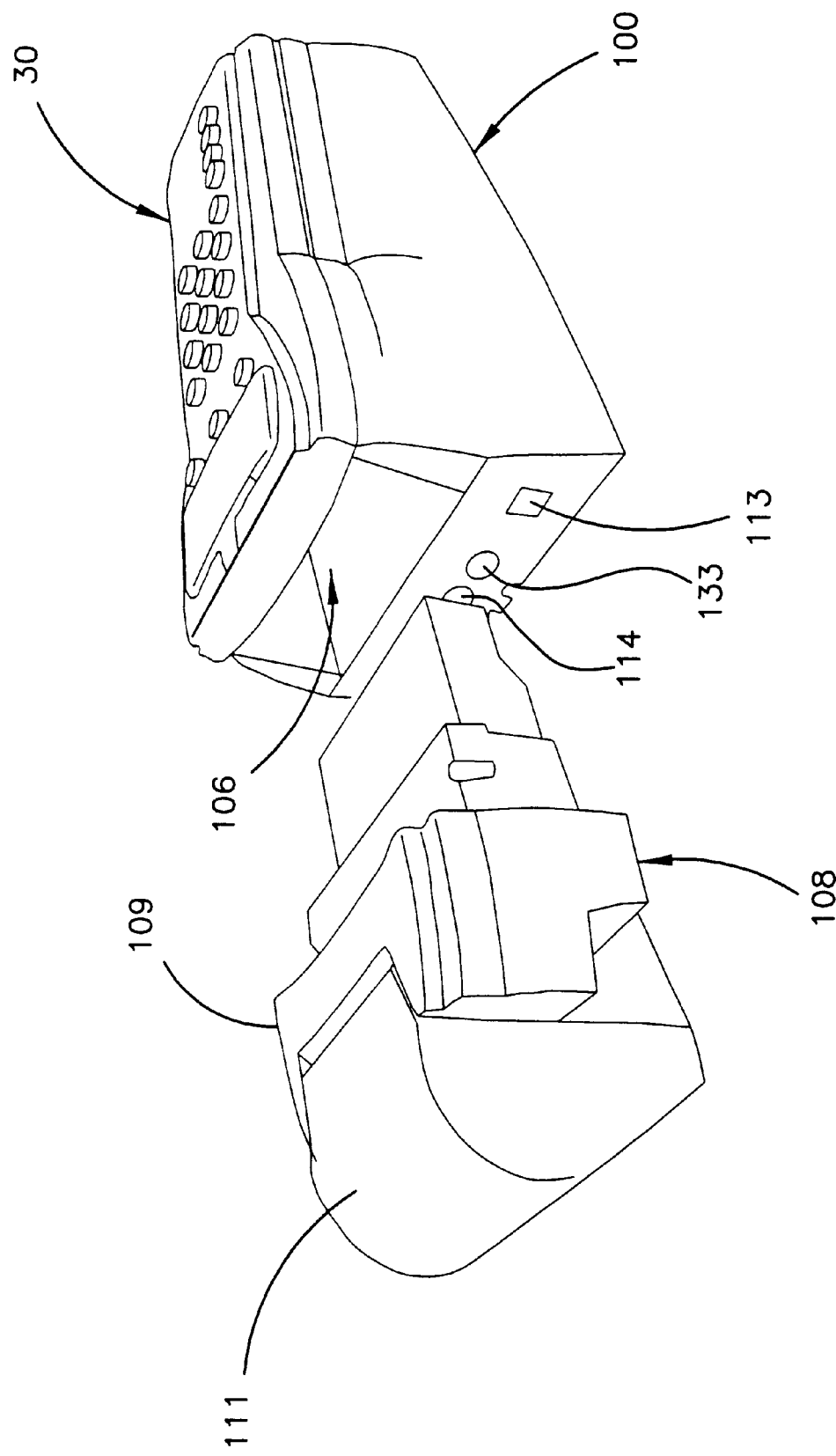
FIG. 7 is a perspective view of a printer module and an assembled terminal comprising a the core unit and communications module of FIG. 4, the printer is shown withdrawn from the terminal.

An exemplary printer module 108 is shown in FIG. 7. The printer module 108 preferably includes a casing 109 containing a printer mechanism and a printer PCB. The printer module is also equipped with a printer roll cover 111.

Figure 5:
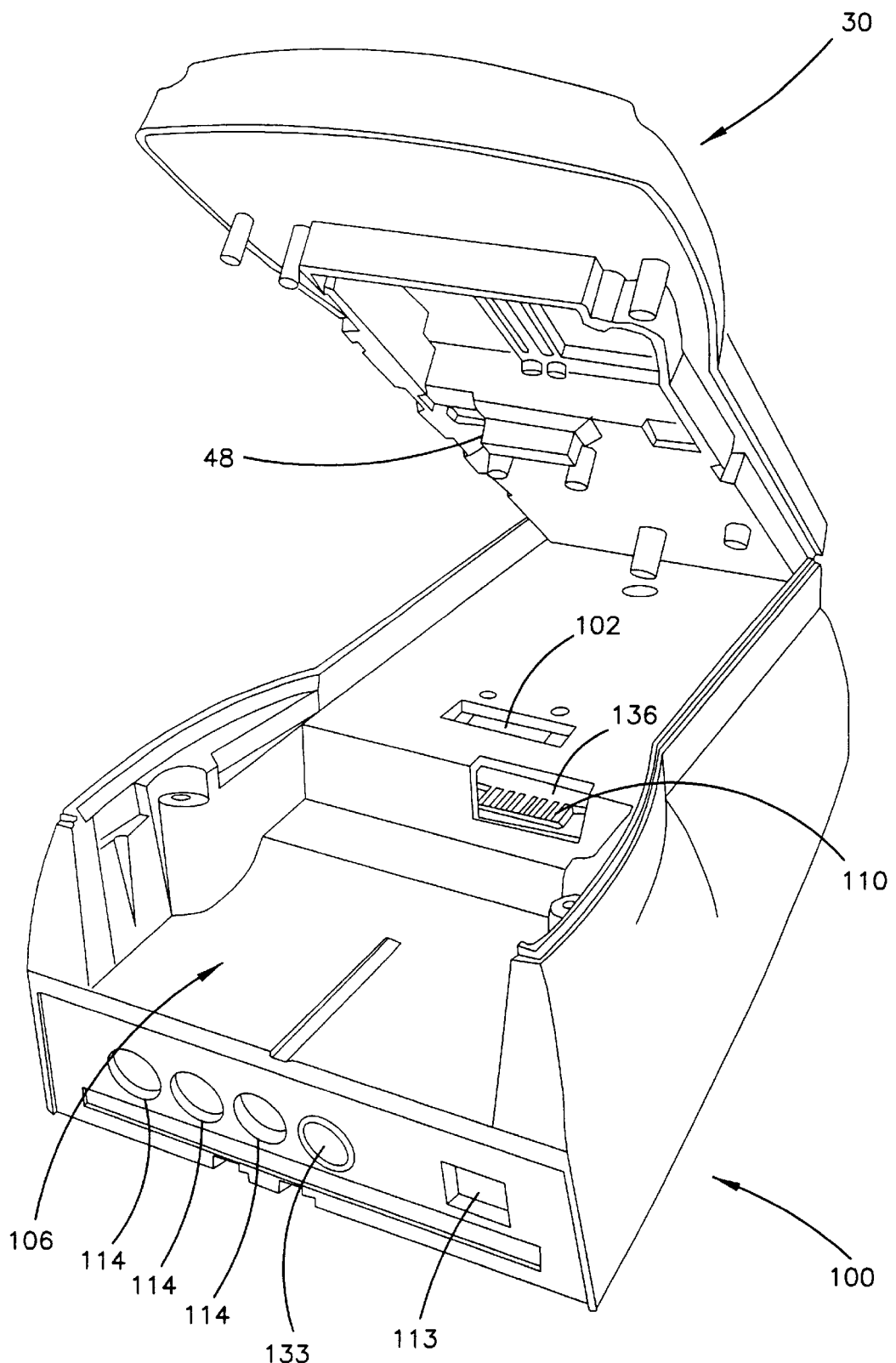
FIG. 5 is an exploded view showing the mechanical and electrical interface between the core unit and the communications module of FIG. 4 prior to interconnection, the bottom of the core unit is shown while the top of the communications module is shown.
Figure 6:
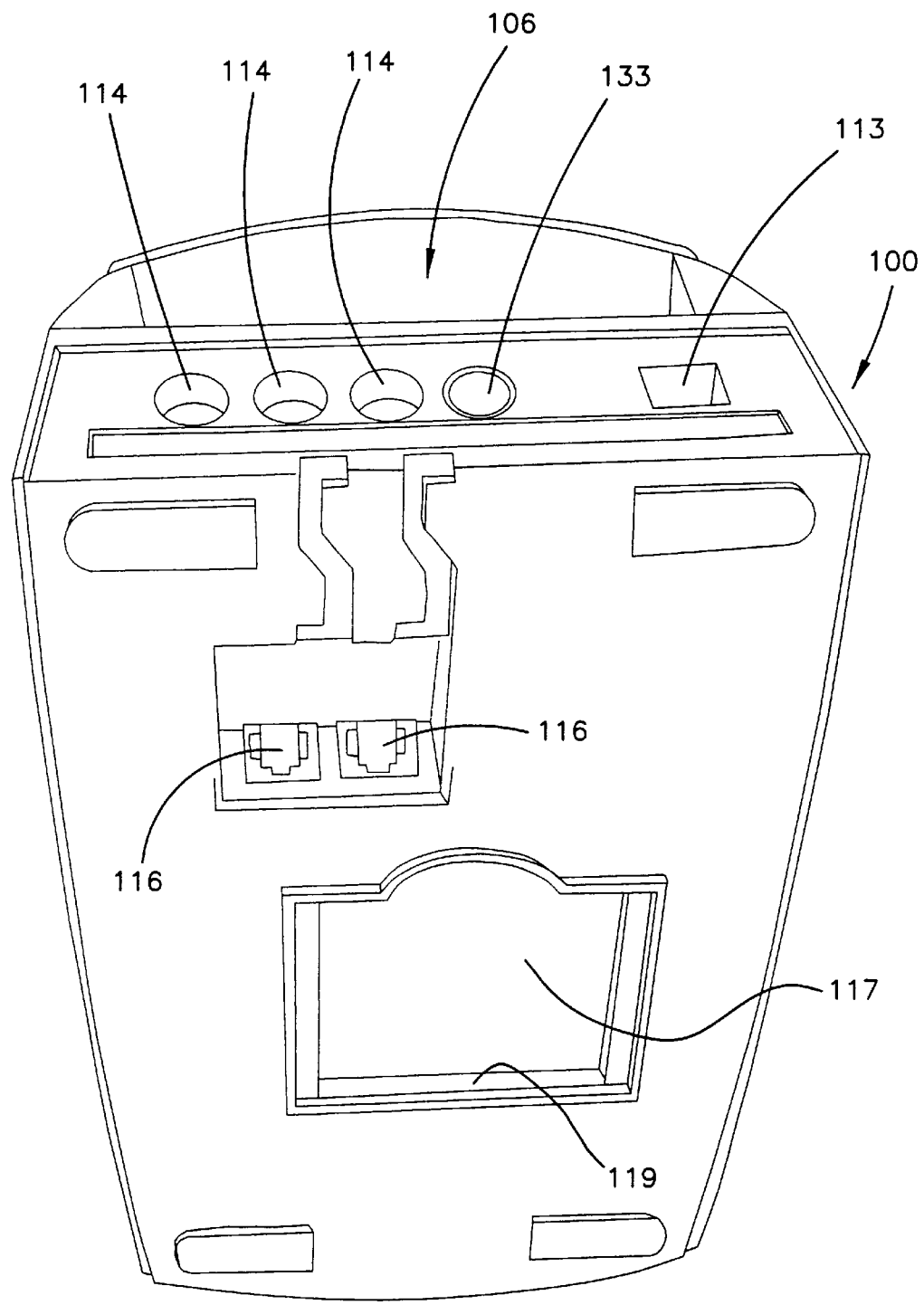
FIG. 6 is a bottom view of the communications module of FIG. 4.

As shown in FIGS. 5 and 6, the communications module 100 is preferably equipped with a power plug receptacle 113 for connecting the module 100 to a power source. The power source may be a conventional wall plug for in-line uses or a battery pack for off-line uses. The communications module 100 also includes a plurality of connectors such as multi-PIN serial ports 114 for allowing the communications module 100 to be readily connected to units such as electronic cash registers, magnetic check readers, external printers, PIN pads, bar code readers, cash drawers and other terminals. The communications module 100 also includes phone line connectors 116, such as phone jacks, for providing phone line access to an internal modem of the module 100 and also for connecting the module 100 to an external phone. The bottom of the module housing also defines a rectangular recess 117 sized to receive smart cards. A slot 119 at one end of the recess 117 allows smart cards to be inserted into an optional secondary smart card reader mounted within the module 100.

Figure 12:
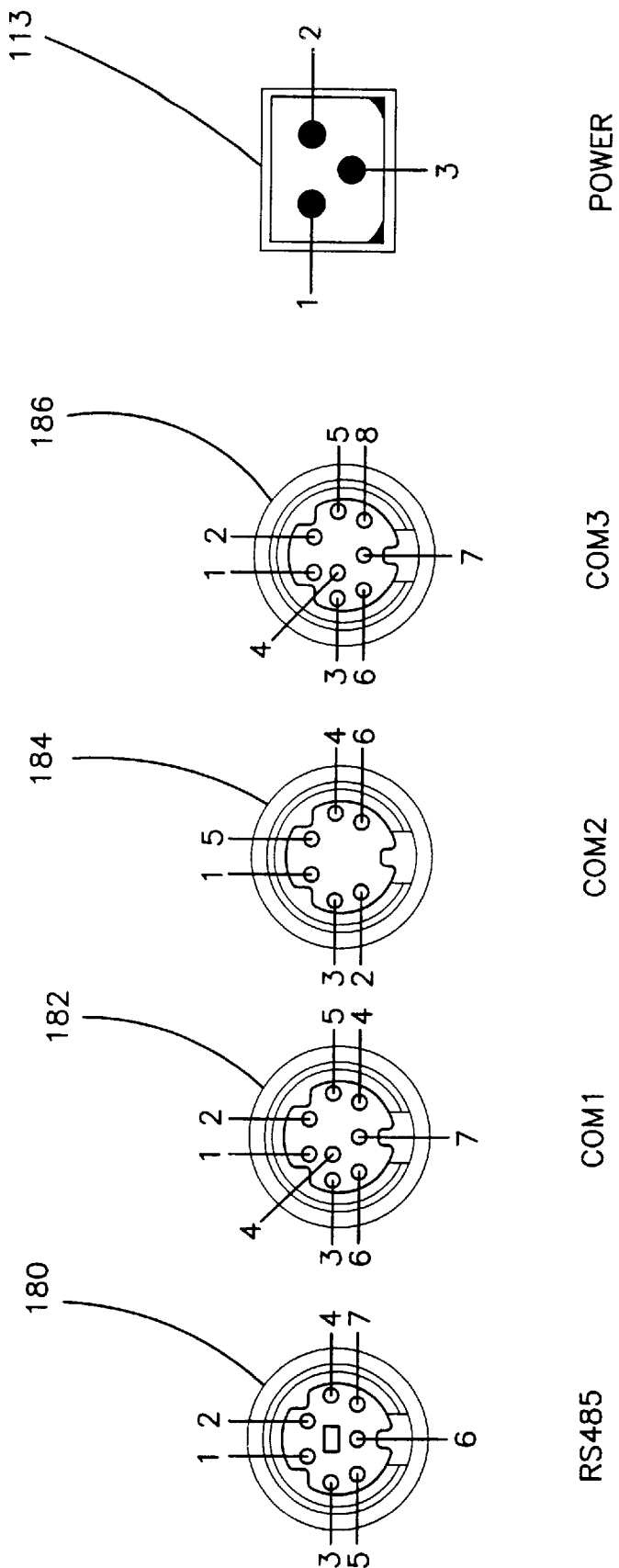
FIG. 12 is a back view of the communications module showing the various serial ports and power port.

In a preferred embodiment shown in FIG. 12, the power plug receptacle 113 is an alternating current (AC) power jack. The 3-prong power jack 113 interfaces with a 12 Volt (V) AC power supply with Table 1.

TABLE 1

| PIN | Name | Function |
| --- | --- | --- |
| 1 | AC | 12 VAC (nominal). |
| 2 | AC | 12 VAC (nominal). |
| 3 | EGND | Earth ground. |

The serial ports 114 include an RS485 port 180, COM1 182 and COM2 184 ports as well as an optional COM3 port 186 shown in FIG. 12.

The RS485 port 180 supports external connections such as a LAN or IBM electronic cash register (ECR) connection. The POS Terminal has its own power supply and will not draw power from the IBM ECR. This port has a 7 PIN mini-pin connector including the following cables: LAN terminated, LAN unterminated, IBM RS485 and others. The LAN cable ends in a RJ11 connector (at LAN connection) and is the same length as the other LAN cables. It is recommended that LAN terminated cables be used for workstations placed on each end of the LAN, in order to reduce signal levels on the line. Unterminated cables can be used on all workstations in between. The IBM ECR cable is the same cable as the PIN pad module cable, but has a mini DIN connector instead of the RJ11 connector the terminal end. All communication through the RS485 port is restricted to half-duplex. It does not provide power other than a low current network bias supply attached to the internal +5 volt supply. The pinouts for this RS485 port are shown in Table 2.

TABLE 2

| PIN | Name | Function |
| --- | --- | --- |
| 1 | +5V | 5 Volts power. |
| 2 | GND | Signal ground. |
| 3 | RGND | Reference signal ground via 100 ohms. |
| 4 | RT+ | RS 485+ |
| 5 | RT− | RS 485− |
| 6 | | LAN termination. |
| 7 | | LAN termination. |
| Shell | EGND | Earth ground. |

The COM1 port 182 is the RS232 port that does not supply power. This will support devices that have their own power source, including an external printer, an RS232 ECR, or a check reader. This port has an 8 PIN mini-pin connector. The cables might include cables for interconnection to various devices such as: DB9 download/debugger cable; VeriFone P250 Printer; Citizen Printer; Silent Partner Printer; IVI Check Reader; Magtek Check Reader; Checkmate Check Reader. However, it can be used for alternate attachments such as ECRs or other check readers. Full-duplex communication with transmit hardware flow control is available through this interface. The pinout for COM1 port 182 is shown in Table 3.

TABLE 3

| PIN | Name | Function |
| --- | --- | --- |
| 1 | GND | Signal ground. |
| 2 | PAPER | Printer paper alarm; a high level on this PIN indicates that printer paper supply is low or out. |
| 3 | RTS | Output to device indicating that Jigsaw has selected the RS232 interface and is ready |

TABLE 3-continued

| PIN | Name | Function |
| --- | --- | --- |
| 4 | CTS | Input to jigsaw indicating that the peripheral device is ready to receive data. |
| 5 | RxD | Received data from a peripheral. |
| 6 | TxD | Transmitted data out to a peripheral. |
| 7 | | No connection. |
| 8 | Test | No connection. |
| Shell | EGND | Earth ground. |

The COM2 port is the RS232 port that does supply power. This will support a PIN pad connection, including the SPP, 290, 290E, and POS Terminal PIN pad. These require a powered port up to 150 mAmps, unregulated 7–14 volts. This port has a 6 PIN mini-din connector. The cables might include cables for interconnection to various devices such as: DB9 download/debugger cable; IVI Check Reader; Magtek Check Reader; and Checkmate Check Reader. Full-duplex communication with transmit hardware flow control is not available. The pinout for COM2 port 184 is shown in Table 4.

TABLE 4

| PIN | Name | Function |
| --- | --- | --- |
| 1 | PWR | Unregulated (7–14) VDC, 150 milliamps max. |
| 2 | GND | Signal ground. |
| 3 | RxD | Receive data from a peripheral. |
| 4 | TxD | Transmit data to a peripheral. |
| 5 | GND | Signal ground. |
| 6 | | No connection. |
| Shell | EGND | Earth ground. |

The COM3 port 186 is an optional RS232 port similar to COM1 port 182. It may be used, like COM1 port 182, for interfacing to devices such s a check reader or bar code wand. A pinout for COM3 port 186 is shown in Table 5.

TABLE 5

| PIN | Name | Function |
| --- | --- | --- |
| 1 | DCD | Control line input from a peripheral. |
| 2 | RxD | Serial data input from a peripheral. |
| 3 | TxD | Serial data output to a peripheral. |
| 4 | DTR | Control line output to a peripheral. |
| 5 | GND | Signal ground. |
| 6 | DSR | Control line input from a peripheral. |
| 7 | RTS | Control line output to a peripheral. |
| 8 | CTS | Control line input from a peripheral. |
| Shell | EGND | Earth ground. |

FIG. 8 is an exploded view illustrating the internal components of the communications module 100. As shown in FIG. 8, the housing of the module 100 includes a top cover 118 positioned opposite from a bottom cover 120. The top and bottom covers 118 and 120 preferable mate together and are interconnected via screws 122. Positioned between the top and bottom covers 118 and 120 are an input/output PCB 124, a communications PCB 126, an optional modem PCB 128, and an optional secondary SCR assembly 130. It will be appreciated that the assembled terminal can function as a wall mounted unit or a hand held unit. Additionally, the base of the communications module 130 preferably includes rubber feet for supporting the terminal on a structure such as a countertop.

The input/output PCB 124 includes a bus structure and other components suitable for interfacing with the serial ports 114 and power plug 113. The input/output PCB 124 is mounted at a predetermined position within the housing such that the ports 114 align with openings 132 defined by the bottom of the housing. It will be appreciated that the bottom of the housing includes a break-out panel 133 positioned adjacent to the openings 132. By punching out the break-out panel 133 and replacing the input/output PCB 124 with a new input/output PCB having four serial ports (180, 182, 184, 186), the communications capabilities of the module 100 can be enhanced as required by a user.

The communications PCB 126 includes bus structure and other components suitable for interfacing with the printer connector 110, the interface connector 102, the input/output PCB 124 the modem PCB 128, and the optional secondary SCR assembly 130. It is preferred for the communications PCB 126 to be mounted on the top cover 118 and oriented such that the interface connector 102 extends substantially vertically through an opening 134 defined by the top cover 118, and the printer connector 110 extends substantially horizontally through an opening 136 defined by the top cover 118. The input/output PCB 124 and the communications PCB 126 are preferably interconnected via ribbon cable 138.

The modem PCB 128 includes bus structure and other hardware suitable for interfacing with the phone line connectors 116. The modem PCB 128 is mounted in the bottom cover 120 such that the phone line connectors 116 align with a pair of openings 140 defined by the bottom 120 of the housing. The modem PCB 128 is connected to the communications PCB 126 via ribbon cable 142. The ribbon cable connection allows the modem PCB 128 to readily be replaced with an alternative modem board. For example, a user may require an upgraded modem board or may need a modem compatible with one of several different phone systems.

The SCR assembly 130 is preferably connected to the communications PCB 126 via ribbon cable 144. The SCR assembly 130 is preferably mounted adjacent the slot 119 in the bottom cover 120 such that when a smart card is snapped within the receptacle 117 and pushed into the slot 119, the card is read by the SCR assembly 130. The SCR assembly 130 can be readily interchanged and can have a variety of configurations. In one exemplary embodiment, the SCR assembly 130 is configured to accept both a smart card and a plurality of security access modules (SAM). If a user does not require the secondary SCR assembly 130 or the SCR assembly 130 is not intended to be used, the recess 117 is preferably covered by bottom panel 146.

FIGS. 9 and 10 illustrate a PIN pad module 148 configured to interface with the core unit 30. The PIN pad module 148 includes a housing cover 149 having an open top side 150 configured to receive the core unit 30 such that the bottom of the core unit 30 mates or nests within the top of the housing cover 149. The PIN pad module 148 includes a PIN pad PCB 152 including an interface connector 154 configured to connect with the interface connector 48 of the core unit 30 when the core unit 30 is nested in the housing cover 149. Screws 151 are used to securely connect the core unit 30 and the PIN pad module 148 together.

The personal identification number (PIN) pads PCB 152 also includes a external connector 156 for providing an interface between the personal identification number PCB 152 and a remote unit such as an electronic cash register, terminal or other communication device. Preferably, the connection between the external connector 156 and the remote unit is provided via a coiled cord. It will be appreciated that the PIN pad module 148 functions to convert the core unit 30 into a PIN pad for transferring data to the remote unit and for receiving data from the remote unit.

It will be appreciated that the PIN pad resulting from the combination of the core unit 30 and the PIN pad module 148 has a widened head portion that accommodates the LCD 60 and a narrow body portion sized to allow the device to be manually held. The corners of the device are preferably rounded and the housing is preferably constructed of a durable fade resistant plastic material. Exemplary dimensions of one particular PIN pad embodiment will be approximately 3.45" in width, 8" in length, and 1.75" in height. The PIN pad can be wall mounted, stand mounted, or placed on a counter.

The PIN pad module 148 allows the POS terminal to operate as a PIN pad. It generally obtains power from a host device such as a terminal, electronic cash register (ECR), or personal computer (PC). In one embodiment, this module will have two different case options, one for bonded units and one without bonding. The embodiment of the PIN pad module shown has an RJ11 modular connector so that different cables can be attached. This allows a customer, such as a bank, to mix and match cables as needed to connect to different host devices. This also allows easy replacement of cables if they break. The cable fits securely to the PIN pad and does not cause a security risk (one cannot probe through the port to access the secure processor). The RJ11 connector is easy to connect without special tools, but cannot be taken out by hand (a screwdriver or similar tool is required to pop out). The cable is attached from the back of the core unit.

The PIN Pad Module to ECR cables includes cables for interfacing with the various makes of ECRs such as: IBM 4680; NCR 2127 (includes power pack); DB9 RS232 (includes power pack); and DB25 RS232 (includes power pack). In one embodiment, these cables have a 3" straight section, an 18" coiled section (expandable to 10 feet), and a 5 foot straight section. The two RS232 cables and NCR cable will also support a power pack at the PC/ECR connector end. The IBM cable does not need a power connector.

PIN Pad to LAN Cables include a cable for connection to a LAN with power pack and connection to a LAN with DB9 RS232 and power pack.

A "Y" cable is needed for connecting the PIN pads together on a LAN. The additional RS232 connection allows the PIN pad to also connect to an ECR or PC.

OVERVIEW OF EXEMPLARY COMPONENTS OF MODULAR SYSTEM

The overall features of the various components and features of the POS terminal will now be described. It will be appreciated that the POS terminal may take on varying configurations and that the following are but a few of those possible configurations and are not to be construed as limitations upon the scope of the invention.

Keypad

In the preferred embodiment, the keypad 42 is preferably made up of a 19-key silicone rubber matte with carbon pills which, when pressed, closes etched contacts on the main logic board 46. Twelve keys comprise a telephone style numeric pad. The numeric pad consists of keys 0 through 9, plus a Clear and Enter key. One key has a dual function: normal key entry and wake-up initiated from power down mode. This is accomplished with a dual carbon pill and separate circuit board etching. Four additional function keys are available for initiating application specific functions. Three soft keys are located directly under the display; these keys correspond to software defined commands on the display.

In the preferred embodiment, only the numeric and telephone style alpha characters are printed on the keys. The key matte will have four different colors. Besides the operator keys, the keypad will have an extra carbon contact which is used in conjunction with a security tamper detecting circuit. When the case is assembled, this contact is permanently activated. If a security option board is installed within the core unit 30, this contact becomes one of the switches in the series circuit that is uses to detect case opening.

Display

The display 60 is preferably a bit mapped liquid crystal display (LCD) panel. Font design and size as well as graphical images have an open format as long as they fit within the 128×32 pixel matrix provided. The display technology used is based on a Super-Twist Nematic (STN) transflective crystalline structure. A backlight is lightpiped from an LED source on the main logic board 46 and dispersed along the underside of the display. Contrast adjustments are made through the use of the main logic board's processor.

The LCD 60 is preferably controlled by an LCD controller chip. This chip incorporates the display memory, scan timing functions and segment drivers. It connects to the application specific integrated circuit (ASIC) of the main PCB 46 through an interface bus. Within the LCD controller chip is memory that is accessed through the interface bus and used by the controller to refresh the image on the LCD. Each bit in this memory corresponds to one pixel in the LCD. The controller can be written and read through the interface bus.

Each character position within the display is capable of displaying the standard ASCII character set. Other application defined character sets, not mentioned above, are downloadable into the operating system. The display offers bit-mapped graphics for international languages and is backlit for low lighting conditions. The display is flush rather than tilted, since it will be used in a variety of environments, such as wall mounted. The display is yellow/green in color with sufficient character contrast so prompts are easy to read.

Main PCB

Figure 13:
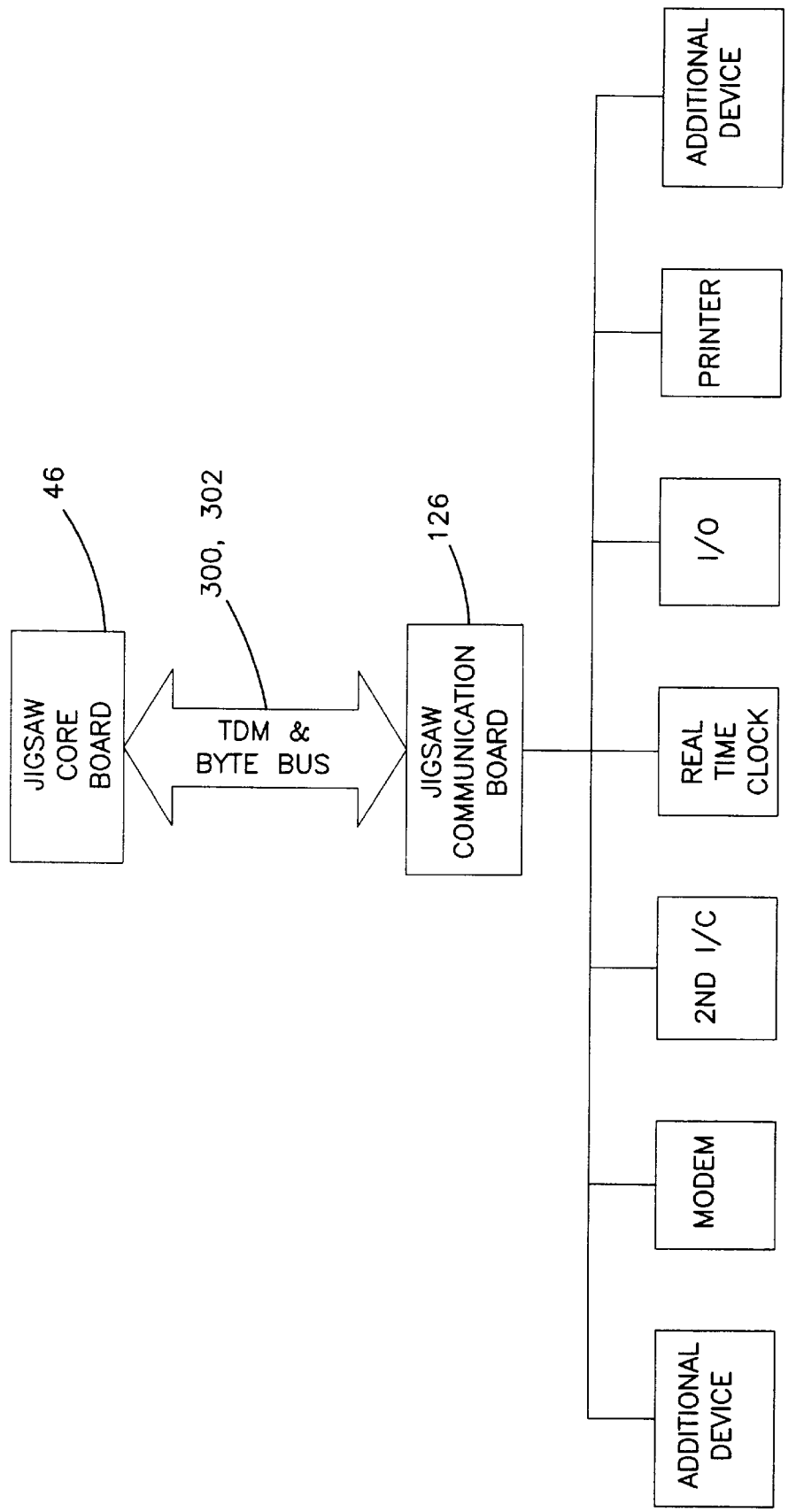
FIG. 13 is a block diagram of the interconnection of a main printed circuit board to one or more communication boards.

The main PCB 46 interconnection through a time division multiplex (TDM)bus 300 and byte bus 302 to one or more communication boards 124, 126, 128, and 130 is further detailed in a block diagram shown in FIG. 13.

Figure 16:
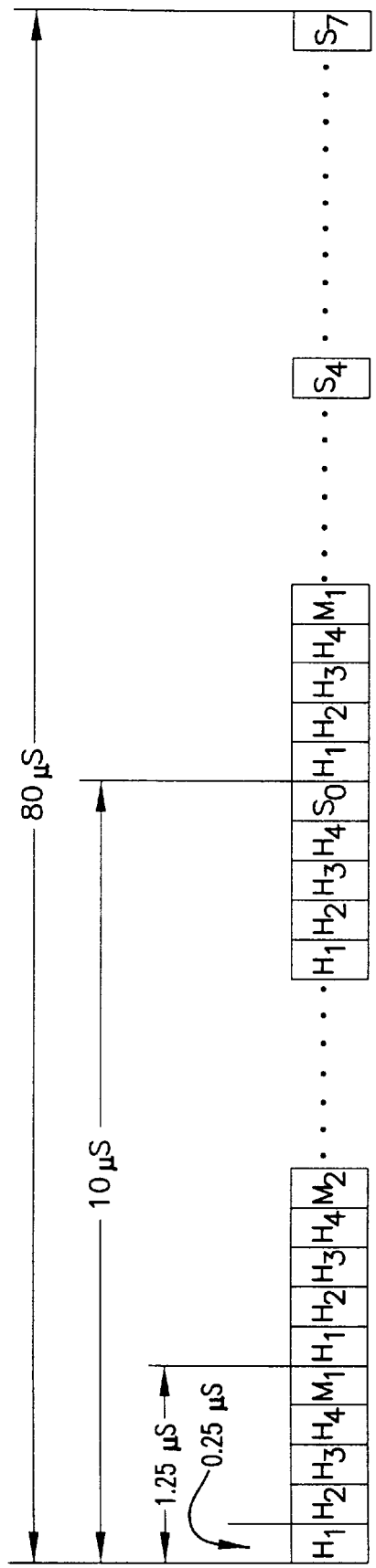
FIG. 16 is a diagram showing one implementation of a TDM bus having three tiers of bandwidth.

The TDM bus is a communication protocol assigning bandwidth for moving information on signal lines. The bandwidth is allocated and fixed at specific levels for the entire time the TDM bus is in operation. The advantages of this bus 300 include: scalability to different amounts and types of I/O under a common platform, and a reduced number of PINs being needed for interconnection to other components in the system. The TDM bus uses multiple tiers of bandwidth allocation to allocate a high bandwidth for high speed signals and less bandwidth for low speed signala. One particular implementation of this TDM bus is a three tier system which is shown in FIG. 16.

The byte-bus 302 is a transaction based communication scheme which allows for expandability of system communication and other capabilities. It allows expansion of processor connected peripherals through 2 signal lines, one of which is shared with the TDM bus 300. Some of the advantages of this bus 302 are that multiple peripherals can be directly interfaced through only 2 signals lines to the processor, which reduces the number of interconnections needed in the system and reduces overall electromagnetic interference (EMI) emissions by reducing the number of EMI sources (e.g., signal lines). Another advantage is that additional peripherals can be connected to the Com PCB without disturbing the core design through modifications to the software drivers for transactions on the byte bus 302.

Figure 14:
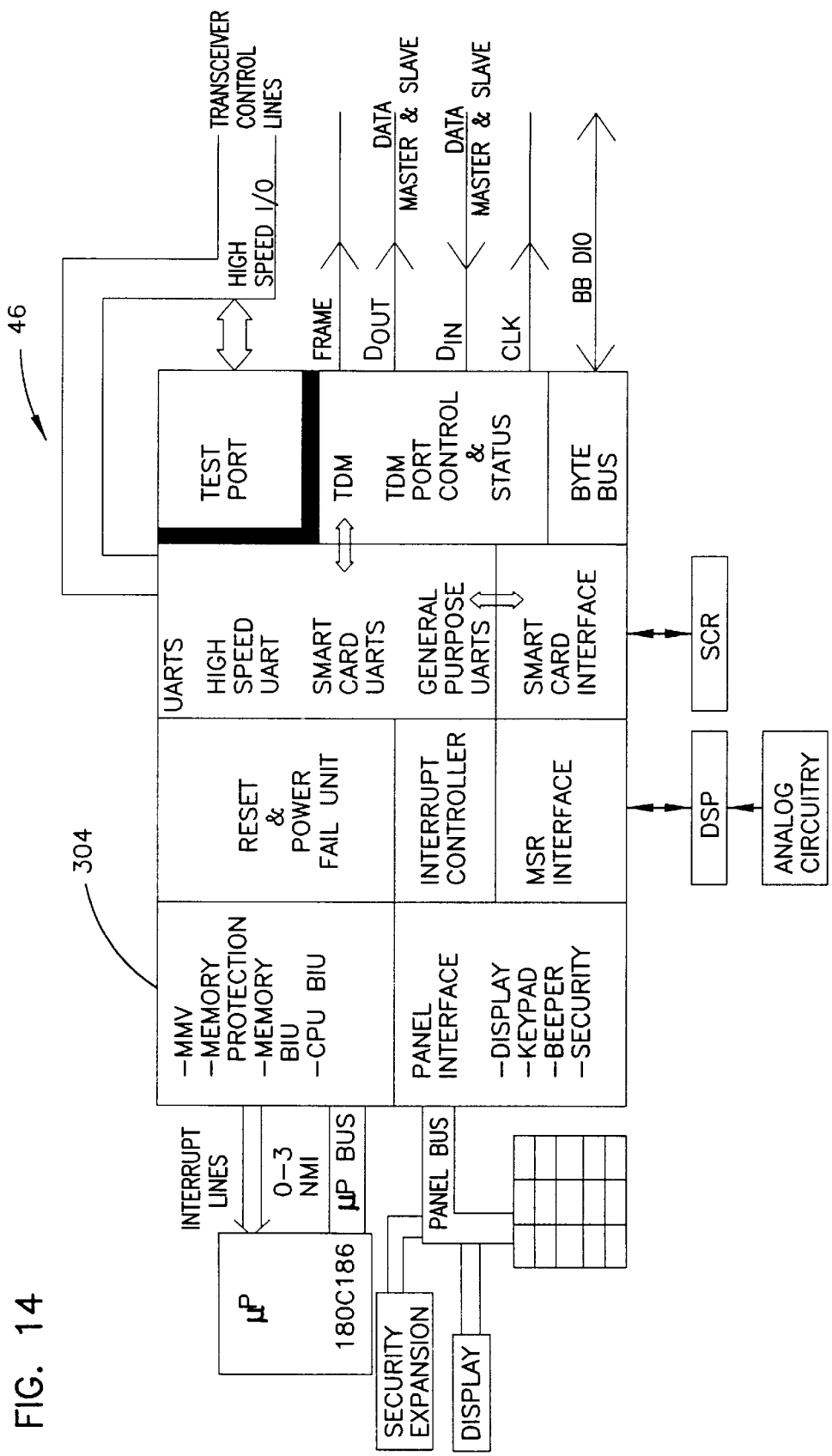
FIG. 14 is a more detailed block diagram of the main printed circuit board shown in FIG. 13.
Figure 15:
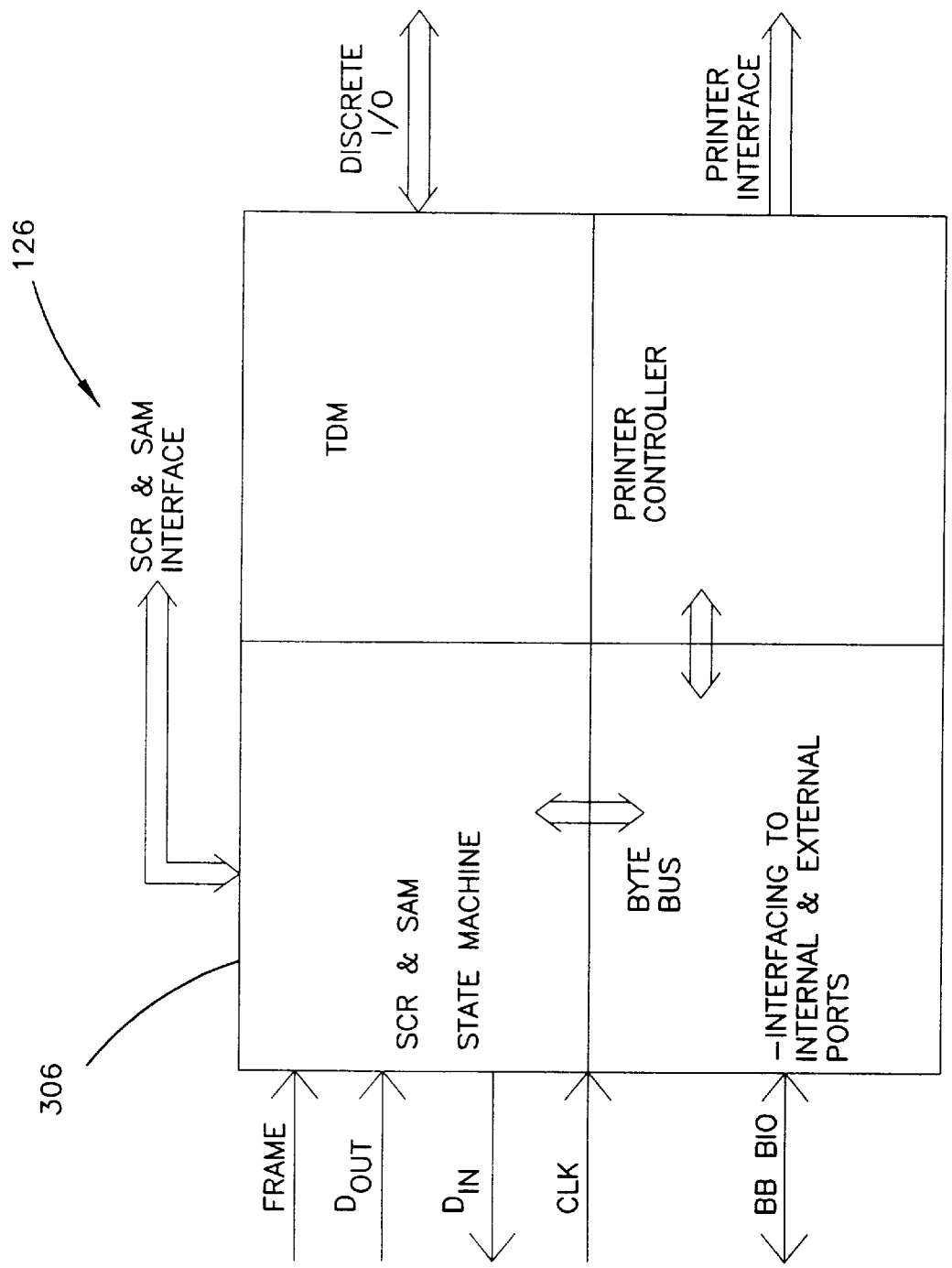
FIG. 15 is a more detailed block diagram of one of the communication boards shown in FIG. 13.

An ASIC (Application Specific Integrated Chip) 304, along with the processor, is the heart of the main PCB 46, as shown in FIGS. 14 and 15. Virtually all communication between functional circuit blocks occurs through the ASIC. The ASIC is made up of the following major functional blocks shown Table 8.

TABLE 8

| Functional Block | Description |
| --- | --- |
| Reset and Power Status | Generates power fault interrupts, appropriate circuit activation is based on voltage levels determined by the communication module. |
| Display Interface | Display controller interface, contrast and backlight control. |
| Keypad/Security CPU I/F | Provides direct parallel I/O interface between the keyboard and display and an optional security processor. |
| UARTs | Six UARTs are provided with independent baud rate generators. Optional circuit boards are required to access all UARTs. |
| CPU Bus Iinterface Unit (BIU) | Interfaces the CPU bus into the internal ASIC bus. Responsible for converting word wide CPU operations into byte wide operations on the ASIC bus. |
| MMU/Memory Protection | Controls mapping of the CPU's 1MB logical memory space into a 12MB physical memory space. Also provides programmable write protection on a 4K page basis. |
| Memory BIU | Responsible for interfacing the ASIC internal bus to the external memory resources. Includes programmable chip selects and memory bus timing. |
| Interrupt Controller | Manages masking and grouping of internal ASIC interrupt sources and drives the group interrupts out to the CPU interrupt controller. |
| Beeper Interface | Provides a speaker on/off control. |
| Magnetic Stripe Interface | Translates analog signals from two separate read channels using a digital signal processor (DSP). The analog signal is analyzed for peaks. Logical data is translated from the peaks and transferred into the system. |
| Smart Card Reader Interface | Specialized interface to a smart card reader, providing for clocking and interface between one of the standard ASIC UARTs and the smart card. In some situations, the dual card reader option may share a common UART. |
| TDM Channel | Time Division Multiplexor Channel. Its function is to time slice the I/O connections between boards and serially transfer the information they contain. This is a dual channel circuit used to pass information between the Core, Modem, Com and Printer boards. |
| Byte Bus Channel | Bi-directional serial data channel between the Com and Core boards. |
| Test Port | Manufacturing/service test access port based on IEEE P1149.1 standard (JTAG). |
| Core to Com | This multi-pin interface connects the Core |

TABLE 8-continued

| Functional Block | Description |
| --- | --- |
| Interface | module and the Com module. It includes the TDM lines, power, ground, unregulated voltage, high speed UART, NMI/Reset and Wake-up line, Byte Bus, and Beeper. |

Virtually all communication between functional circuit blocks occurs through the ASIC.

Reset Power Status

The following three signals are driven by the Comm module to direct system operations:

Hard reset (HRST)

Power fail Interrupt (PFI)

Battery status (BSTAT)

HRST—This signal is activated whenever the unregulated power is below a level necessary to produce +5 volts. When power is applied, HRST will remain active for a limited time after the +5 volts have stabilized.

PFI—This signal activates tms prior to HRST. This signal can be polled by the Core CPU.

BSTAT—This signal is only present on battery operated products. It is passed to the Core unit through the TDM port.

Panel Interface

The panel interface provides the controls for all of the user interface peripherals. This includes the display, keypad, and audio circuitry. The ASIC 304 provides an external peripheral data bus to these devices as well and the security processor board. Selection of a device on this bus is done through the registers in the ASIC. All device selecting and strobing is done manually by the processor using programmed I/O. When securing the product, the optional security board can take over the data bus. Once active, all peripheral circuits are inaccessible to the 80C186. In this mode, the security processor controls user interface functions. Communications with the 80C186 is limited to a bidirectional byte port in the ASIC.

Display

The display circuitry includes the access controls to the external graphics display controller. Internal to the ASIC is a register used to set the contrast voltage applied to the display. Varying the settings of this register will proportionally adjust the intensity of the display image. Another register in the ASIC controls the backlite illumination around the display. The settings provided by this register can turn the LED backlite on, off, or to incremental settings in between.

Audio Control

The audio control within the ASIC activates an external beeper in the communication module. The beeper is a fixed frequency device.

Keypad

The keypad circuit scans a matrix of 19 keys through a set of row and column connections on the PCB. A depressed key can be detected by activating one of the three ASIC row drivers and reading back which of the 8 columns had gone high. The columns are returned on the peripheral data bus. By decoding the row and column positions, the processor can determine which key is down. Since the data bus is used by other panel circuitry, scanning the keyboard can only be done with those devices off. Having another device active while reading the keypad will not damage the keypad or other device; however, it will corrupt the returned keypad information. Because the panel bus has a small amount of capacitance, the ASIC scan outputs should not be changed and re-sampled faster that 10 μs.

Security PCBs

The main security board provides access control to the user interface peripherals (keypad, display, etc.). There are two different boards that can be added to the system for security. Each security board is installed through a door on the bottom side of the core module. This board is attached to the core through Zebra strip contacts. These contacts and the board are held in place by the door. Connected through these contacts and through special connections on the user keypad matte and on the security board itself is a series circuit whose purpose is to detect the opening of the case.

The first board, already referred to, includes a microprocessor. This board has the ability to control these peripherals and communicate with the 80C186. It also performs tamper detection and manufacturing testing.

The second security PCB is a "non-intelligent" board. It provides tamper detection and manufacturing test, but it does not control the peripherals (the peripherals remain under the control of the 80C186). Additionally, a small serial memory is incorporated into the non-intelligent PCB to store secured information. This memory is powered by the battery backed security circuit. When processor detects a tamper condition, the OS will erase necessary memory within the 80C186 memory space.

The controls for both of these boards are generated by the ASIC. These controls handle data exchanges between the two processors and read/write operations to the serial memory device.

Low Level Security Board

When opened, this tamper detection circuitry causes the security board to erase all information it had in storage in a small battery backed memory device it maintains, and presents a tamper signal to the ASIC.

High Level Security Board

As previously described, the high level security board controls peripherals and communicates directly with the processor. Also, it stores keys and performs encryption/decryption.

To better manage the power consumed by the terminal, this board also allows the DS5002 to be programmed to turn itself on. Awakening the DS5002 is done by the 80C186 processor.

The DS5002 and 80C186 share a bi-directional parallel port through which all communications take place. This port includes a set of hardware handshaking signals that respond to the read and write operations done by the processors.

When opened, this tamper detection circuitry causes the security board to erase all information it had in storage in DS5002 and presents a tamper signal to the ASIC.

Transferring Data to One of the Panel Peripherals

The panel data bus consists of a bi-directional 8 bit path which can be controlled by either the 80C186 or the DS5002. Transactions on the bus are executed manually by activating the controls necessary to select, enable or strobe panel peripheral devices. All devices on the panel bus have the ability to be both written and read.

PANEL Control Register

The panel control register provides low level controls to peripherals attached to the panel bus. A number of these controls are disabled when the ASIC is in the secured mode. The settings held by this register can be read back by the 80C186. The values in the register are described in Table 9.

TABLE 9

KEYH ENB (Bit 0)
 This bit is used to enable keyhit interrupts to the 80C186.
 When enabled, any high signal on the panel bus will result in a
 keyhit interrupt. This interrupt is useful when the panel is in
 protected mode and the DS5002 is shutoff. While in this mode,
 the interface can be set with all of the keyscan active. If a
 key is depressed, this interrupt is generated. Setting this
 bit will enable the interrupt. A hardware reset clears this
 bit.
IBF ENB (Bit 1)
 The IBF enable is used to enable an interrupt generated by the
 DS5002 when it reads data from the panel data register. When
 set this interrupt source is enabled. A hardware reset clears
 this bit. When the DS5002 is not present, this bit should
 remain cleared to prevent unwanted interrupts from occurring.
OBF ENB (Bit 2)
 The OBF enables is used to enable the interrupt generated by
 the DS5002 writing to the panel data port. When set this
 interrupt source is enabled. A hardware reset clears this bit.
 When the DS5002 is not present, this bit should remain cleared
 to prevent unwanted interrupts from occurring.
DATA ENB (Bit 3)
 This bit is used to enable the panel data register onto the
 panel bus. When set, the data register is driven out.
5K RST (Bit 4)
 This bit controls the signal level driven by the ASIC's 5KRST
 pin. When set, the DS5002 is held in a reset state. Hardware
 reset will set this bit.
T CAP (Bit 5)
 This bit is used to reset an internal ASIC latch that captures
 tamper circuit transitions generated during product test.
 During normal operations, this control will not be used since a
 tamper condition will remain latched until the backup battery
 is removed.
P MODE (Bit 8)
 This bit specifies the operational mode of the ASIC IBF and OBF
 pins. When this bit is high, and the ASIC is in its non-secured
 mode, the OBF and IBF pins are driven by the ASIC. The OBF and
 IBF pins' polarity are determined by bits 11 and 12 in this
 register. When P MODE is low, the ASIC OBF and IBF pins are
 inputs. In this mode, these pins can read and enabled as
 interrupt sources.
5002 CS (Bit 9)
 This bit controls the signal level driven by the ASIC's 5KCS
 pin, which is used to select the DS5002. When this bit is high
 the DS5002 is selected. A hardware reset will cleared this bit.
DISP CS (Bit 10)
 This bit controls the signal level driven by the ASIC's DISCS
 pin. This pin is attached to the display controller on the core
 board. When this bit is high the controller is selected. This
 control is used for both reading and writing the controller
 registers.
PAN WR (Bit 11)
 This bit controls the signal level driven by the ASIC's PANWR
 pin. Setting this bit will write data into the DS5002 RPC port
 or it will enable read data or strobe write data from the
 display controller. When accessing the display controller, the
 PAN RD bit determines cycle, reading or writing data. This bit
 acts as a strobe only. It not functionally related to the type
 of operation.
PAN RD (Bit 12)
 This bit controls the signal level driven by the ASIC's PANRD
 pin. This pin is used for reading data from the DS5002 and
 defining the type of cycle being issued to the display
 controller. When set, and 5002 CS bit is set (non-secured
 mode), the DS5002 will output its data to the panel bus. When
 accessing the display controller, this bit should be set for
 controller writes and cleared for reads. A hardware reset will
 clear this bit.
PAN ADD (Bit 13)
 This bit controls the signal level driven by the ASIC's PANADD
 pin. This pin is used to select one of the multiple registers
 in either the display controller or the DS5002. Prior to
 activating either the PAN RD or PAN WR bits, this bit should be
 set. While in secured mode, this bit is inoperative. A hardware
 reset will clear this bit.
IBF OUT (Bit 14)
 This bit controls the signal level driven by of the ASIC's IBF
 pin. The IBF OUT pin is only an output when the P MODE bit is

TABLE 9-continued set and the ASIC is in a non-secured state. A hardware reset
 will clear this bit.
OBF OUT (Bit 15)
 This bit controls the signal level driven by the ASIC's OBF
 pin. When the P MODE bit is set, and the ASIC is in non-secured
 mode, this pin becomes an output whose level is controlled by
 this bit. The PIN driver is an open collector style output, an
 external pull-up is used to establish the high state logic
 level. A hardware reset will clear this port.

Panel Data Path

The panel data register is used hold data to be written into a peripheral on the panel bus. Since the mode of the panel data bus can change, the selectable peripherals can vary as follows. When the ASIC is un-secured, this data can be issued to either the display controller, MISC registers or the DS5002. When the ASIC is secured, the panel data register is attached directly to the DS5002 not to the other peripherals. The panel data register must be enabled on the panel bus using the DATA ENB bit in the panel control register.

MISC Control Register

This register is used to select features associated with either the display or keypad operation. As noted below, this register has four levels to it. Selecting a particular level is done by specifying it using data bits 6 and 7 in the 16 bit port data word. One half of this register is affected by the security setting on the ASIC. If security is enabled, only the upper eight bits of this register can be read-none of them can be written to. When not secured, all bits are both read and write-able Embedded addressing provides a method of expanding the registers available through the panel bus without adding significant decoding requirement to both processors. The register levels and bit assignments are decoded as follows in Table 10.

TABLE 10

| Name | Function | Bit settings |
| --- | --- | --- |
|  |  | 7 6 |
| MISC 0 | Keyscan and audio enable | 0 0 |
| MISC 1 | Unused | 0 1 |
| MISC 2 | LCD contrast | 1 0 |
| MISC 3 | Backlite and readback pointer | 1 1 |

KEYSCAN (Bit 0–2) (Misc 0)
 These three bits provide the column selects for the 19 key
 keypad matrix. Each bit ties to one of three ASIC PINs. Each
 PIN, when enabled by setting its SCAN bit high, drives a high
 level to the column of keys it is attached to. When low, the
 ASIC outputs tri-states. When a key is depressed, it will
 return a high level to its appropriate panel data bus bit.
 Reading the panel data port will return the depressed key
 location.
KEYHENB (Bit 3) (Misc 0)
 This bit enables key detection by the 80C186 when the panel
 interface is secured. Typically, this feature is only enabled
 by the DS5002 but since the dual processor mode shares these
 ports, this bit is visible to the 80C186 when not secured.
AUDON (Bit 4) (Misc 0)
 The bit controls the activation of the beeper. When set, the
 ASIC will output a high level on the BEEPER PIN. This PIN is
 attached to a drive transistor on the communication board whose
 function is to activate the self-oscillating beeper.
CONT [0 . . . 5] (Misc 2)
 These bits set the viewing angle or contrast for the LCD.
KEYPTR [0 . . . 1] (Misc 3)
 These bits select which keyscan register is read when the
 PANRD3 register is accessed.

TABLE 10-continued

| PTR | 1 0 | Register |
|---|---|---|
| 0 0 | | Key scan and misc controls |
| 0 1 | | Audio volume |
| 1 0 | | Contrast setting |
| 1 1 | | Not used |

BK LITE[2 . . . 4] (Misc 3)
  These bits select the mode of operation for the backlite circuit.
SDI
  This status bit indicates the security state of the panel interface. When high, security has been breached.
PROG
  This status bit indicates panel buses mode of operation.
OBF IN
  This status bit reflects the state of the OBF handshaking line associated with the data port between the 80C186 and the DS5002. When high, the DS5002 has data available for the 80C186. When the DS5002 is not installed, this bit provides the return data path for information from the serial memory device on the low security board.
IBF IN
  This status bit reflects the state of the IBF handshaking line associated with the data port between the 80C186 and the DS5002. When high, the 80C186 has written data to the port.
T CAP
  This status bit reflects the state of the tamper capture register. This register is used when testing the tamper circuit on either the low level security board or the DS5002 security board. This register is cleared by the TCAP ENB bit in the panel control register.UARTs This section describes the six Universal Asynchronous Receiver/Transmitter (UART) channels within the ASIC. Each channel includes a transmit shifter, receive shifter, control registers, status register and baud rate generator. Data is transferred between RX and TX shifting functions independently. This gives each channel full and half duplex capabilities. All of the UARTs connect to the 80C186. Data exchanges can be managed with either interrupts or polled operations. Additionally, one UART can be programmed to transfer data using the 80C186's direct memory access (DMA).

Each UART is able to detect framing status, parity, and buffer overflow conditions on the data it has received. Status is collected on a per-character basis. For these channels, reading the holding register (16-bit wide) will clear the status flags.

UARTs 0,3–5 have transmit flow control which, when enabled and CTS inactive, will prevent the transmit shifter from loading data held in the TX holding register. Characters being shifted will not be affected by CTS inactivation. Disabling the transmitter will not truncate a character. The RTS enable in the control register is a general purpose control—it has no effect on the shifting circuitry.

UARTs (0,3,4,5) have a noise filter on the receive serial line. This 3-of-5 vote filter will prevent serial line noise glitches from starting a false character start bit.

The DMA function allows direct transfer of data between a holding register of UART 0 and memory. The DMA can only be attached to one shifter (80C186 programmable, either Tx or Rx buffer). This restricts DMA operations to half duplex exchanges only. DMA can support 8-bit and 16-bit wide transfers on the receive and transmit. If 8 bit transfers are executed on the receive, the per character status information is lost.

The DMA circuit has two compare registers which can be used to enable or disable data transfers based on serial data received. Only compare register 0 can adjust for frame size. With data compare enabled, the 8-bit values loaded into the register are compared against the data transferred into the Rx holding register. The DMA state machine looks for a match in the holding register only when the protocol bit is set. Once a match is found, all characters are transferred until another character with the protocol bit is found; at that point, character transfers are disabled and a DMA completion interrupt is generated. The DMA control bits are found in the upper byte of the secondary control register.

In the preferred embodiment, the UARTs are assigned the following channels:

| UART 0 | Tailgate/DCN | (DMA) Direct connect to Comm and PIN Pad core board |
|---|---|---|
| UART 1 | SCR Core | ASIC direct connection |
| UART 2 | SCR Comm | TDM connect to Comm board |
| UART 3 | Modem/AUX | TDM connect to Comm board |
| UART 4 | Pin Pad | TDM connect to Comm and PIN Pad board |
| UART 5 | Printer | TDM connect to Comm board |

The following data channels can be manually controlled through the TDM registers:

UART 1 Core SCR

UART 2 Comm SCR

UART 3 Modem/AUX

UART 4 PIN Pad

UART 5 Printer

The TDM output register, when selected to drive these lines, can place the associated UART output PIN in either a high or low state.

Fractional Divider/Baud Rate Generation

Three fractional dividers are supplied to create baud clocks for the Standard and Smart Card baud rates. The first fractional divider (0) is used to generate the base clock for the standard baud rates. Its output is brought into a divider to supply all the standard baud rates. The fractional divider should be programmed for the highest baud rate necessary. This configuration will allow all standard baud rates. The second fractional divider (1) is used to generate the baud rates for the core Smart Card UART (1). The third fractional divider (2) is used to generate the baud rates for the Comm module Smart Card UART (2). The outputs are used as the x16 clock for the UARTs.

The fractional divider has two registers: an 8-bit schedule and an 11-bit divider/fraction register. The divider value sets period of the output signal. The fraction value is the denominator of desired fraction. The values placed in the divider/fraction register are one less than the value intended. The schedule value indicates the numerator of the fraction.

At each Terminal Count (TC) of the fraction reg, the output waveform toggles and inserts an extra PCLK in the timing based on the schedule register. The bit pattern in the schedule register should be evenly dispersed.

The resulting output frequency follows the following formula:

$$F_{out} = \frac{F_{in} \cdot M_n}{M_n \cdot M_d + \sum Sched}$$

$Fin$ = Input Frequency = 12 Mhz $Mn$ = Fraction Denominator $Md$ = Divider $Sched$ = Sum of the Schedule bits The Fraction/Divider register bit definitions are:

| | | |
|---|---|---|
| 7:–0: | Divider Register | |
| | This is the whole number part of the divisor. Its value is one less than the intended value. | |
| 10:–8: | Fraction Register | |
| | The value placed in this register is one less than the denominator of the fraction part of the divisor. | |

The Schedule register bit definitions
7:-0: Schedule Register

The sum of set bits in this register is equal to the numerator of the fraction part of the divisor. The number of bits used by the scheduler circuit is equal to the denominator of the fraction. The bits are used from the least significant bit (LSB) on up. The set bits should be evenly spaced in the used bit locations. For example, To generate standard baud rates, an output of 115.2K*16=1843200 Hz. 12 Mhz/1843200=6.51. Therefore, Md=6 (divisor reg=6−1=5 d (5 h)). If ½ is used as the fraction, then Mn=2 (fraction reg=(denominator=2)−1=1). The schedule register needs 1 one-bit in the lower 2 locations (Sched=1), therefore, the schedule reg=xxxxxx01 (or xxxxxx10).

The resulting frequency is calculated as (12M*2)/(2*6+1)=1846154 with (1843200/1846154)*100=99.84% accuracy (0.16% error).

Common Values

FD0, Standard Baud Rates: div/frac=105 h, sched=01 h (0.16% error)

FD1, Smart Card Baud Rate: div/frac=505 h, sched=1 Fh (0.13% error)

CPU BIU

The CPU BIU is a circuit used to connect the 80C186 to its memory and I/O. The data path components translate the 16-bit processor bus to the 8-bit memories. This translation circuit includes a prefetch queue that fetches the contents of the next memory location when a code fetch bus cycle is executed. Since the memory interface is 8 bits, this queue provides close to 16 bit performance. I/O devices within the ASIC should only be accessed as 16 bit registers unless otherwise specified.

There are three different levels of performance delivered by the 80C186 processor. These levels are controlled by a combination of the processors internal wait state circuitry and the ASIC. The first level is established by the processors internal wait state generator. After reset, this circuit forces each bus cycle to have a minimum of 3 wait states. Performance will remain at this level until the application changes the setting of the processor chip select registers. Once disabled, the ASIC will control the length of the bus cycles. Table 11 listed below indicates the different cycle lengths for various 80C186 bus executions. Before enabling the ASIC mapper and que circuits, the processor chip select registers must be disabled from influencing bus cycle lengths.

TABLE 11

| | |
|---|---|
| I/O 8 bits | 0 wait states |
| I/O 16 bits | 0 wait states |
| Memory read 8 bits | 0 wait states (odd or even) |
| Memory read 16 bits | 2 wait states |
| Code fetch 8 bits | 0 wait states |
| Code fetch 16 bit queue match | 0 wait states |
| Code fetch 16 bit queue mismatch | 2 wait states |

It will take two cycles for the queue to fill after it has been enabled. Eight bit code fetches force the queue to purge. Refilling takes two cycles before a match can be made. Once the queue is enabled it cannot be disabled. DMA bus cycles operate under the same constraints as the listed CPU cycles.

MMU/Protection Selects

The memory management unit (MMU) provides programmable mapping of the CPU's 1 Megabyte (MB) logical address space to a 12 MB physical address space. The MMU is built around a programmable lookup table that is indexed by the upper 4 address lines from the processor. The contents of this table create the extended address and provide selections for the six devices connected to the eight bit memory bus. The extended addressing provides up to 2 MB of linear space for each of the six devices. From the 4 processor address lines, 16 table entries are created. Each entry provides 64K bytes of access to the device it selects and the extended address selects one of 32–64K segments in that device. The mapper has two of these programmable tables. They are selected through the map control register. From power up the MMU is disabled. While disabled, its outputs are forced to select only the boot FLASH device and provide access to its upper 64K segment. From power-up the mapper tables are undefined, prior to enabling the MMU, these tables must be initialized.

The MMU also provides protection tables that give the operating system the ability to lock areas of memory from write operations. These tables are also indexed by the upper 4 processor address lines. Like the mapping tables, there are two protection tables. The one select bit in the map control register selects both map and protection tables. Each bit in a table entry corresponds to one of 16–4k byte segments found in the indexed 64K space. When a protected area is written to, the MMU will generate a non-maskable interrupt (NMI) interrupt and block the write cycle from occurring. DMA operations are not affected by the protection circuit. These bus cycles can write into protected space without experiencing NMI interrupts or the failure to store information.

Table initialization takes place through independent I/O ports to the mapper and protection circuits. A table pointer is provided to index the 32 locations in each circuit. This pointer can be set to any one of the 32 table entries. Each write or read to the associated port will cause the pointer to advance. The next port access will be to the advanced location. Since this pointer is shared, the mapper and protection tables must be initialized independently. It would be fatal if an access to one table port was followed by an access to the other. The resulting condition could produce incorrect table information to be written. When the corrupt table is used, the processor will lose its execution sequence.

A Map Control Register controls operations of the MMU. The contents of this register are detailed in Table 12.

TABLE 12

MMU ENB (Bit 0)
  This bit is used to enable the memory management unit. Once set, the chip selects, write protection and extended address lines will activate as instructed by the contents of the MMU tables.
PTR LD (Bit 1)
  This bit is used to preset the initialization table pointer. A low to high transition on this bit will load the pointer with the PTR bits from this register. Setting the PTR bits and transitioning this bit can occur in the same output bus cycle. A hardware reset will clear this bit.
MAP SEL (Bit 2)
  This bit selects which of the two map and protection tables is used. Low selects PTR entries 0–15, high, select 16–31. The selected table is taken after this output cycle finishes. A hardware reset clears this bit.

TABLE 12-continued

QUEUE ENB (Bit 3)
    This bit enables the prefetch queue circuit. A hardware reset clears this bit. Once the Queue is enabled, only a hardware reset will turn it off.
PTR 0–4 (Bits 8–12)
    These bits specify the preset value to be loaded into the table pointer. See PTR LD bit description in this register.

Programmable Interrupt Controller (PIC)

The PIC is used to manage the interrupts presented to the 80C186. These sources include both maskable and non-maskable functions. The maskable interrupts are combined and passed through the PIC and to the appropriate IRQ input on the processor. Mask controls for these interrupts are located in the control registers for those particular functions. All non-maskable interrupts are maskable through the PIC's control register. The PIC does not provide any interrupt prioritization. Statusing both the maskable and non-maskable sources can be done through the two PIC status registers. These registers provide both latched and non-latched signaling for the NMI sources and, non-latched signaling for the non-maskable sources. Clearing a latched NMI source requires applying the appropriate mask. Keeping an NMI mask active will block that interrupts source.

Interrupts generated by the maskable outputs connect to the 80C186 IRQ0–3 lines. These signals will require the 80C186 interrupt controller be placed in level mode interrupt operation. To clear the interrupt line, the program must satisfy the source making the request. Refer to the appropriate section to determine how this is done. Besides the external interrupts from the ASIC, the 80C186 has the following internal interrupt sources to maintain.

Timer 0,1,2

These sources share a common interrupt controller channel but they vector to a unique handler location. The three timers share a common priority and mask. Each timer has an enable bit in its control register. In our design, these timers are for general purpose use.

DMA 0,1

The DMA controller can be programmed to interrupt the processor upon transfer count depletion. Each DMA circuit has its own interrupt channel with separate vector and mask bit. Within the DMA control register is an interrupt enable bit. The DMA terminal count interrupt is whenever a single byte is transferred by the Tailgate/DCN UART, or the max transfers have occurred while swiping a card.

Operations of the PIC are controlled through the PIC Control Register details of which are found in Table 13.

TABLE 13

PF ENB
    The power fail enable Will allow power fail interrupt to generate an NMI. Setting this bit will enable this source to generate an interrupt. The power fail capture enable bit (bit 7) must be set to first capture the power fail signal. Hardware reset clears this bit.
CSER ENB
    The Chip select enable allows a program access error to generate an NMI. A program access error is caused by the 80C186 accessing a page which the mapper has specified as inaccessible. The GNU bit in the mapper select table enables this protection. Setting this bit will enable this source to generate an interrupt. Hardware reset clears this bit.

TABLE 13-continued

WRER MSK
    The Write protection mask prevents a write protection error from generating an NMI. A write protection error is caused by the 80C186 writing to a mapper protected segment of memory. P0 . . . 15 in the mapper protection table selects this protection. Setting this bit will mask this source from generating an interrupt. Hardware reset sets this bit.
PF CAPTURE ENABLE
    The power fail capture enable allows the power fail signal to be captured. This bit must be set to allow the power fail capture and NMI circuit to be affected by the state of the power fail line.

Status of the various PIC operations can be accessed through a PIC Status register 0 and PIC Status Register 1

SCR Interface

This section describes the programmable interface and electrical support for the two smart card readers in the product. The core smart card reader, which is always available, is directly controlled by pins on the ASIC. The Comm smart card reader is also controlled by the ASIC, but it is remotely attached through the TDM interface. The Comm reader is only accessible when the TDM circuit is running. Both readers share common control and status registers and complement each other. Both readers are capable of supporting serial memory and microprocessor cards. The UARTs for these readers are not described in this section. Refer to the UART section for detailed description of their operation.

Serial Memory Cards

When working with serial memory cards, you must switch the interface to the manual operating mode. To program the SCR interface for manual operations, you must set the CMX bit in the SCR control register. When set, the constant clock source is blocked and the CKO bit setting is passed to the card clock PIN (note the CKO bit is also found in the register). To manually control the data line, the appropriate UART must be programmed to set or clear the output as necessary.

The UART output is gated by a transmit enable that is used to control data direction between the ASIC and the card. Controls for the UART line level can be found in the UART control register. When reading a bit from the card, the same UART receive line can be sampled. There is a status bit in the UART status register that reflects the state of the data line. When communicating with these cards, data is typically sent synchronously; that is, on one edge of the card clock new data is either issued or returned.

Microprocessor Cards

When compared to the serial memory cards, the microprocessor card has a much higher level of sophistication. These cards communicate with their host using somewhat standard asynchronous frame formats. Also, they require a free running clock to activate their internal processing mechanism. When selected, the ASIC provides the services necessary to interact with these cards. Selecting the fixed clocking mode (CMX in the SCR control register) will enable the free running clock source to the card. The associated UART provides all of the controls necessary for bi-directional communication, various frame formats, and automatic parity acknowledgment and retransmission.

This means that during transmission (Tx), the UART will check the state of the receive (Rx) line. If a low Tx/Rx line is detected, indicating the card detected a parity error, the UART will retransmit the char and interrupt the processor. If a high Tx/Rx line is detected, the UART will transfer the next char from the Tx buffer into the shift register and interrupt the processor. The advantage of this is that the UART is able to handle some of the low level error detection rather than passing this off to the processor. During Rx, if the UART receives a char with a parity error, the UART will enable the Tx driver and drive the line low. The received char is transferred to the Rx FIFO with a parity error indicated.

Card Detection

Each card acceptor has a card present contract that is brought into the ASIC to control the card power circuit and provide status to the 80C186. The status from this contact can be enabled as an interrupt source to the 80C186. Once enabled, an interrupt is generated when the card is removed from the acceptor. Likewise, the reset, clock and data lines are lowered, and the card power circuit is turned off (provided they are not already off). For the 80C186 to activate card power and enable the drive to the other contacts, it must debounce the present contact—making sure the card has come to rest in the acceptor (this is a polled operation). Once stable, power can be applied by setting the PWR bit in the SCR control register. This bit is an edge-sensitive enable; transitioning it from low to high will activate the power circuit. If the card is removed while this bit is set, power is forced off (with the bit remaining set). Power status can be qualified by reading the FLT and SW bits in the SCR status register.

Diagnosing the Card Acceptor

To assist in problem solving, each card contact can be read back through the ASIC. This includes the RST and CLK PINs which are normally only outputs. The FLT status from the card power circuit provides an indication of overcurrent, out of regulation, or thermal overload conditions. If the FLT was read low (when it should be high), it is important that the other card contacts are cleared immediately. Before activating any other card control, good power status should be read.

Operations of the core SCR can be controlled through a SCR Control register (SCRWR) which is detailed in Table 14.

TABLE 14

SCR1 CMX (Bit 0)
This bit selects the manual verses fixed clock mode to the card. When high, the fixed clock is output on the CLK PIN from the ASIC (remember, the clock will only be driven after card power is applied). When low, the CKO bit determines the level output from the CLK PIN. A hardware reset clears this bit.
SCR1 RSO (Bit 1)
This bit determines the reset level output on the ASIC RST PIN after power is enabled. If power is disabled, the ASIC RST PIN is low. A hardware reset clears this bit.
SCR1 PWR (Bit 2)
This bit controls the card power once the card contact has activated. A low to high transition on this bit will enable the card power supply. Because the card contact gates this bit, being high does not necessarily mean power is on. A hardware reset clears this bit.
CR1 CKO (Bit 3)
This bit specifies the level that is driven out of the ASIC CLK PIN when the CMX bit is set and power is enabled.
SCR1 IENB (Bit 4)
This bit is used to enable the interrupt from the card contact. When the card is removed, and this bit is set, the 80C186 is interrupted. A hardware reset will clear these bits.
SCR1 DWN (Bit 5)
This bit controls the clamp used to crowbar the card power supply. The clamping circuit improves the card inactivation time. When this bit is cleared, the clamp is on. Before enabling the power, make sure this bit is set. A hardware reset will clear this bit.

Status of the SCR can be obtained by accessing the SCR Primary Status Register and SCR secondary status register. The comm SCR control including the SCR/SAM multiplexing is controlled through the byte bus by the secondary ASIC 306 shown in FIG. 15.

DMA Control

There are two DMA channels within the 80C186 processor that will typically be used to transfer data between memory and the Tailgate/DCN serial channels and the MSR and memory. Operation of the 80C186 DMA channels requires programming both a source and destination address into their control registers. For memory to I/O transfers, this requires programming the I/O port address. These channels can also be used for memory to memory transfers.

ASIC ID

The ASIC will provide a unique ID for every revision it goes through. The 8 bits of identification are found in the Interrupt status register.

TDM Interface

The TDM serializer provides bit level data exchange between the core and communication boards. This serializer runs constantly when enabled to reconstruct the information being transferred. For the most part, the majority of this information is static. To better utilize the serializer's bandwidth, the frame has been sub-divided into three levels of performance. Listed below in Table 15 are the three levels and their associated hardware assignments. A visual representation of this 80 µs frame is shown in FIG. 16.

TABLE 15

| CH | OUT | IN |
|---|---|---|
| High speed frame 1.25 µs update rate | | |
| 0 | SCR2 TXD | SCR2 RXD |
| 1 | MOD TXD | MOD RXD |
| 2 | PP TXD | PP RXD |
| 3 | PRN TXD | PRN RXD |
| 4 | M SPEED SLOT | M SPEED SLOT |
| Medium speed slot (M speed) 10 µs update rate | | |
| 0 | SCR2 DIR | EXT1 INT |
| 1 | SCR2 CLK | SCR2 CLKIN |
| 2 | PRN RTS | PRN CTS |
| 3 | PP RTS | PP CTS |
| 4 | MOD TST | SCC INT |
| 5 | TBD1 | EXT INT |
| 6 | TBD2 | SCR2 SW |
| 7 | S SPEED SLOT | S SPEED SLOT |
| Slow speed slot (S speed) 80 µs update rate | | |
| 0 | SCR2 PWR | SCR2 FAULT |
| 1 | SCR2 CLKMX | RTC DIN |
| 2 | MOD TALK | MOD IN-USE |
| 3 | TBD3 | PRN PAPER |
| 4 | SCR RST0 | SCR2 RSTI |
| 5 | RTC CLK | AUX DSR |
| 6 | RTC RST | EXT2 INT |
| 7 | RTC DOUT | EXT3 INT |

It should be noted that frame update rates are based on a 4 MHz serialization clock rate and would be different if the clock rate were changed.

The top level services devices that have the highest switching rate. Within the highest level, one of its time slots is assigned to the medium level attachments. For every pass through the high level, one medium bit is transferred. Likewise the medium level has one bit assigned to the lowest level. After all high, medium and low level bits have been sent, one frame pulse is generated.

Once the TDM is enabled, it will take time to frame periods before data starts updating at the receiving end. This delay should eliminate spurious data from entering the hardware attached to the TDM registers.

At power up, the TDM port is disabled. It should remain disabled until the core application has determined the type of device it is attached to. This can be done by reading the TDM status register and branching on the setting of the TINO input. If this input is high, the device attached has the TDM circuitry and TDM port can be enabled If the input is low, the TDM port must remain inactive. Without the TDM port, the Core directly drives two of its UARTs out over the TDM signals.

Operations of the TDM bus can be controlled through TDM Control Register which is further detailed in Table 16 and a second TDM Control register detailed in Table 17.

The comm module detects an incoming frame by the reception of the sync field. The pattern of this field is unique to the high level idle state of the bus. The frame bit assignments are as follows:

| | |
|---|---|
| CORE SYNC | 8 |
| CORE ADD | 6 |
| CORE CMD | 2 |
| CORE DATA | 8 |
| CORE CHECK | 8 |

TABLE 16

CTL0 (Bit 0)
    This bit can be used as a general purpose output when the TDM is disabled and the MODE and TDM ENB bits are low. The ASIC TCLK PIN follows the setting of the bit. A hardware reset clears this bit.
MODE, TDM ENB (Bit 1, 2)
    The following defines the function of these two bits. A hardware reset clears both of them.

| Function | MODE bit | TDM ENB bit | FRAME PIN | TCLK PIN | BBD PIN | TDMI PIN | TDM0 PIN |
|---|---|---|---|---|---|---|---|
| Man out | 0 | 0 | CTL1 | CTL0 | PRN RXD | SCR2 TXD | SCR2 RXD |
| Input | 0 | 1 | pulldown | pulldown | PRN RXD | SCR2 TXD | SCR2 RXD |
| TDM | 1 | 1 | 0 | 0 | 0 | 0 | 0 |
| TDM | 1 | 0 | FRAME pulse | TCLK pulse | BBD | TDMI | TDMO |

MOD TLK (Bit 3)
    Modem talk control.
RTC CLK (Bit 4)
    Real Time Clock. On the slave/secondary ASIC, this signal is used to clock data into an out of the RTC. Data is input to the RTC on the rising edge of this control. Data is output from the RTC on the failing edge.
RTC RST (Bit 5)
    Real Time Clock reset. This signal resets and initializes the RTC. When low the RTC is reset and it will ignore all other control inputs.
RTC DOUT (Bit 6)
    Real Time Clock data out. This open collector signal presents data to the RTC. When low, a low is seen on the RTC bi-directional data PIN. When high, the data PIN is pulled up by a resistor. Data written to the RTC must be presented before the RTC CLK is raised.
CTL1 (Bit 7)
    General purpose output. This control is output only able when the MODE setting low.
MOD TST (Bit 8)
    Modem Test control.

Status of the TDM can be obtained from a TDM status register and a TDM Status register.

TABLE 17

ENB SCC, IPTR, EXT1-3
    These controls are used to enable the interrupts from their applicable source. When set, the interrupts are passed through to the processor. A hardware reset will clear these bits.

Byte Bus

The byte bus is a clocked bi-directional interface used to send high level command and status information between the core and Comm modules. All bus operations through this port are initiated by the core. A bus cycle begins by the core transmitting to the comm module. As part of this cycle the comm module returns a response. The bus cycle is made up of 55 clocks. These clocks are associated with 32 bits of information transmitted by the core. 18 of the bits are returned by the comm, and 5 bits are for line coordination.

-continued

| | |
|---|---|
| LINE CONDITION | 2 |
| LINE TURNAROUND | 2 |
| COMM READY | 1 |
| COMM TX Error | 1 |
| COMM DATA | 8 |
| COMM CHECK | 8 |
| LINE TRI-STATE | 1 |

The definition of these bit assignments is detailed in Table 18.

TABLE 18

CORE SYNC
    The sync field is used to enable the comm receiver to the incoming frame information. This pattern is equivalent to a 81H.

TABLE 18-continued

CORE ADD
 The address field is used to select a byte bus peripheral.
 This field can address up to eight devices.
CORE COMD
 The command field identifies the type of I/O operation that the
 selected peripheral is to perform.
CORE DATA
 The data field transfers data to the selected device.
CORE CHECK
 The core check character is an 8-bit CRC used to validate the
 data sent by the core. This check character is matched by the
 command returned as a communication transmission error if it is
 incorrect. This error code is returned in the same bus cycle.
LINE CONDITION
 The line conditioning bits force the level of the bi-
 directional line to a high state. This conditioning overcomes
 a possible low level float state left by the check character
 output. Once the line conditioning bits have been issued, the
 pull-up on the bus will keep the line at a high level.
 Conditioning is necessary since a constant high returned by the
 comm module will generate error (check character failure). If
 the line were left to float up, it might not return high by the
 beginning of the comm module's response.
LINE TURNAROUND
 These bits are used as padding to allow the core transmitter to
 turn off and the comm transmitter to turn on. During this
 interval, the information on the bus is invalid.
COMM READY
 This bit indicates the comm ASIC is ready for another
 transaction.
COMM TX ERROR
 This bit informs the core that the transmission just sent did
 not validate correctly. Before acting on this setting. The
 comm check character must be validated. If the check character
 is good, the value of this bit can be used; if bad, the entire
 operation is in question.
COMM DATA
 Data returned by the comm is in response to either the prior
 command or the general status. A valid check character must be
 received before this information can be used.
COMM CHECK
 The comm check character is an 8-bit CRC used to validate the
 response from the comm module. If this check fails, a system
 error response should be issued to the operator. Any attempt
 to recover from this error should assume that the last command
 issued did not execute correctly. Recovery includes issuing a
 soft reset command to the interface.
LINE TRI-STATE
 This is the end state to a bus cycle The comm module will
 release its drive on the bus. The core is able to start a bus
 cycle whenever the bus is not busy.

For a device in the comm module to request service one of the four TDM interrupt sources can be programmed to interrupt the core processor. This interrupt request is transferred through the TDM port. In response, the main PCB will have to query the comm peripheral to determine its needs. The comm module cannot initiate a byte bus cycle directly.

The byte bus interface is a single 16-bit read/write port within the 186's I/O space. It is used to access byte wide peripherals within the communications module. A byte bus transmission is initiated by the processor writing to the byte bus I/O port. A complete write or read cycle to or from a peripheral is executed within the byte bus cycle. The byte bus front end has a five deep command first in first out (FIFO) buffer for queuing up Byte Bus instructions. This FIFO should be used only for consecutive writes to byte bus peripherals. The byte bus port is defined as follows in Table 19.

TABLE 19

| Byte | Description |
|---|---|
| | WRITE - Control port |
| 15–10 | Peripheral Address: A5–A0 |
| 9, 8 | Byte Bus Command: read, write or reset |
| 7–0 | Byte Bus Data: Data to be written to a byte bus peripheral. |
| | READ - Status port |
| 12 | Tx FIFO full: The five deep FIFO is full and cannot accept additional commands. |
| 11 | Byte Bus Idle: The byte bus cycle is complete. Data has been written or can be read. |
| 10 | CRC error: The CRC check failed on the packet received from the communication module. The returned data is invalid. |
| 9 | Tx error: The communication module reports a CRC failure on the packet received from the core module. No Byte Bus peripheral cycle was executed. |
| 8 | RFU: |
| 7–0 | Data: Data returned from a byte bus peripheral. |

Magnetic Stripe Reader

The magnetic card reader 68 is preferably a swipe style magnetic card reader capable of reading cards encoded with data conforming to ISO 7811-4 for IATA (Track 1, 210 BPI) and ABA (Track 2, 75 BPI) tracks, and ISO 7811-5 for the THRIFT track (Track 3, 210 BPI) . Of the tracks listed, only two can be installed in a product. Configurations are: Tracks 1 & 2; and Tracks 2 & 3.

Software and hardware will preferably support card swipe speeds between 5 and 45 inches per second. The reader life is roughly 300,000 passes. The only ongoing maintenance required is periodic head cleaning to remove oxide buildup. If a card is put in on top of the magstripe head, the head will not be damaged and will still read future cards reliably. The reader will also preferably have the ability to read high coercivity magstripe cards.

IC Card Reader

The system/terminal can preferably have up to two IC card readers. The Core unit 30 will preferably always have the card reader 80. The second reader 130 can optionally be added to the communication module 100. Both card readers 80 and 130 will conform to the ISO 7816 specification. Card clocking is set by the ASIC or manually clocked by the microprocessor of the main board 46. Communication data rates are adjustable to conform to the clock rate. For most microprocessor cards, serial data is exchanged using a typical asynchronous 10 or 11 bit format with parity. Detection of improper parity is done by the hardware. If a parity error is detected, the hardware can be configured to re-transmit the same data. To ensure glitch free operations, all driven card contacts are switched using a common clock source. The affected signals are the power, clock, data and reset. To power the card, the interface uses a disable-able linear regulator. This regulator maintains a constant voltage to the card and, at the same time, it checks for error conditions. These conditions include overvoltage and undervoltage, over current and over temperature. A fault detected by the regulator is returned to the microprocessor.

Each card acceptor has a card insert contact. This contact must be made before power can be applied to the card. If this contact is broken while the card is powered, the hardware will immediately turn off all driven card contacts including the linear regulator. For diagnostic purposes, all driven contacts can be readback. This permits detection of foreign materials placed into the terminal. Since the two card readers are independent, different card types can be read simultaneously. Both card readers expect CR80 card form factors.

The embodiment of the POS terminal shown herein includes a standard type of smart card reader, with a second smart card reader option on the communication modules. These smart card readers are preferably contact readers which do not read contactless cards. The standard smart card reader is located at the front of the core unit for easy card insertion by the operator. The standard IC card reader has a life of preferably about 200,000 inserts, while the second IC card reader has a life of preferably about 10,000 inserts. The standard card reader will accept the following card specifications: Microprocessor cards (Contact, ISO position, T=0, T=1, meets Europay/MasterCard/Visa (EMV) specifications) and Serial memory cards. Preferably, the smart card reader will read a number of serial memory cards, including the following: GemPlus 416, Thompson ST1305 (without VPP), GemPlus GPM896, and Siemens E2PROM serial memory cards.

The 2and smart card reader will accept the same microprocessor and serial memory cards specified for the standard smart card reader. Preferably both the smart card readers have a slight card securing mechanism (so the card does not fall out or terminate transaction when the POS terminal is bumped) and has a perceived "click" so customer knows his card is inserted properly. It is a half insert reader with the card visible at all times. It preferably includes error handling software (following EMV and 7816 specifications) . The POS terminal will withstand a drop from 48 inches onto the card when card is inserted into POS terminal. The reader has card power management according to the EMV specification. The card can be removed by a consumer without special tools if power is lost.

The optional 2and smart card reader is located on the bottom of the communication module. This will read a standard size card. There is an optional security door that covers this reader. This will be used by merchants who do not want the 2and smart card reader accessible by consumers. The door can only be opened by inserting the tip of a smart card into a small hole next to the reader. When both smart card readers are installed, they can be read "simultaneously" with non-multiplexed ports. Additionally, the 2and SCR can also hold a plurality of SAMs which are multiplexed to a UART through the byte bus and TDM bus.

Printer

The printer 108 is a user installable module that can be optionally attached to the rear of the Communications module 100. Although the printer 108 can employ a variety of conventional printing techniques such as dot matrix or laser printing, it is preferred for the printing process to be done thermally. In the preferred embodiment, printed receipts exit the module's enclosure from the top of the unit. A serrated tear bar, built into the printer enclosure, will assist in removing forms. Within the printer module 108 is the printing mechanism, printer drive circuit board, and a paper roll. The enclosure is designed around a two piece ABS plastic assembly. There is space within the enclosure for a 2-inch paper roll.

Motor and print head controls, as well as temperature sensors, are part of the printer PCB. The comm board 126 has the control circuits that advance the motors and activate and regulate the print dot thermal process. Power for the printer comes from the communication module 100. The printer PCB and comm board 126 are connected through a card edge connector 110. If the printer mechanism fails while it is printing, it can be removed without causing damage to either the control or communication boards.

The printing process is preferably done one vertical column of eight bits at a time. The activation and timing of this process is managed by the secondary/slave ASIC 306 on the Communication (or Comm) board 126. When a row of dots requires printing, the secondary ASIC serially shifts the necessary data into the printer module print head and turns on the print head power. The activation time varies based on prior bit activity and the print head and ambient temperature measurements. Upon completion, the print power is turned off and the secondary ASIC advances the head to the next column. This sequence continues until an entire row has been printed. At the end of a row, the paper is advanced and the printing process continues in the reverse direction.

The microprocessor of the core PCB 46 is involved with issuing data to be printed and head activation duration. It also controls head and platen advancement by clocking the stepper motor drive circuits on the printer control board. The temperature measurements are sent back to the core microprocessor as well as a head home sensor. In the embodiment shown, there will be two paper roll options. The small paper roll option is 82 feet long and will print approximately 125 receipts (assumes 2 copies of each receipt). The large paper roll option is about twice as long and should print approximately 250 receipts. They both have the same 2¼" width paper. To fit each size paper, there are two paper roll cover options. These snap on easily for replacement purposes.

Since this is a thermal printer which can only print on one ply paper, a second receipt copy will need to be printed for the customer copy. The paper feed capability will be handled through software. The typical duty cycle will be a 40 line receipt (a 20 line receipt printed twice for a customer and merchant copy).

In environments needing higher speed or other printing functionality, an external printer can connected through an RS232 port. In this case, the integrated printer need not be present. The POS Terminal might also include a high speed integrated printer.

Memory

The POS terminal memory is made up of a combination of both static random access memory (SRAM) and Flash. SRAM is generally used for data that changes (ie. batch data, negative files, application working space). Flash memory is generally used for the application code and operating system. This is done for performance reasons—Flash is fine when reading data, but slower than SRAM when changing data. Flash is less expensive than SRAM, which is why it is preferred for constant data.

Since the operating system is in SRAM or flash memory, it can be downloaded to a POS terminal remotely, without having to physically replace EPROM chips. In one embodiment, the operating system is approximately 128K in size, with the remaining memory available for applications and data.

Memory can be configured to meet specific application requirements. This configurable memory is in addition to the memory present in the core PCB. In one embodiment, memory is expandable up to 3.7 MB. For the unbonded POS terminals, memory upgrades can be done by service technicians in a depot environment. For bonded POS terminals, the POS terminals must be sent back to the factory (or service locations if they have bonding equipment).

Circuit Features

In the preferred embodiment, an audio transducer allows for an audible beep, activated through software control and used mainly for error conditions. This is not a full speaker with multiple tones for use in modem communications. An external speaker attachment might also be used. A real time clock and battery is used in all communication modules except the PIN pad module.

Connectivity

A local area network (LAN) capability allows connection of several devices in a multi-LAN environment. The POS Terminal might be used in a peer to peer LAN. The terminal will be able to handle either positive or negative polarity. In one embodiment, up to 31 devices can be connected within 3,000 feet of cable. Peripherals supported include external PIN pad, external printer, check reader, bar code reader, and signature capture device. The peripherals are preferably connected through a RS232 serial interface. The POS terminal will support connectivity to the IBM 4683 ECR through either a RS232 or RS485 (high speed tailgate) interface. It will attach to other ECRs, such as NCR 2127, through a standard RS232 interface.

The POS terminal will support two types of ECR connectivity. In semi-integration connectivity the sale amount is transferred from the ECR to eliminate duplication entry on the POS terminal. The receipt information is also sent to the ECR for printing. The terminal still handles all EFT communication. With total integration connectivity, the ECR handles EFT communication to the host. The POS Terminal simply handles customer data entry functions, such as card acceptance, confirmation of amount, and PIN entry.

The PIN pad version will be able to support an RS232 ECR connection and RS485 LAN connection at the same time. This will allow the ECR to send transaction data directly to the PIN pad, which processes the data, sends it off to the host via the LAN, and returns a response back to the ECR. A "Y" cable with power pack might be used for this purpose.

ECR interface will be available for various Models of ECRs including the IBM 4680, the NCR 2127, etc. The POS terminal PIN pad will emulate the NCR 4430 PIN pad. In one embodiment, it will emulate 12 of the total commands available on the 4430, which are the most common PIN pad functions.

A Multiple Emulation PIN Pad Application (MEPPA) interface is also available. This includes both the Visa command set for DUKPT and the extended command set for Master Key Session Key. This emulation will allow the POS Terminal PIN pad to connect to various existing terminals. Visa is also a common protocol used to communicate with RS232 "PC type" ECRs.

Modularity

The user or merchant should be able to attach and disconnect the integrated printer and battery pack without needing a service technician. A service technician will be needed to attach/disconnect the communication modules or add memory using special handling techniques. If the unit is bonded, the unit cannot be disconnected and must be sent back to the factory for upgrades or repairs. Also, through a service contact, the modular pieces of the OS can be updated through a remote communication link.

Telecommunications

The standard modem on the communication module supports asynchronous communication. The enhanced communication module supports synchronous communication. The base modem handles at least 2400 baud, with fallback ability to communicate at 300/1200. A typical 256K application should be able to be remotely downloaded at 2400 bps within 15 minutes.

Processor

One embodiment of the POS terminal core unit has a 80C186 processor which runs at 12 MegaHertz (MHz). It has the capability of performing DES/RSA encryption and has tamper detection and bonding (PIN pad only) options. There is also a high security version of the core unit, which in one embodiment has a Dallas 5002 secure chip in addition to the 80C186 processor. This might be used for environments where very high security is required, such as PIN encryption in Canada and some parts of Europe. This version will generally have tamper detection and be bonded for tamper evidence.

Agency Certifications

This POS Terminal will preferably be certifiable to meet the following standards:

Safety

UL 1950 Listed (U.S.)

C22.2, No. 950 (Canada)

TUV EN 60950 (European)

Electromagnetic Compatibility

"CE" Mark (European)

Telco

Terminal hardware shall be designed to be registered under the rules for devices connecting to the public switched telephone network in the U.S., Canada, and other countries as required (Canada-IC CS03 for auto dial, IC CS02 for leased line and U.S.-FCC Part 68). A surge protector is recommended to protect against lightning strikes in areas prone to this.

Operating System

In the preferred embodiment, the operating system is characterized by multi-tasking available at the application level, a flexible development environment with Unix-like interfaces and support for C language applications. Multiple applications will be supported in the same terminal. The different applications can be downloaded separately and are protected from each other. The operating system supports interchangability of terminals on the LAN.

The workstation will be designed to remember its last default settings—address, printer, other peripherals, etc. On power up, the terminal is designed to auto-install and configure from the gateway. Memory overwrite protection on 4K maps for static RAM is included.

The operating system (OS) consists of a set of objects. Each object is a sub-system of the OS. For example, a particular DISPLAY or a download protocol are objects. Furthermore, each object performs OS work through member functions (alternately just functions). A member function is an operation on an object: for example, read( sc_CARD,.) is a member function that reads data from the selected sc_CARD object.

This approach allows various operating system models to be built with different objects to fit within the same memory constraint. Alternately, several memory constants can be defined to allow families of operating system models. For example, four OS models (one family) can be created that act the same except for different download protocols, as well as another two models (a second family) that act the same except one model can download with either protocol A or B, and the other with either protocol C or D.

The preferred embodiment OS includes the following identified classes of OS objects:

---

Input/output devices
  keyboard
  display
  tone
  clock calendar
  ms_card
  sc_card
  modem I/O

```
    serial I/O
    printer
    communication layer (e.g., network interface card (NIC))
    debugger
    diagnostics
    downloader and protocol
    OS kernel.
    user interface (e.g., director)
```

Each particular class of objects may have one or more objects; for example, there may be two display objects because there are two different types of display hardware. Even with this difference, there can be some functions that are the same for similar objects.

Other benefits accrue with this object approach. For those familiar with the Object-Oriented methodology, encapsulation occurs as a by-product. Encapsulation hides the internal workings and data from other object. It permits access only through well defined external operations, i.e., member functions. Encapsulation reduces coupling, and hence increases reliability.

Besides previous definitions for objects, classes, and member functions, two other terms are defined, including interface and vectoring:

Interface is the code and data structures set in place to transfer to an OS object from the application or another OS object, as well as return to original caller.

Vectoring is one means of transferring control. Vectoring uses addresses pre-stored in the interrupt vector locations starting at location zero. Vectoring OS accesses an address with a jump (JMP) instruction for performance reasons, rather than an interrupt (INT) instruction.

Also defined are two data structures, ObjectTable and FctTable

The ObjectTable is an array of far pointers located in the OS data area. Each far pointer is the starting address an OS object, which consists mostly of an object's member functions. The OS object's starting address is obtained by indexing into the ObjectTable, using the object index (which is usually set to a multiple of four for indexing far pointers). To make error checking easier, far pointers to a dummy object, which always return SYSERR, are stored in the ObjectTable for non-existent objects.

A FctTable data structure is an array of near pointers located within each object. Each near pointer is the offset of one of the OS object's member function. The member function's starting address is obtained by indexing into the FctTable, using the function index (which is usually set to a multiple of two for indexing near pointers). To make error checking easier, near pointers to a dummy function, which always return SYSERR, are stored in the FctTable for non-existent member functions.

Two types of calls within the OS can be done: intra-object and inter-object calls. Intra-object calls are calls within the same object and are translated as near (16 bit) calls.

Inter-object calls are calls from one object to a different object. Since each object will be linked separately, access to other object's member functions can not be done at link time. Instead, they will be dynamically linked by vectoring to an OS function (and returning back to the preceding OS function). This is accomplished as follows:

1. OS Code→OS Stub Function

The OS code first pushes any parameters on the stack. Then it calls the "OS stub function". For example, there could be a wait( ) or read( ) OS function called:

```
    call            _wait
    call            _read
```

2. OS Stub Function→Function Table Jump Code

The OS stub function, representing the OS function, is linked into the first object's space with the OS library, os_fcts.lib to satisfy the linker. On entry, a register is first set to the index member function index.

There are two cases depending whether the OS call is for device input/output or not. If it not a device input/output call, the object index is used as is. If it is a device input/output call, the first parameter (the device descriptor number) becomes the object index. Then the address of the OS object is determined by indexing into the ObjectTable with the object index (modified for far pointer indexing, that is, multiplied by four). In both cases, control transfers to the function table jump code.

```
Case (2a) non-device input/output:

_wait proc;
        mov         ax, OFCT_INDEX_FOR_wait * 2;
        jmp         ObjectTable+(OBJ_INDEX_FOR_os *4)];
    _wait endp;
Case (2b) device input/output:

_read proc;
        mov         as, OFCT_INDEX_FOR_read *2;
        jmp         go_io;
    _read endp;
    go_io proc;
        mov         bx, sp;
        mov         bx, word ptr ss:[bx+4];
        shl         bx, 2;
        jmp         ObjectTable[bx];
    go_io proc;
```

3. Function Table Jump Code→Actual OS Function

The function table jump code transfers to the actual OS function by using the member function index into the object's FctTable. The function table jump code is required to be at the start of each object, followed by its FctTable containing near pointers (offsets) to every externalized member function. This implies that all member functions of an object are contained in one segment (64K maximum). The function table jump code is:

mov bx, ax;

jmp word ptr cs:[FctTable+bx];

4. Actual OS Function→OS Code

The actual OS function is executed. Then the actual OS function returns to the previous OS code, which resumes by popping any parameters off the stack.

The interface of vectoring to an OS function from an application (and returning back to the application) is discussed below in reference to Table 6.

TABLE 6

Application to OS Interface Example: read( CARD, .. )

```
                    |==============================|
                    |                              |
                    |------------------------------|
    ------------    | return status;               |
   |                | ...                          |
   |                | ...                          |
   |   F012:3456    | int card_read( CARD ...)     |<------------
   |                |------------------------------|             |
   |                | ...                          |             |
   |                | ...                          |             |
   |                |------------------------------|             |
   |   F012:0013    | 7-Write()    Offset = xxxx   |             |
   |                |------------------------------|             |
   |   F012:0011    | 6-Read()     Offset = 3456   |             |
   |                |------------------------------|             |
   |                | ...                          |             |
   |                |------------------------------|             |
   |   F012:0007    | 1-Control() Offset = xxxx    |             |
   |                |------------------------------|             |
   |   F012:0005    | 0-Close()    Offset = xxxx   | FctTable[0] |
   |                |------------------------------|             |
   |                | Card-    jmp cs:[FctTable+bx]|-------------
   |   F012:0000    | Object:  mov ax, bx          |<------------
   |                |------------------------------|             |
   v                | OS ROM code and constants    |             |
------------        |==============================|            --
-----------
|ApToOsExit|
|ApToOsEntry|
------------                                                     -
------------        | ...                          |
   |                |                              |             ^
   |                | ...                          |             |
   |                |------------------------------|             |
   |                |       jmp  es:[OFctVecNbr*4] |-------------
   |                |       mov  es, dx            |
   |                |       xor  dx, dx            |
   |                |       mov  ax, OFctIndex*2   |
   |                |       mov  bx, OIndex*4      |
   |                | _read  proc                  |<------------
   |                |------------------------------|             |
   |                | ...                          |             |
   |                | ...                          |             |
   ------------>    |                              |             |
   |                | read(ms_CARD, ...)=>call _read|-------------
   |                | ...                          |
   |                | ...                          |
   App Start        | Application code and data    |
                    |==============================|
                    | ...                          |
                    | ...                          |
                    |------------------------------|
      0070:1010     | 4-ms_CardObject = F012:0000  |
                    |------------------------------|
                    | ...                          |
                    |------------------------------|
      0070:1004     | 1-DisplayObject  = xxxx:xxxx |
                    |------------------------------|
      0070:1000     | 0-KeyboardObject = xxxx:xxxx | ObjectTable[0]
                    |------------------------------|
                    | ...                          |
      0000:0000     |    OS data area              |
                    |==============================|
```

Table 6 shows a preferred method for the application to OS interface, which is used in conjunction with the following steps.

1. Application Code→Application Stub Function

The application code first pushes any parameters on the stack. Then it calls the "application stub function". The application code is:

call _read

2. Application Stub Function→ApToOsEntry

The application stub function, representing the OS function, is linked into application space via the application library, app.lib. Indexes to the object and member functions are passed via registers and control is given to the common entry, ApToOsEntry, of the operating system with an interrupt vector. A far indirect jump instruction (with some allied code) is used for performance, rather than an actual vectored interrupt instruction (INT OFctVectorNbr). The code is:

```
__OsFunction proc;
        mov         bx, OINDEX_FOR_object * 4;
        mov         ax, OFCT_INDEX_FOR_function * 2;
        xor         dx, dx;
        mov         es, dx;
        jmp         es:[OFctVectorNbr * 4];
__OsFunction endp;
```

The interrupt vector address (OFctVectorNbr*4), set at terminal start up, transfers control to the operating system at its common entry, ApToOsEntry.

3. ApToOsEntry→Function Table Jump Code

ApToOsEntry is the common entry into the operating system. Its module file also contains the common exit. This single point design permits different hardware application/OS modes, as well as easier implementation of certain debugging techniques.

The responsibility of ApToOsEntry is to give control to the proper OS function. Table 7 shows sample ApToOsEntry code in the C programming language. It will be appreciated by those skilled in the art that assembly code could be used for improved performance.

This 'c' code is designed to accomplish several tasks. First, if the object is an input\output device, the caller's first parameter (the device descriptor number) is used as the actual object number, unless the device number is illegal. In this case, return is made to the application caller with error; otherwise the object number is converted to a far pointer index.

Next, the application caller's return address is saved in the process table (proctab) entry corresponding to the current OS process; and the caller's return address on the stack is overlaid by the common exit address, ApToOsExit, in order to regain control after the OS function completes.

Then the address of the OS object is determined by indexing into the ObjectTable, using the object index (modified for far pointer indexing, that is, multiplied by four). Finally, control transfers to the function table jump code.

4. Function Table Jump Code→Actual OS Function

The function table jump code transfer to the actual OS function by using the member function index with the object's FctTable. The function table jump code is required to be at the start of an object, follow by its FctTable containing near pointers (offsets) to every externalized member function. This implies that all member functions of an object are contained in one segment (64K maximum). The code is:

TABLE 7

```
//-----------------------------------------------------------------------
//   ApToOsEntry - Application to OS vector entry to call a object member fct.
//-----------------------------------------------------------------------
int huge ApToOsEntry
{           //CAUTION: assumes registers bp, si, di, & ds pushed by prolog code.
    Uint    IODeviceOIndex)             // If io call, object/dev idx/no.
{
Uint    OIndex = _BX;                   // Passed in as far pointer idx.
Uint    FIndex = _AX;                   // Passed in as near pointer idx.
    // ----------------------------------------------------------------
    //  Get actual object index if object is an i/o device.
    // ----------------------------------------------------------------
    if ( OIndex == 0 )
    {
        if ( IODeviceOIndex >= MAX_OBJECTS )
        {
            goto exit;                  // Device object does not exist.
        }
        OIndex = IODeviceOIndex * sizeof(void far *);
    }
    // ----------------------------------------------------------------
    // Save caller's return in its proctab entry & set to return back here.
    // ----------------------------------------------------------------
    proctab[currpid].paddr  = *StackVoidPtr(2);
    *StackVoidPtr(2)        = OsToApExit;
    // ----------------------------------------------------------------
    // Restore regs, push address and goto object's function table jump code.
    // ----------------------------------------------------------------
    asm { pop dx; pop di; pop si; pop bp };
    *StackVoidPtr(0) = ObjectTable[OIndex / sizeof(void far *)];
    asm { mov ds, dx; mov ax, FIndex; ret };
exit:                   // Error: device object does not exist; return with error.
    return SYSERR;
}
// ----------------------------------------------------------------
// OsToApExit - Return to application caller after an OS call.
//
// On entry and exit, the stack (ss:sp) points to caller's first parameter.
// ----------------------------------------------------------------
static void huge OsToApExit( void )
{           //CAUTION: assumes registers bp, si, di, & ds pushed by prolog code.
    asm { pop dx; pop di; pop si; pop bp };
    *StackVoidPtr(2) = proctab[currpid].paddr;
    asm { mov ds, dx; ret };
}
``` mov bx, ax;

jmp word ptr cs:[FctTable+bx];

5. Actual OS Function→ApToOsExit

The actual is OS function is executed. When it exits, it returns to ApToOsExit.

6. ApToOsExit→Application Code

ApToOsExit does any final bookkeeping processing. Then ApToOsExit returns to the application, which resumes by popping any parameters off the stack.

Diagnostics

In the preferred embodiment, three levels of diagnostics will be provided:

1. At power up, the operating system will automatically perform a series of diagnostics such as checking RAM, ROM, processor and configuration.
2. Diagnostics will be available from the director menu for the operator to access when needed. This will include diagnostics such as gathering statistics, keypad test, and checking for security keys.
3. Several applications will also be available for service and manufacturing personnel to load for advanced diagnostic tests and troubleshooting.

Software Libraries and Tools

The POS Terminal preferably uses "off the shelf" PC based tools such as:

Borland C++ compiler

Paradigm debugger

Together C++ design tool

Extensive library routines, objects, and utilities are available that make the new terminal "easy to program". Software development kits will be provided for application software development.

Smart card drivers will be utilized for various types of smart cards such as EMV, MPCOS, PCOS, and SCOS cards.

An OS application has the following system functions available. The OS functions include the system calls for the XINU functions and OS supplemental functions, as well as OS application library functions. The OS functions are grouped functionally with a brief description, and later some of the particularly interesting ones are listed again with a detailed description.

The I/O functions are: close, control, getc, getcwait, init, open, putc, read, and write. Note that a unique subset of these functions is meaningful for each device. For example, associating the getc (get a character) function with the keyboard is meaningful, whereas associating the putc (put a character) function with the keyboard is not.

The OS supplemental functions provide further functionality for the application and the OS Director, such as date/time, downloading, and miscellaneous features.

Unlike the other OS functions, the OS application library functions, if used, will have their code linked into the application space. To access these functions, the application programmer links the OS application library with the application.

Other application library functions, such as RAM Disk and Indexed Files, are also available for linking with application programs.

OS Input/Output System Calls

| | |
|---|---|
| close | Device independent close routine. |
| control | Device independent control routine. |
| fgetc | Get character from a device (same as getc). |
| fputc | Put a character to a device (same as putc). |
| getc | Device independent character input routine. |
| getchar | Get character from the keyboard device. |
| getcwait | Device independent character input routine with timeout. |
| open | Device independent open routine. |
| putc | Device independent character output routine. |
| putchar | Put a character to the display device. |
| read | Device independent input routine. |
| write | Device independent output routine. |

Network Interface Circuitry Data Link Calls

| | |
|---|---|
| nic_close | De-registers a higher level protocol from NIC data link layer. |
| nic_control | Change parameters or clear statistics of a NIC physical device. |
| nic_count | Check the number of packets waiting at a NIC message type. |
| nic_create | Initializes the NIC variables and creates NIC processes. |
| nic_delete | Removes NIC support from the given device. |
| nic_freebuf | Return packet to the NIC buffer pool. |
| nic_getbuf | Get a buffer from the NIC buffer pool. |
| nic_open | Registers a higher level protocol handler with the NIC data link layer. |
| nic_read | Read a packet from a message type of a NIC message type. |
| nic_write | Sends a packet to the NIC process and waits for a response. |

OS Process System Calls

| | |
|---|---|
| add_stack_space | Add system heap space for application process stacks. |
| chprio | Change the priority of a process. |
| create | Create a new process. The process stack size, ssize, must be at least 256 bytes. |
| getpid | Return the process ID of the process currently running. |
| getprio | Return the scheduling priority of a given process. |
| kill | Terminate a process. |
| resume | Resume a suspended process. |
| suspend | Suspend a process to keep it from executing. |

OS Interprocess Single Message System Calls

| | |
|---|---|
| receive | Receive a (one word) message. |
| recvtim | Receive a (one word) message with timeout. |
| send | Send a (one word) message to a process. |
| sendf | Force a message to be sent to a process, even if doing so destroys a waiting message. |
| sendn | Send one word message to process. Do not force a resched(). |

OS Interprocess Port (Mail) System Calls

| | |
|---|---|
| get_dir_portid | Get the Director port identification. |
| pcount | Return the number of messages currently waiting at a port. |
| pcreate | Create a new port. DMOS supports up to 32 ports. The maximum number of message nodes on all ports at any one time is 32. |
| pdelete | Delete a port. |
| preceive | Get a message from a port. |

-continued

| | |
|---|---|
| preset | Reset a port. |
| psend | Send a message to a port. |

OS Interprocess Semaphores System Calls

| | |
|---|---|
| scount | Return the count associated with a semaphore. |
| screate | Create a new semaphore. |
| sdelete | Delete a semaphore. |
| sreset | Reset semaphore count. |
| signal | Signal a semaphore. |
| signaln | Signal a semaphore n times. |
| wait | Block and wait until semaphore signal. |

OS Memory Management System Calls

| | |
|---|---|
| freemem | Free a block of application heap space. |
| freestk | Free a block of application heap space (same as freemem). |
| getmem | Get a block of application heap space. |
| getstk | Get a block of application heap space (same as getmem). |
| lheap_init | Initialize the application's heap space. |

OS Buffer Pool Management System Calls

| | |
|---|---|
| bufcount | Get the number of free buffers of a pool. |
| delpool | Delete a buffer pool. |
| freebuf | Free a buffer and return it to a pool. |
| getbuf | Get a free buffer from a pool. |
| mkpool | Create a number of buffers for a buffer pool. |
| poolinit | Initialize the entire buffer pool manager. |

OS Time and Date System Calls

| | |
|---|---|
| datetos | Convert a date and time to a formatted string. |
| day_of_year | Convert date to the day-of-year index. |
| get_date | Convert the current date and time to a formatted string. |
| get_ticks | Get system clock in ticks (number of tenths of a second). |
| get_usecs | Get system clock in microseconds. |
| month_day | Convert day-of-year index to the month and the day. |
| set_date | Set the current date and time from a formatted string. |
| sleep | Go to sleep for n seconds. |
| sleept | Go to sleep for n ticks. |
| stodate | Convert a formatted string to a date and time components. |

OS Configuration Calls

| | |
|---|---|
| config_control | Controls configuration memory area (keypad type and Director password). |
| get_restarts | Get number of restarts since last startup. |
| get_system_information | Get DMOS system information. |
| set_startup_mode | Set the startup mode for the terminal. |
| system_control | Configure the internals of the system. |

OS Integrity System Calls

| | |
|---|---|
| _do_crc_check | Calculate Cyclic Redundancy Code (CRC) of one or more specified segments. |
| _do_init_same_values | Initialize one or more data areas, each to their same value. |
| calc_crc | Calculate CRC for a given string. |
| chk_chksum | Check computed checksum of a block with a checksum. |
| set_chksum | Compute and store the checksum of a block. |

OS Download System Calls

| | |
|---|---|
| get_dial_string | Get the Director download dial information. |
| get_dnld_info | Get the Director download information. |
| get_terminal_id | Get the Director download terminal information. |
| set_baud_rate | Set the Director download baud rate information. |
| set_dial_string | Set the Director download dial information. |
| set_dnld_info | Set the Director download information. |
| set_terminal_id | Set the Director download terminal information. |
| get_baud_rate | Get the Director download baud rate information. |

OS Security Calls

| | |
|---|---|
| sec_des_decrypt | Decrypts data with a key injected earlier. |
| sec_des_encrypt | Encrypts data with a key injected earlier. |
| sec_dukpt_clear | Clears and resets the Derived Unique Key Per Transaction security functions. |
| sec_dukpt_init | Initializes the Derived Unique Key Per Transaction (DUKPT) key management system. |
| sec_dukpt_smid | Returns the current SMID. |
| sec_get_information | Gets information on the current state of the security functions. |
| sec_key_clear | Erases the security key. |
| sec_key_set_mgmt | Sets the security key management mode. |
| sec_key_submit | Saves the given key information. |
| sec_mac_data | MAC's data with a key submitted earlier. |
| sec_PIN_encrypt | Encrypts the PIN data using an account number. |
| sec_serial_num_submit | Sets the serial number. |

OS Miscellaneous Calls

| | |
|---|---|
| format | Format a string according to a format mask. |
| fprintf | Formatted output conversion to a device. |
| printf | Formatted output conversion to the display device. |
| set_roll_cmnds | Set printer command characters for roll printer. |
| set_slip_cmnds | Set printer command characters for slip printer. |
| visa_recv | Read into a buffer using the VISA II message protocol. |
| visa_send | Write from a buffer using the VISA II message protocol. |

One of the more interesting sets of software library class or object are those related to the display driver. The display driver object performs the display activity for the OS. It operates in tandem on two conceptual levels: the upper and lower. The upper level contains the external interface display functions and executes the application or operating system requests for writing characters to the display along with statusing and mode setting. The lower level outputs characters to the hardware display, as well as handling cursor movement, contrast, and back lighting control.

Figure 17:
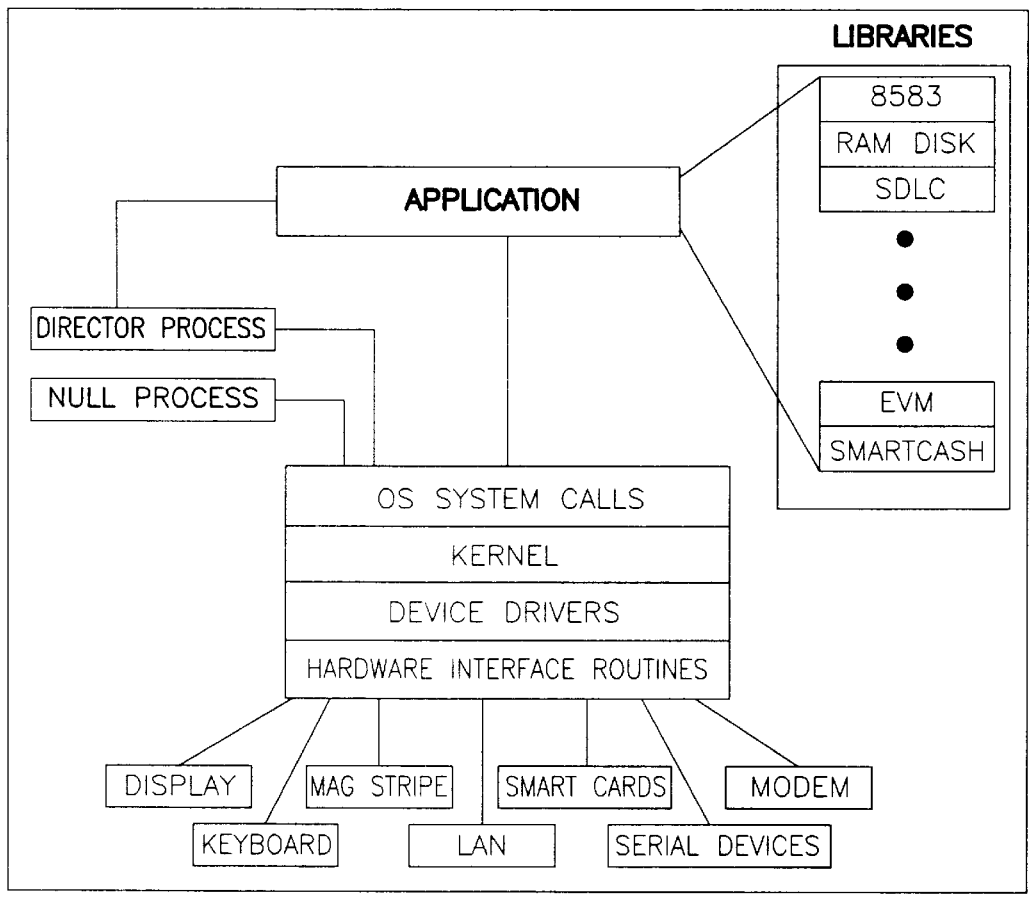
FIG. 17 is a diagram showing representative interactions between an application program and an operating system for the modular transaction terminal in accordance with the principles of the present invention.

Briefly as shown in FIG. 17, an application's display call, as are all OS system calls, resolves to an OS app.lib function that uses an interrupt vector to "bridge" from application space to OS space. Once within this space, the OS kernel vectors the display call to the display driver object, then to one of the display driver functions (all termed the upper level). Each display function makes use of its data structure, the display Device Control Block (DCB) to manage the display mode setting and statusing, items that are unique to the display. The lower level functions are called by the upper level to handle the hardware interface to the display itself. Note that the application is never blocked when using any display functions.

Features of this preferred embodiment display object include:

Graphical display of any set of characters, including bit graphics.

Up to four rectangular screens with possibly of a different character set in each screen.

Each of four processes can control or own at least one screen of the four screens of the display.

One process can control or own one, two, three, or all four screens.

Up to six different character sets, four user defined and two default sets.

Ability to uninstall character sets to install new ones.

Character sets can specify size and number (maximum of 64K characters in a set).

Optional display of a horizontal and/or vertical cursors.

Variable horizontal and/or vertical spacing around characters and between lines.

Cursor movement commands from character set or control function.

Optional automatic wrapping of characters to next line.

Setting of display's contrast and its back light.

The following define the display operating system calls that an application or operating system can make. The calls are identical to other device calls except for the device parameter, which here would specify the DISPLAY.

| · Open | Open a screen for the current process. |
|---|---|
| · Control | Set mode or return status (see next section). |
| · Putc | Output one character. |
| · Write | Output a specified number of characters. |
| · Close | Close screen to allow another process to use. |

A special call is also defined to permit display access without control or ownership. It is used by the OS when the device could be opened by an application; or by application libraries for displaying warning messages. It is not normally used by an application per se.

| · Display_io ownership. | Generalize output or mode setting without |
|---|---|

The functions done with a display control call, allowing modes to be set and status to be returned, are:

| · CHECK_DEV_STATUS | Get the device's status. |
|---|---|
| · CLEAR_SCREEN | Clear the selected screen and set cursor home. |
| · CSR_OFF | Do not display cursor. |
| · CSR_ON | Display cursor if option selected on open. |
| · CURSOR_HOME | Set cursor to top-left position in selected screen. |
| · GET_DISPLAY_SIZE | Return selected screen's column and row size. |
| · INSTALL_CHAR_SET | Install a character set. |
| · MOVE_CSR | Set cursor to requested spot in selected screen. |
| · RESET | Reset the display device. |
| · SET_BACKLITE | Set display's backlight to requested value. |
| · SET_CONTRAST | Get display's contrast to requested value. |
| · SET_SCREEN | Set (select) a screen that this process opened. |
| · UNINSTALL_CHAR_SET | Uninstall a character set. |
| · WRAP_OFF | Do not wrap a line to next line. |
| · WRAP_ON | If cursor at end of line, move to next line. |

The display object consists of the software display driver code that manipulates the hardware display device, or the display for short. The display is organized into rectangular sections called screens. A particular screen may encompass all or part of the display, and is defined when a process executes an openo display function. The entire display can be opened as one screen by:

open( DISPLAY, NULLPTR, NULLPTR );

A part of the display can be opened as a screen by supplying screen parameters:

open( DISPLAY, &screen_ptr, sizeof(screen_ptr );

The screen parameters specify the starting screen coordinates on the display and the horizontal and vertical lengths of the screen, as well as optional amount of inter-spacing between columns and lines.

A standard screen configuration can done as follows.

open( DISPLAY, &std_screen_config, NULLPTR );

More than one process may open a screen, and more that one screen may be opened by a particular process. However, there may be at most four screens and they may not overlap.

Even though the display's dot resolution does not really permit different font styles (such as Times Roman or Courier) without using a large portion of the display, each screen can specify a different character set.

Character sets are installed with a control function and are given a character set index. When installed, they specify the number of characters (maximum 64K) and the first displayable character index, as well as horizontal and vertical pixel sizes, and the actual graphic characters themselves. To use an installed character set, you must open a screen with screen parameters and select the character set by its character set index. A character size can be defined to be 1×1, 128×32 (the entire screen), or anything in between.

If the character set is larger than 256, each character is assumed to be two bytes instead of one, when a putc( ) or write( ) is executed. This can be done, for example, using Borland's wide character option.

Two character sets are preferrably provided: the 5×9 and the 5×7 ASCII character sets. The first character set is index one and is the default for opening the display without parameters; the second character set is index two. Other character sets for other language or graphic sets and sizes can be added. There may be at most four additional character sets installed at any one time; however, a character set may be uninstalled and new one installed with control functions. Of course, the selected screen must be closed and re-opened to use a newly installed character set.

For the two provided characters sets, certain characters (Backspace, \b; Formfeed, \c; Newline \n; and Return, \r) are not displayed, but instead move the cursor backwards one position, home, beginning of the next line, or beginning of the current line, respectively. Also, there are six special characters: up/down arrow ('\1'), up arrow ('\2'), down arrow ('\3'), left arrow ('\4'), right arrow ('\5'), and arrow body block('\6'). The rest of the other non-printing characters are treated as spaces.

Each screen is organized by columns and lines. Their maximum values are dependent on the character size and the inter-character spacing. The 5×7 character set, with one pixel spacing in both directions, allows a total of 84 characters (21 columns by 4 lines), while the 5×9 character set allows a total of 63 (21 columns by 3 lines).

The cursor position is determine by its column and line. Both column and line start at one and go up to their respective maximum. The upper left position of any screen is always (1, 1).

Each time a character is output to the display, the positioning of the next character is adjusted. By default, the positioning is rightward one character, then to beginning of the next line when at the end of a line, and finally to beginning of screen when at the end of the last line. If wrap is turned off, the positioning does not goes to the next line; instead it re-positions to the same character just displayed.

Optionally, the cursor is display in the currently selected screen. For this to occur, a routine must be provided when the screen is opened. Then a control call is used to have it displayed. The cursor can be displayed as either a horizontal or vertical line, or both. The cursor can be positioned where it is displayed when the screen is opened.

A typical flow of control through the display object is as follows:

1. Process zero initializes the display (display_access) on start up.
2. Process X opens a screen of the device (display_open).
3. Process X optionally executes control call (display_control).
4. Process X calls an output function (display_write/display_putc) which places the data on display.
5. Process X repeats step four and possibly step three until it displaying is completed.
6. Process X closes the selected screen (display_close) to release it for use by other processes.
7. During the same time frame, process X may do the same calls for using up to three more screens. Note that it will have to do step 3 to select an alternate screen.
8. During the same time frame, processes A, B, and/or C may do the same calls.

Some routines are only available for calls from other operating system objects, as well private calls within the display driver object itself, including Display_access and Display_io. Each of these functions is briefly described below.

Display_open

Synopsis int display open( int object_id, struct dsp_parameters *sparm_ptr, *splen_ptr );

Description

Assign part or all of the device, represented by the object_id, to the calling process, clear any previous data, and create a screen for the hardware display. If the designated portion of the display is free, the calling process owns the newly created screen, and a screen index (one through four) is returned; otherwise, an error is returned.

If the pointer sparm_ptr is NULLPTR, the entire display is assigned to the calling process. For this case, the default character set is 5×9 with one horizontal pixel space between lines, and one vertical pixel space between columns (characters). This implies three lines of 21 columns each. Also the cursor option is not selected, so no cursor can be displayed.

If the pointer sparm_ptr is not NULLPTR, the dsp_parameters structure pointed to by sparm_ptr specifies how the screen is to be defined (see below), and the length of the dsp_parameters structure is pointed to by splen_ptr.

If the splen_ptr is NULLPTR, but sparm_ptr is not, then sparm_ptr is a pointer to an integer representing a standard configuration. Currently, there is one standard configuration, whose integer is one. If this is selected, two screen are created: One screen is at the top, using a 5×9 character set with three horizontal spaces between lines, including an optional cursor, and one vertical space between columns. This screen has two lines of 21 columns each. The second screen is at the bottom, uses a 5×7 character set with one horizontal space between lines and one vertical space between columns. This second screen has one line of 21 columns with the ability to display both a horizontal and vertical cursor

| Parameter | Value | Meaning |
| --- | --- | --- |
| object_id | DISPLAY | Specified object or device identification. |
| sparm_ptr | NULLPTR | Opens the entire display as one screen. |
| splen_ptr | NULLPTR | Implies opening of a standard screen. |
| *sparm_ptr | structure | Display parameters structure for a screen. |
| *splen_ptr | Integer | Length of display parameters structure. |
| *sparm_ptr | Integer | Open the entire display as two screens. |
| splen_ptr | NULLPTR | Implies opening of a standard screen. |
| Return | Value | Meaning |
| return value | integer | Screen index used selecting screen in control(). |
|  | BAD_PARM | Device screen overlaps or mismatch in size. |
|  | BAD_USER | Device screen owned by another process. |

Display Screen Parameters

The following structure defines the display parameters used to open a generalized screen for the display.

```
struct dsp_parameters
{
    int  x_start_point        // X start coordinate  (range:0–127 )
    int  y_start_point        // Y start coordinate  (range:0–31 )
    int  x_length             // X size of screen    (range:1–128 )
    int  y_length             // Y size of screen    (range:1–32 )
    int  char_set_selection   // Char set select     (range:0–user)
                              //   default values:1-5×7, 2-5×9
    int  line_space           // Y inter-line space  (range:0–127 )
    int  char_space           // X inter-char space  (range:0–31 )
    int  line_cursor          // line cursor option  (range:0–1 )
    int  char_cussor          // char cursor option  (range:0–1 )
    int  line_cursor_space    // line cursor space   (range:0–31 )
    int  char_cursor_space    // char cursor space   (range:0–127)
};
Display open example
struct dsp_parameters s1_parameters[] =
    { 0, 0, 128, 24, 2, 2, 1, TRUE, FALSE, 1, 0 };
struct dsp_parameters s2_parameters[] =
    { 0, 24, 128, 8, 1, 1, 1, TRUE, TRUE, 0, 0 };
// . . .
void open_example()
{
```

```
        Uint size_sp1 = sizeof( s2_parameters );
        Uint size_sp2 = sizeof( s2_parameters );
        Uint screen_1;
        Uint screen_2;
        Uint screen_option = 1;
        //----------------------------------------------------------------
        // Open entire display as one screen.
        //----------------------------------------------------------------
        open( DISPLAY, NULLPTR, NULLPTR );
// . . .
        //----------------------------------------------------------------
        // Open entire display as two default screens.
        //----------------------------------------------------------------
        open ( DISPLAY, &screen_option, NULLPTR );
// . . .
        //----------------------------------------------------------------
        // Open the display (open main screen last for it to be selected).
        //----------------------------------------------------------------
        screen_2 = open( DISPLAY, s2_parameters, &size_sp1 );
        screen_1 = open( DISPLAY, s1_parameters, &size_sp2 );
// . . .
        //----------------------------------------------------------------
        // Select screen 2 to do display within screen 2.
        //----------------------------------------------------------------
        control( DISPLAY, SET_SCREEN, &screen_2, NULLPTR );
// . . .
        //----------------------------------------------------------------
        // Select screen 1 to do display within screen 1.
        //----------------------------------------------------------------
        control( DISPLAY, SET_SCREEN, &screen_1, NULLPTR );
// . . .
};
```

Display_control
Synopsis
  int display_control( int object_id, int function, void far *parm_ptr, void far *parm2_ptr );
Description
  Perform a function to set a mode or return a status. The control function for the device, represented by the object_id, is done possibly using parameters referenced via the pointers parm_ptr and parm2_ptr.

| Parameter | Value | Meaning |
| --- | --- | --- |
| object_id | DISPLAY | Specified object or device identification. |
| function | CHECK_DEV_STATUS | Get the device's status. |
| | CLEAR_SCREEN | Clear the selected screen and set cursor home. |
| | CSR_OFF | Do not display cursor. |
| | CSR_ON | Display cursor if option selected on open. |
| | CURSOR_HOME | Set cursor to top left position in selected screen. |
| | GET_DISPLAY_SIZE‡ | Return selected screen's column and row size. |
| | INSTALL_CHAR_SET‡ | Install a character set. |
| | MOVE_CSR‡ | Set cursor to requested spot in selected screen. |
| | RESET | Reset the display device. |
| | SET_BACKLITE† | Set display's backlight to requested value. |
| | SET_CONTRAST† | Get display's contrast to requested value. |
| | SET_SCREEN† | Set (select) a screen that this process opened. |
| | UNINSTALL_CHAR_SET† | Uninstall a character set. |
| | WRAP_OFF | Do not wrap a line to next line. |
| | WRAP_ON | If cursor at end of line, move to next line. |

†Requires parm_ptr to not be a NULLPTR, see below.
‡Requires both parm_ptr and parm2_ptr to not be NULLPTR, see below.

| Parameter | For Function | Value and Meaning |
| --- | --- | --- |
| parm_ptr | GET_DISPLAY_SIZE | Pointer to integer to return max. columns. |
| | INSTALL_CHAR_SET | Pointer to char array of a character set. |
| | MOVE_CSR | Pointer to integer number of columns value. |
| | SET_BACKLITE | Pointer to integer backlight value. |
| | SET_CONTRAST | Pointer to integer contrast value. |
| | SET_SCREEN | Pointer to integer screen index from open (). |
| | UNINSTALL_CHAR_SET | Pointer to integer of a character set index. |
| | All other functions | Pointer set to NULLPTR. |
| parm2_ptr | GET_DISPLAY_SIZE | Pointer to integer to return maximum lines. |
| | INSTALL_CHAR_SET | Pointer to integer of character set size. |
| | MOVE_CSR | Pointer to integer number of lines value. |
| | All other functions | Pointer set to NULLPTR. |
| Return | For Function | Value and Meaning |
| return value | INSTALL_CHAR_SET | Character set index to use in an open screen. |

For all other functions without error an OK implies function completed without error. For all functions with error BAD_USER, this means a non-owner is trying to use a screen. For all functions with error BAD_CMD, this means illegal function or parameters.

New Character Set Install Example

The first step is to define a character array for the character set; see example below. The first five bytes define its characteristics: the number of characters in the characters set, the first legal index, and the character size in pixels. For the example below, there is just one character (an 'S'). You must specified two bytes for the length, the least significant byte first. The first legal index is 83 (0x53) because that is the value of an ASCII 'S'. Of course, you could change the 'S' value to zero and set the first legal index also to zero. Finally, the size of a character is six pixels wide and ten pixels long.

After this, the character set is specified. Because the display hardware outputs bytes vertically, the characters must be rotated 90 degrees clockwise. Also, due to how memory is accessed, the most significant byte must stored in memory first. In this example, the bytes must be swapped. Note: A possible future project will be to automate the generation of user defined character sets.

Once the array has been generated, execute the following control call to install the character set.

char_set_index=control( DISPLAY, INSTALL_CHAR_SET, dsp_char_set_special, sizeof( dsp_char_set_special ) );

Then execute an open command to use the special character set within the selected screen.

display_parameters.char_set_selection=char-set_index; open( DISPLAY, &display_parameters, sizeof( display_parameters ) );

```
character set example
    char dsp_char_set_special[] =
    {
        1, //=DSP_MAX_CHARACTERS & 0xFF, //Low byte of # characters
in set.
        0, //=DSP_MAX_CHARACTERS   /   0x100,//High  byte  of  #
characters in set.
        83,//=DSP_FIRST_CHAR_INDEX,      //First  legal  character
code index.
        6, //=DSP_CHAR_X_SIZE,           //Horizontal char size in
pixels.
        10,//=DSP_CHAR_Y_SIZE,            //Vertical char size in
pixels.
        //------------------------------------------------------
---------
        // Character set values:
        //------------------------------------------------------
---------
        // Characters   rotated   90    degrees|   Chars   rotated   |
Characters as they
        // clockwise and bytes swapped.| 90 degrees.    | appear on
display.
        //------------------------------------------------------
---------
        0x8E,0x00,  //   10001110b,0b   |   010001110b   |   01110b
        0x11,0x01,  //   00010001b,1b   |   100010001b   |   10001b
        0x11,0x01,  //   00010001b,1b   |   100010001b   |   10000b
        0x11,0x01,  //   00010001b,1b   |   100010001b   |   10000b
        0xE2,0x00,  //   11100010b,0b   |   011100010b   |   01110b
                    //                  |                |   00001b
                    //                  |                |   00001b
                    //                  |                |   10001b
                    //                  |                |   01110b
    };
```

Display_putc
Synopsis int display_putc( int object_id, char ch );
Description

Output one character, ch, to the device, represented as object_id. The calling process is never blocked.

| Parameter | Value | Meaning |
| --- | --- | --- |
| object_id device identification. | DISPLAY | Specified object or |
| ch output. | character | Character to be |

| Return | Value | Meaning |
| --- | --- | --- |
| without error to use the screen. | OK | Function completed |
|  | BAD_USER | Non-owner attempting |

Display_write
Synopsis int display_write( int object_id , char far *buffer, int count );
Description Write the count characters from buffer to the device, represented as object_id. Once the function returns, the buffer may be reused. The calling process is never blocked.

| Parameter | Value | Meaning |
| --- | --- | --- |
| object_id device identification. | DISPLAY | Specified object or |
| buffer characters to be written. | pointer | Pointer to buffer of |
| count to be written. | integer | Number of characters |

| Return | Value | Meaning |
| --- | --- | --- |
| return value without error | OK | Function completed |
| to use the screen. | BAD_USER | Non-owner attempting |
|  | BAD_CMD | Count is less than zero or more characters than screen can hold. |

Display_close
Synopsis int display_close( int object_id );
Description

Releases control of the currently selected screen, represented by the object id, that was previously opened by the calling process. This portion of the display is available as a portion of a screen that may be opened by a process for its use.

| Parameter | Value | Meaning |
| --- | --- | --- |
| object_id device identification. | DISPLAY | Specified object or |

| Return | Value | Meaning |
| --- | --- | --- |
| return value | OK | Function completed |

-continued

| | | |
|---|---|---|
| without error. | | |
| | BAD_USER | Non-owner attempting |
| to close screen. | | |

Display_access
Synopsis
 int huge display_access( int object_id, int fct_type );
Description
 The protected display_accesso function is used to indicate that the object, represented by the object id, exists or to initially construct the display object by allocating and initializing the display DCB. The particular function is determined by fct_type.

| Parameter | Value | Meaning |
|---|---|---|
| object_id | DISPLAY | Specified object or device identification. |
| fct_type | OBJ_EXISTS | Request for device object's existence. |
| | OBJ_CONSTRUCT | Request to construct the device object. |
| Return | Value | Meaning |
| return value | OK | Function completed without error. |
| | BAD_USER | Non-null process trying to construct device. |

Display_io
Synopsis
 void huge display_io( int parameter );
Applications

Various applications will be developed for use with the POS terminal of the present invention. For example, network applications will be developed such as retail/restaurant applications on VISANET, GPS, and NOVUS. These applications will include standard credit, debit, and check authorization capabilities, along with an American Express Plural Interface Processing (PIP) option. A single application will support retail and restaurant functionality. In some embodiments, to save on memory, different application files will be used for the gateway, LAN workstation, and standalone environments. The user interface will be essentially the same in all configurations and on all networks. Preferably, the applications will be developed using object oriented programming. Additional applications might include storing and transporting applications on a smart card, storing and transporting a batch file, and diagnostics. Applications are preferably loaded in 64K blocks due to flash requirements. Multiple applications might also run together on the POS terminal, including such applications as: Credit/debit card application; Electronic purse application; Frequent shopper application; Check guarantee application; Customer survey; EBT program; specialized transactions such as Petroleum card applications; etc. There would probably be only 2–3 of the above applications used at once, but the list indicates some possibilities. Each application would likely communicate to a different host.

Multiple applications might also include different functions requested by a customer. For example, the customer could choose from the following functions:

1. Visa/MasterCard acceptance
2. American Express acceptance
3. Check guarantee
4. ECR integration The same host may process for all these functions, but it eliminates the need to control multiple applications with different combinations of features.

Security

The core unit with all module configurations can be used for PIN entry by the consumer. It will support DES and public key for encryption of secure data and handle Unique Key Per Transaction and Message Authentication (MAC).

There are several levels of security available:

Basic security—Single processor, no tamper detection or bonding

Tamper detection switches—One switch that detects when top enclosure is separated from the main board and another switch that detects when the bottom enclosure or "trap door" is opened. If either of the switches is activated, the operating system will clear all required memory.

Bonding—Ultrasonic bonding provides tamper evidence if someone tries to open up the case. The core unit can be bonded to the PIN pad cable module. The core unit cannot be bonded to the other communication modules.

Second processor—A Dallas 5002 chip is added to handle security functions. All encryption keys are held securely in this chip and cannot be accessed by the 80C186 application processor. All communication from the keypad and display is handled by the Dallas 5002 processor. The application processor and security processor can be downloaded separately from each other. If tampering is detected, the Dallas 5002 memory is immediately deleted and the O/S will not allow the application to run. The security processor option is appropriate if a private key is needed for PIN encryption or for software downloads. The second IC reader can also be used for this purpose.

The second processor option will generally be used with the tamper switch and bonding options. Two daughter board configurations will be available for the higher security options: One configuration will have tamper detection logic, the other will have both tamper detection and the second processor.

Once a tamper switch has been activated, the service organization will have to reload applications and keys before redeploying the unit. If the unit was bonded, this would need to go back to the factory (or Service organization if they have bonding equipment)

It is recommended that applications put all secure information (ie. keys) in SRAM rather than flash. Since tamper detection does not protect against re-downloading a "dummy" application, MACing is used for PIN pad applications. A "trap door" in the core unit bottom cover will allow the tamper detection switches, security processor, or additional memory to be added after initial assembly. It will have an optional privacy shield that can snap on around keypad area.

The way the PIN pad conceals an entered PIN is through encrypting it. Encryption takes normal readable data called plain text (or clear text) and scrambles it into an unreadable form called cipher text. The process of converting cipher text back into its original plain text is called decryption. The encrypted PIN is secure from an attacker because they are unable to read it. Many algorithms can be designed for encrypting text.

An encryption algorithm may be written that transposes each character by one (i.e. 'a' becomes 'b' and 'b' becomes 'c', etc.). This algorithm relies on the secrecy of its method for its security. If an attacker knows that every character gets transposed by one, they can determine the plain text.

Other algorithms can be written that combine data, called a key, with the plain text in such a way as to produce cipher text. One such algorithm may exclusive-OR the plain text with the key to produce the cipher text. The method of encrypting the data may be provided to the public (i.e. XOR the data with key), but if they do not know the key, they will be unable to learn the plain text. Algorithms that depend on the secrecy of a key are more secure than those that depend on the secrecy of the algorithm itself.

The Data Encryption Standard (DES) algorithm is one such algorithm. DES has become the standard encryption scheme in the banking community. This algorithm requires a 56 bit key for encrypting and decrypting data. Generally the 56 bit key is expanded to a 64 bit (8 byte) key with the extra bits indicating the parity of the individual bytes. This document will refer to all keys as has having 64 bits, although the DES algorithm will only make use of 56 of the bits. The DES algorithm encrypts 64 bits of data at a time.

The DES algorithm's security is only as good as the security of the key. Key management describes the system used in distributing and maintaining keys. The more often a key is changed the less likely that an attacker could discover the key, and if they had, the less information they would have access to. Both the sender and the receiver must know the same key in order to decrypt (or encrypt) the transmitted data. The transfer of the key between parties must be done in a secure environment. If the key is changed often this can be a problem.

The basic DES algorithm can be used in several different ways or modes. The two modes used by the PIN pad are Electronic Code Book (ECB) mode and Cipher Block Chaining (CBC) mode. In ECB mode, the DES algorithm is used to encrypt or decrypt each individual block of data. This is similar to looking up the cipher text form of a block of plain text in a code book. PIN encryption uses ECB mode.

CBC mode, on the other hand, takes all of the data and computes, in essence, a cipher text checksum. This is useful to protect the integrity of the data. An attacker is still able to read data but may not alter it without the cipher text checksum, or Message Authentication Code (MAC), changing. The new MAC can only be calculated if the key is known. The MAC is used to provide some measure of security in knowing that an unaltered application has been loaded into the terminal.

The DES algorithm encrypts 64 bits of data using a 64 bit (only 56 bits of which are used) key. The DES algorithm is design so that the same algorithm is used for both encryption and decryption. The DES algorithm requires frequent bit manipulations. The DES engine functions available for use include:

int sec_des_decrypt (Uchar key_id, Des_Data far *buf)

The sec_des_decrypt function decrypts the data passed in the Des_Data buf, with the key injected earlier and identified as key_id. The decrypted data replaces the data in buf. The data in buf is treated as binary 8 byte data and no conversion is performed. The key_id parameter is a number between 0 and 31, APP_MASTER_KEY, APP_WORKING_KEY, or VISA_DUKPT_KEY. It specifies which key is used to decrypt the data. A key must have been submitted to this key_id before the sec_des_decrypt function is called or else an error is returned. The process will be blocked if security is being used by another process. The buf parameter is a pointer to a structure containing a buffer for the 8 byte binary data to be decrypted. The 8 byte binary result is placed in this buffer.

sec_des_decrypt returns the following:

| Return | Meaning |
| --- | --- |
| OK | Operation completed successfully |
| INVALID_ID | key_id is out of range |
| KEY_NOT_LOADED | key_id has not been loaded with sec_key_submit() |
| INVALID_PARAM | Pointer to buf is NULL |
| OVER1MILLION | Over one million DUKPT keys have been generated | int sec_des_encrypt (Uchar key_id, Des_Data far *buf)

The sec_des_encrypt function encrypts the data passed in the Des_Data buf, with the key injected earlier and identified as key_id. The encrypted data replaces the data in buf. The data in buf is treated as binary 8 byte data and no conversion is performed. The key_id parameter is a number between 0 and 31, APP_MASTER_KEY, APP_WORKING_KEY, or VISA_DUKPT_KEY. It specifies which key is used to encrypt the data. A key must have been submitted to this key_id before the sec_des_encrypt function is called or else an error is returned. The process will be blocked if security is being used by another process. The buf parameter is a pointer to a structure containing a buffer for the 8 byte binary data to be encrypted. The 8 byte binary result is placed in this buffer.

sec_des_encrypt returns the following:

| Return | Meaning |
| --- | --- |
| OK | Operation completed successfully |
| INVALID_ID | key_id is out of range |
| KEY_NOT_LOADED | key_id has not been loaded with sec_key_submit() |
| INVALID_PARAM | Pointer to buf is NULL |
| OVER1MILLION | Over one million DUKPT keys have been generated |

Applications can use the public encrypt and decrypt functions which in turn call the private functions which encrypt or decrypt the data.

The Message Authentication Code (MAC) is used to verify the integrity of a series of data. Applications downloaded to the terminal are verified using the MAC. If the MAC that the terminal calculates does not match the MAC sent in the application, the application is cleared. The MAC function may be used to insure the integrity of any set of data. Some of the available MAC functions include:

int sec_mac_data (Uchar key_id, char far *buf_ptr, int len, Des_Data far *mac_ptr)

The sec_mac_data function will use the key submitted earlier and identified by key_id to MAC the data. The function will MAC len bytes of the data contained in the buffer pointed to by buf_ptr. The 8 bytes of data in mac_ptr are used as the initial MAC value when calculating the MAC. The MAC of the len of buf_ptr replaces the initial MAC value in mac_ptr. In this way, data may be MAC'd over several calls to sec_mac_data. The first call will pass mac_ptr containing zeros (or some other initial value). Subsequent calls to sec_mac_data then continue the generation of the MAC by passing the MAC from the previous sec_mac_data call in mac_ptr. The key_id parameter determines which key is used when MACing data. The process will be blocked if the security functions are being used by another process. The buf_ptr parameter is a pointer to a buffer containing the data to be MAC'd. The data will be treated as binary when MAC'd. The len parameter defines the number of bytes in the buffer to be MAC'd. Note: the MAC function operates in 8 byte increments. If the length is not divisible by 8, the remainder will be filled with zero before that block is MAC'd. Care must be taken if the original MAC was not calculated in this manner also. Note: the application may still pad the data in a different manner and pass the data in multiples of 8 bytes to sec_mac_data. The mac_ptr parameter is a pointer to a structure containing a buffer that will contain the accumulated MAC. The accumulated MAC is combined with the passed data and encrypted to create a new accumulated MAC which replaces the one passed. The MAC should be initialized to zero to begin MAC-ing. The result is in 8 byte binary format.

Sec_mac_data returns the following:

| Return | Meaning |
| --- | --- |
| OK | Operation completed successfully |
| INVALID_ID | The specified key ID is not valid |
| KEY_NOT_LOADED | The key specified has not been loaded using sec_key_submit |
| INVALID_PARAM | Either the buf_ptr parameter or the mac_ptr parameter is a NULLPTR |

The sec_mac_data function is initially called with the mac_ptr parameter pointing to a structure containing zeros. This is the initial accumulated MAC. After each call the new accumulated MAC will be written into the mac_ptr parameter. The application is responsible for ensuring that the current accumulated MAC is passed to the function for updating with each call. The accumulated MAC is the resultant MAC after all MACing has been completed. This MAC may be compared to the MAC calculated when the data was originally MAC'd. If they are different then the data has been corrupted. The MAC functions will be used when downloading an application to verify its validity. If the MAC does not equal the MAC originally generated then the application will be erased.

The security of the DES algorithm is only as strong as the security of its keys. To limit the probability of a key being discovered it is best to change keys often. This presents a problem in that both parties must agree and know what key to use. Several key management schemes are in use by PIN pads. These are: Fixed Transaction Keys, Master Key/Transaction Keys, Derived Unique Key Per Transaction (DUKPT), and Non-Reversibly Transformed Unique Key Per Transaction.

In Fixed key management, only one key is used. This key must be injected into the terminal in a secure environment. This is the simplest method, but the most risky. Should an attacker discover the key, all is lost.

Master Key/Transaction Key (MK/TK),management uses several keys. One key is injected into the terminal in a secure environment. This key is the Master key. Other keys may then be injected into the terminal in a non secure environment if they are encrypted with the Master key first. When the terminal receives these keys they are decrypted with the Master key to obtain the actual plain text key. The Master key may also be called a key encrypting key or KEK. This two stage method allows the transaction keys (or working keys) to be changed regularly.

The application MAC keys have been pre-defined to follow the MK/TK management method. The application master key (AMK) must be injected in the clear. The application working key (AWK) is encrypted with the AMK and its encrypted form is injected into the PIN pad. The plain text AWK is used to MAC the application.

DUKPT management changes the key after every transaction. An initial key is injected into the terminal along with Security Management Information Data (SMID) in a secure environment. The SMID contains the ID of the terminal, a key set ID, and a transaction counter. The initial key is assigned by a third party and is derived from the key set ID and the terminal ID encrypted with a base key not known to the terminal. The DUKPT method uses the initial key and the transaction counter to generate the current key. This method allows for 1 million different keys to be used. After 1 million keys have been generated (i.e. 1 million transactions), the PIN Pad initial key must be reloaded. Each key generated provides no information of past keys or of future keys. These means that if an attacker were to learn the current key they would only have access to one transaction.

Non-Reversibly Transformed UKPT also changes the key after every transaction. This method uses data from the transaction itself to create the new key. Because of this both parties must keep a record of the history of transactions in order to determine the current key. This requires a lot of overhead and is usually not used because of this.

The security functions will support 32 keys that can be used in either fixed key or MK/TK mode by the application. The keys are referred to by key IDs 0 through 31. In addition, several keys have been assigned that have special purposes. The application master key (AMK) is used as the master key for the application working key (AWK). The AWK is used for calculating the MAC for applications that are downloaded into the PIN pad. The DUKPT management mode also has its own key. These pre-assigned keys have a key ID that is not in the range of 0 to 31.

Doubling the length of the keys to 16 binary hexadecimal bytes increases the security. The security functions will accept either double length or single length keys. To provide for maximum flexibility, no structure has been defined for the 32 keys that can be stored. The key structure can be determined by the application when the keys are submitted. When submitting a key, the key is assigned a key ID which is the number of the key submitted (0 to 31). In addition the key may have a KEK assigned to it. These means that the application can have a single level of keys, or a multiple level (Fixed Key or MK/TK), or any combination. The only restriction is the number of key storage areas (IDs) available.

If a KEK is changed, all keys that depend on that key are cleared. In other words, if the Master key is changed, then all Transactions keys that were encrypted with that Master key are erased. This also applies to the AMK and AWK. In addition, if either the AMK or the AWK is changed, the application will be cleared.

The keys must be stored in OS data memory (i.e. independent from the application). The stored keys must be erased if the terminal is tampered with. An array of key flags will also be stored. These flags will indicate whether or not the key has been injected and also whether or not it is a double length key. These flags can be used to review the status of the loaded keys. The flag byte is defined as follows:

Bit 7—Set if the key has been loaded

Bit 6—Set if the key is double length (16 bytes)

Bits 0—Set to the KEK ID for the key.

A director menu option will allow the user to see which keys have been loaded. The function called by the director will use the key flags to determine their status. Several key management functions will be available, including:

int sec_get_information (struct security_info *sec_info_ptr, Uint si_size)

The sec_get_information function fills the passed security_info structure with information on the current state of the security functions. The struct security_info is defined as follows:

// This is the structure for holding security
// information.

```
struct security info {
    Uchar       key_info[32];
    Uchar       awk_info;
    Uchar       amk_info;
    Uchar       dukpt_key;
    char        dukpt_status;
    char        key_mgmnt_mode;
    char        serial num[17];
};
```

The key_info array contains the key flags described above.

sec_get_information returns a status.

| Return | Meaning |
| --- | --- |
| OK | The structure was loaded successfully |
| SYSERR | The pointer to the structure was a |

NULLPTR int sec_key_clear (Uchar key_id)

The sec_key_clear function erases the security key with the given ID. Any keys having the key_id as a KEK is recursively cleared also. The key_id parameter specifies which key to clear. The key_id may be a number from 0 to 31. Note that the application master and working keys (IDs APP_MASTER_KEY and APP_WORKING_KEY) cannot be cleared. The process will be blocked if the security functions are being used by another process.

sec_key_clear returns a status.

| Return | Meaning |
| --- | --- |
| OK | Key management mode change complete. |
| INVALID_ID | Invalid key ID was given. | int sec_key_set_mgmnt_mode (enum mgmnt_modes mode)

Sets the security key management mode to be used by the PIN pad. This function is not used internally but the flag is needed by some applications and is included here for compatibility with the MEPPA application. The mode parameter selects what key management mode to use. The enumerated type is defined as follows:

enum mgmnt_modes {FIXED_KEY_MODE, MK_TK_KEY_MODE, VISA_UKPT_MODE, KEYED_MK_TK_MODE} Where:

| | |
| --- | --- |
| FIXED_KEY_MODE | Fixed key mode |
| MK_TK_KEY_MODE | Master key/Transaction key mode |
| VISA_UKPT_MODE | VISA unique key per transaction mode |
| KEYED_MK_TK_MODE | Keyed Master key/Transaction key mode | sec_key_set_mgmnt_mode returns a status.

| Return | Meaning |
| --- | --- |
| OK | Key management mode change complete. | int sec_key_submit (Uchar key_id, Uchar kek_id, char far *key_data)

The sec_key_submit function saves the given key information under the passed key ID. This function also associates a key with its key encryption key (KEK). This function must be performed before any functions requiring a key ID are performed. The key_id parameter determines under which key ID the key information is stored. Valid numbers are 0 through 31. In addition, the APP_MASTER_KEY or APP_WORKING_KEY may be specified. The process will be blocked if the security functions are being used by another process. The kek_id parameter defines the key ID of the key encryption key to be used to decrypt the key being submitted. If no key encryption key is required, NO_KEK should be used. The key encryption key must have been submitted before a key, using it as a key encryption key, is submitted. The key_data parameter is a pointer to a NULL terminated string containing the ASCII hex key data. The string length must be 16 or 32 characters (single or double length). Note: Any keys which were previously submitted with key_id as a kek id are cleared from memory. If the APP_MASTER_KEY is submitted, the application and all other keys are cleared from memory after this operation. The kek_id parameter is ignored for the APP_MASTER_KEY and APP_WORKING_KEY keys. Defaulting to the NO_KEK for the APP_WORKING_KEY and AWK for the APP_MASTER_KEY.

sec_key_submit returns the following:

| Return | Meaning |
| --- | --- |
| OK | Key was successfully submitted. |
| INVALID_KEY characters. | The length of the key is not 16 or 32 |
| INVALID_ID range. | The key_id or kek_id parameter is out of |
| KEY_NOT_LOADED loaded. | The key encryption key has not been | int sec_serial_num_submit(char *ser_num_ptr)

Sets the serial number stored in security_dcb. This function is included for compatibility with 290E applications. The ser_num_ptr parameter is a pointer to a NULL terminated ASCII string containing the serial number. The serial number may be up to 16 digits in length.

sec_serial_num_submit returns a status.

| Return | Meaning |
| --- | --- |
| OK | Serial number was updated. |
| SYSERR | The length of passed security number is | too large.

The sec_key_submit function is used to inject keys at any time.

The DUKPT management mode changes the key used to encrypt the PIN after every transaction. The key ID and the terminal ID along with a transaction counter are used to generate each key. The transaction counter will allow up to 1 million transactions before the initial key must be reloaded. Only one DUKPT initial key is allowed to be in use at a time. Some DUKPT functions are:

void sec_dukpt_clear (void)

Clears and resets the derived unique key per transaction security functions. The DUKPT functions must be re-initialized before the VISA_DUKPT_KEY is used. The process will be blocked if the security functions are being used by another process.

int sec_dukpt_init (Uchar key_id, char far *init_key, Smid_Data far *smid)

The sec_dukpt_init function initializes the Derived Unique Key Per Transaction (DUKPT) key management system by internally storing the initial key, the key serial number (SMID) and resetting the DUKPT transaction counter. The key_id parameter is used to select which method is used. Currently, only VISA DUKPT is supported and the parameter must be set to VISA_DUKPT_KEY. The process will be blocked if the security functions are being used by another process. The init_key parameter is a pointer to a NULL terminated ASCII hex string containing the 16 character initial key to be used (only single length keys are valid). The smid parameter is a pointer to a NULL terminated ASCII hex string containing the 20 character key serial number (SMID) to be used. Leading 'F's must be prepended to pad the SMID to 20 characters.

sec_dukpt_init returns the following:

| Return | Meaning |
| --- | --- |
| OK | DUKPT system initialized correctly |
| INVALID_KEY | The initial key is invalid |
| INVALID_SMID | The smid parameter is invalid |
| INVALID_ID | Unsupported DUKPT type | int sec_dukpt_smid (Smid_Data far *buff)

The sec_dukpt_smid function returns the current SMID, and calculates a new derived unique key per transaction SMID and key. This function is used to increment the transaction counter. The process will be blocked if the security functions are being used by another process. The buff parameter is a pointer to a structure containing a buffer that is 21 characters in length. The buffer receives the ASCII NULL terminated string containing the SMID, pre-padded with 'F' if necessary.

sec_dukpt_smid returns the following:

| Return | Meaning |
| --- | --- |
| OK | Completed successfully |
| KEY_NOT_LOADED | The DUKPT system has not been initialized with the sec_dukpt_init function. |
| OVER1MILLION | The DUKPT system has encrypted more than 1 million transactions and must be re-initialized |
| INVALID_PARAM | Buff pointer passed is a NULLPTR |

To use DUKPT, the initial key must be injected using the sec_dukpt_init function. This resets the transaction counter and stores the initial key and SMID. Next the encrypt function is used as normal. To update the transaction counter the sec_dukpt_smid function must be used. This will also return the SMID used for the encrypt just performed (before the transaction counter was updated). This SMID should be sent along with the encrypted data to the host.

Smid_Data is a structure defined as follows:

// This is the data structure for SMID Data.

```
typedef struct {
    char data[21];
} Smid_Data;
```

The PIN entered by the customer is not just encrypted on its own. The entered PIN (4 to 12 digits) is expanded into a 64 bit block as follows:

| | | | | | | | | | | | | | | | Bits |
| --- | --- | --- | --- | --- | --- | --- | --- | --- | --- | --- | --- | --- | --- | --- | --- |
| 1–4 | 5–8 | 9–12 | 13–16 | 17–20 | 21–24 | 25–28 | 29–32 | 33–36 | 37–40 | 41–44 | 45–48 | 49–52 | 53–56 | 57–60 | 61–64 |
| 0 | PIN Len | PIN | PIN | PIN | PIN | PIN or 0xF | PIN or 0xF | PIN or 0xF | PIN or 0xF | PIN or 0xF | PIN or 0xF | PIN or 0xF | PIN or 0xF | 0xF | 0xF |

The account number is reduced to a 64 bit block using the 12 right most digits (not including the check digit) as follows:

| | | | | | | | | | | | | | | | Bits |
| --- | --- | --- | --- | --- | --- | --- | --- | --- | --- | --- | --- | --- | --- | --- | --- |
| 1–4 | 5–8 | 9–12 | 13–16 | 17–20 | 21–24 | 25–28 | 29–32 | 33–36 | 37–40 | 41–44 | 45–48 | 49–52 | 53–56 | 57–60 | 61–64 |
| 0 | 0 | 0 | 0 | A1 | A2 | A3 | A4 | A5 | A6 | A7 | A8 | A9 | A10 | A11 | A12 |

The two blocks are exclusive OR'd together and encrypted using DES in ECB mode. The result is the encrypted PIN block. The PIN security functions include:

int sec_PIP_encrypt (Pin_Data far *p_data)

The sec_PIP_encrypt function encrypts the PIN data using the account number passed in the Pin_Data structure. The encrypted PIN is stored in the PIN_block array in the Pin_DAta structure. The process will be blocked if the security functions are being used by another process. The p_data parameter is a pointer to a Pin_DAta structure defined as follows:
// This is the data structure for encrypt PIN.
// PIN block will be returned for all keys.
// smid will be filled for DUKPT keys.
// All strings are NULL terminated ASCII either numeric
// or hex.

```
typedef struct {
Uchar key;              //Encryption key number
char acct[20];          //ASCII Account#, no check
                        // digit
char PIN[13];           //ASCII PIN number
char PIN_block[17];     //ASCII The encrypted PIN
                        // block
char smid[21];          //ASCII hex key serial number
} Pin_Data;
``` sec_PIN encrypt returns the following:

| Return | Meaning |
| --- | --- |
| OK | PIN encrypted successfully |
| OVER1MILLION | Over 1 million encryptions have been processed by the DUKPT system. DUKPT must be re-initialized. |
| KEY_NOT_LOADED | Specified key has not been loaded with sec_key_submit() |
| INVALID_PARAM data | P_data pointer passed does contain valid |

Sec_PIP_encrypt requires the entered PIN and the account number before it can be used. Care must be taken to not leave the PIN in the clear in memory. The sec_PIN_encrypt function will clear the PIN entry in the structure but the user must be sure that it is cleared else where.

The preferred embodiment terminal features a single processor. Thus the security code and the application code will reside in the same processor. The application will have the ability to display any message that is desired and to receive any key presses the customer enters. This opens up the possibility for an application to prompt the customer to enter a PIN and to then pass the entered PIN on to an attacker in the clear. The only way to prevent this is to verify that the application does not contain any rogue code that might do this. Once the code has been proven to be valid and 'clean', it must be MAC'd so that it would be obvious if it was tampered with after approval. The terminal must insure that the application it receives has the proper MAC and therefore is a valid application before the application is initiated.

The terminal will assume that a security breach will not originate from the application (after all, the application has been MAC'd indicating that it will not breach the security). This must be assumed as there is always a chance that the application could access/alter critical parts of the OS even with extensive firewalling, as they both reside in the same processor.

The downloader on the terminal will MAC incoming application data. It is critical that this always takes place. The downloader can then clear the application if its MAC is not valid.

When the downloader receives the EDIR it will store the MAC contained in the extended download information record (EDIR) and then initialize the MAC routines using the sec_mac_data function with the APP_WORKING_KEY ID and an accumulated mac of all zeroes. Each record the downloader receives will be MAC'd using the sec_mac_data function with the accumulated mac. Upon completion of the download the downloader will compare the accumulated MAC against the MAC received in the EDIR. If they do not match, the application is cleared. Otherwise downloading completes as normal. The data is MAC'd in its compressed form. The MAC does not include the EDIR or the NDCB packet headers.

The terminal preferably will initially only have the default AMK and AWK keys loaded. By having default application master key (AMK) and application working key (AWK), the user may download applications without dealing with the AMK and AWK while still having a terminal secure from casual application downloading. Should more security be needed, the AMK and AWK may be changed by the user.

The first keys injected into the terminal must be injected in the clear (plain text) in a secure area. This needs to be done before an application has been loaded into the terminal, so that the key is independent from the application. At minimum the capability of injecting the AMK and AWK before the application must exist.

Keys injected in the clear are normally injected using a key loading device (KLD). The director will have a menu option to Inject Keys. This may be password protected. When the Inject Keys option is selected, the sec_key_inject function will be called. The function will then monitor the director selected port for messages from a KLD (or similar) device at standard baud rates with 7 bits, even parity, one start bit, and one stop bit. Once the first keys have been injected, the application can take over the injecting of further keys. The keys injected by the application normally will have been encrypted using one of the keys first injected into the terminal and not in the clear.

The application will have access to the following functions which will be included in the bridge. These functions are described in detail above.

```
int sec_des_decrypt (Uchar key_id, Des_Data far *buf)
int sec_des_encrypt (Uchar key_id, Des_Data far *buf)
void sec_dukpt_clear (void)
int sec_dukpt_init (Uchar key_id, char far *init_key, Smid_Data far
    *smid)
int sec_dukpt_smid (Smid_Data far *buff)
int sec_key_clear (Uchar key_id)
int sec_key_set_mgmnt_mode (enum mgmnt_modes mode)
int sec_key_submit (Uchar key_id, Uchar kek_id, char far *key_data)
```

```
int sec_mac_data (Uchar key_id, char far *buff, int len, Des_Data far
   *mac)
int sec_get_information (struct security_info *sec_info_ptr, unsigned
   int si_size)
int sec_serial_num_submit (char *ser_num_ptr)
int sec_PIN_encrypt (Pin_Data far *p___data)
```

The security class or object must include several operating system support functions. These functions support the object interaction in the operating system. These functions include the following.

void sec_key_inject (void)

This function will be called by the director 'Inject Keys' menu option. The Inject Keys menu option will be under the parameters option in the director. This Inject Keys option may be password protected. When called, the function will operate as described in the Key Injection section above.

void sec_key_display_status (void)

The sec_key_display_status function is also called from the director. This menu option will be under the diagnostics menu. It indicates which keys have been loaded into the terminal on the display.

PC Utility

A PC Utility will support full downloads of applications and parameters. Downloads will be supported over phone lines, locally, or over the LAN. The PC Utility can also download the operating system, since it is stored in flash ROM. The O/S and software should support download of the application when required, initiated by either the host or the terminal (gateway if on LAN). The application can request this download to occur. If no application is loaded, a terminal operator would have to manually start the download through the director. Remote download of a typical application file (256K) should take within 15 minutes (compression will be used to reduce download time). A communication module having ISDN capability or utilizing a diskette might be used for large downloads. These approaches will be looked at more closely if customers begin moving toward higher memory configurations.

The PC Utility will also be used for key creation and key injection into the PIN pad module. It might support common key systems such as DUKPT, Master Key, Session Key, Fixed Key. A preferred embodiment of the invention also supports RACAL.

For secure downloading of an application, MACing is used. A specific encryption key for MACing is stored in the POS terminal or PIN pad module. The same key is used when downloading an application to create a MAC value. When a new application is downloaded, the MAC value is compared against the MAC key received in the EDIR to ensure that the code did not change during transmission and that the application was sent by an approved source.

EXEMPLARY USER ENVIRONMENTS

The modular POS terminal allows for many different uses in different user environments. A few of these different user environments will now be discussed. It will be appreciated that the environments are purely exemplary and are not intended to be construed as a limitation on the field of use of the invention.

1. PIN Pad Module-electronic Cash Register (ECR) Integrated

Figure 11A:
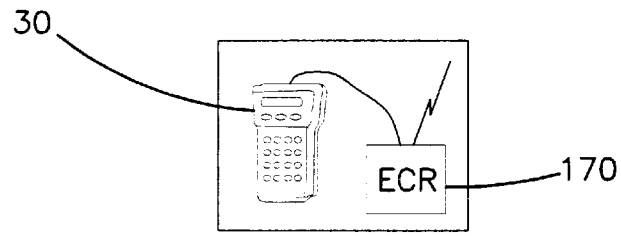
FIGS. 11A–11G illustrate various environments suitable for using a modular transaction terminal constructed in accordance with the principles of the present invention.

In this environment as illustrated in FIG. 11A, the POS terminal includes a core unit 30 which interconnects with a PIN pad module 148. The POS terminal is operatively connected to an electronic cash register 170 (ECR) which has electronic funds transfer (EFT) software and handles all host communication. The POS terminal connects to the ECR 170 through an appropriate ECR interface such as an RS485 interface (IBM 4680 tailgate), an RS232 interface (most other ECRs), etc. A retail clerk operates the ECR 170. The sale amount is transferred to the POS terminal for display on the POS terminal to the customer. The customer confirms the sale amount, selects payment type, and enters his/her PIN on the key pad of the POS terminal. A receipt is printed on the ECR printer.

2. Local Area Network (LAN)

Figure 11B:
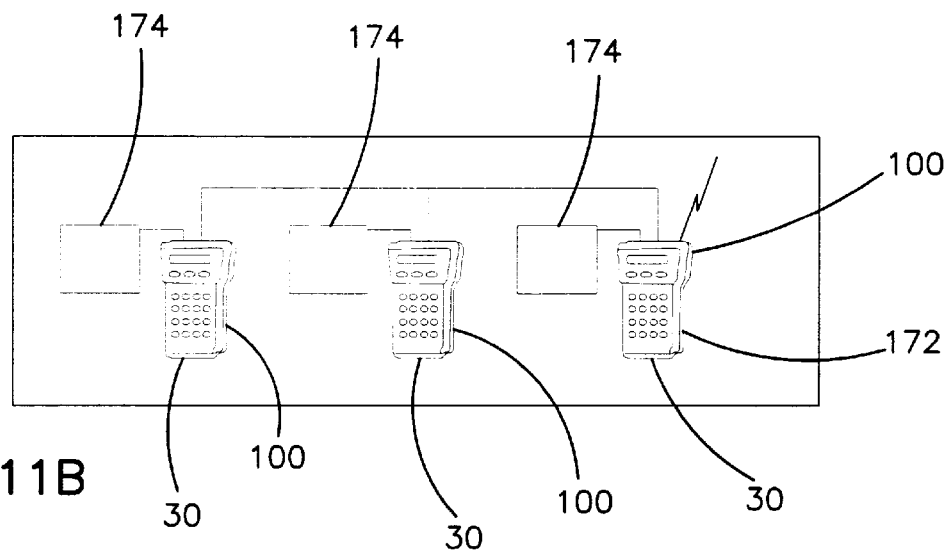

As illustrated in FIG. 11B, multiple POS terminals are interconnected as workstations in a LAN environment with one of the POS terminals functioning as a gateway terminal 172 for external communications with a remote host. The POS terminal workstations each include a core unit 30, a communications module 100, and an external printer 174. It will be appreciated that only the POS terminal used as the gateway 172 needs a communications module equipped with a modem PCB. An external PIN pad might be used for convenience.

The aforementioned environment is used for multi-lane environments with POS terminals networked together and when ECR integration is not needed. The POS terminal workstations in different lanes have no modem or communications module but communicate with a remote host through a POS terminal which has a communications module including a modem and serves as the gateway terminal. A POS terminal with its PIN pad module is clerk activated and may be passed to the customer for PIN entry or an optional PIN pad may be used. Magnetic stripe or integrated circuit (IC) cards can be read. The gateway POS terminal 172 provides external communications with an external host for verification of any transactions conducted. The external printer 174 is typically attached for added printing capability such as higher speed printing.

3. LAN—ECR semi-integrated

Figure 11C:
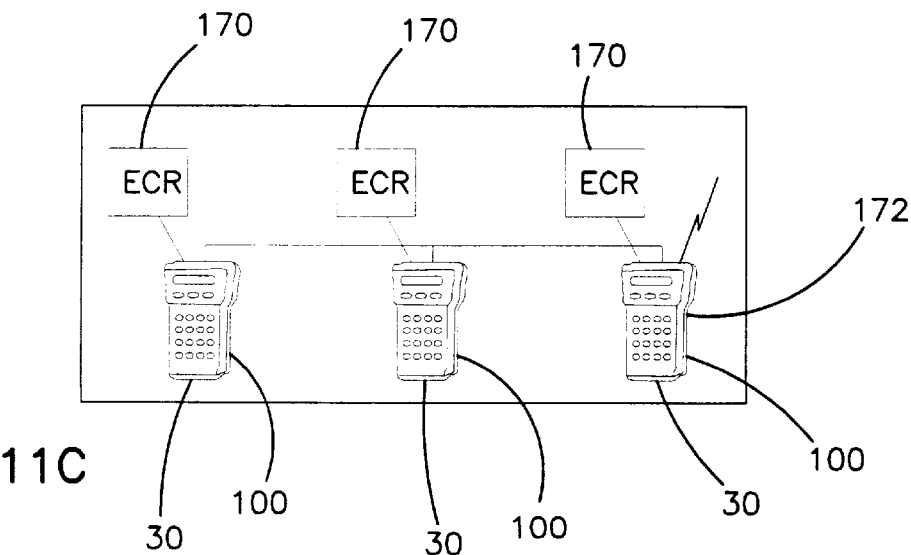

As illustrated in FIG. 11C in a variation of the above environment, the POS terminals interface to an ECR 170 for transfer of sale amount and use of the ECR printer. Host communication is still handled by the POS terminal functioning as the gateway terminal 172. In this environment, no external printer is required since the ECR printer is used, although additional external printers might be utilized.

A plurality of the POS terminals might be connected to each other in a local area network (LAN). The ECR might be connected either directly to a POS terminal or through the local network controller which communicates with the networked POS terminals via one of the POS terminals which serves as a network gateway.

4. POS Terminal Offline

Figure 11D:
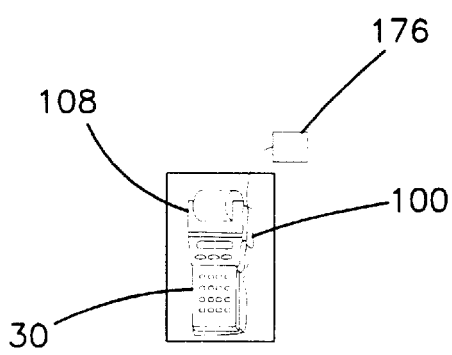

FIG. 11D illustrates an environment in which there is no access to telephone lines. In this environment, the POS terminal includes a core unit 30, a communications module 100 with battery pack 176 as a power source, a second IC card reader incorporated within the communications module 100, and a charging stand (not shown). An integrated printer 108 is optional. This user environment is suited where small cash transactions are done (ie. outside food stands, newspaper stands, buses, flea markets). These environments need portability and cannot access phone lines. The merchant does not need to do authorization online because of small transaction amounts and use of integrated circuit (IC) cards. This configuration might be used in other environments simply because of the unreliability of the telecommunications systems.

Transactions may be stored in a second IC card ("retailer card") or in POS terminal memory for later transfer to a host. PINs may or may not be used in this environment. The clerk enters the sale amount, then hands the device to the customer for inserting his/her card and PIN entry if any.

5. POS Terminal Online

Figure 11E:
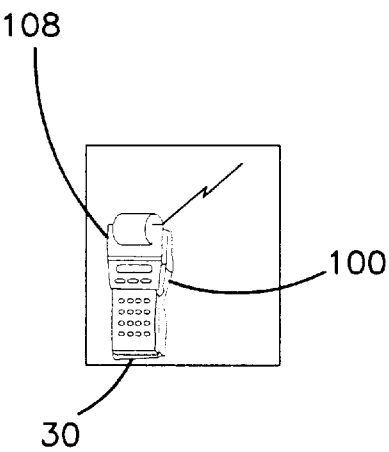

Illustrated in FIG. 11E is an environment where the POS terminal is used online. In this environment, the POS Terminal includes a core unit 30, a standard communication module 100 including modem, and integrated printer 108. Optional elements are an external high speed printer as opposed to an integrated printer, an external PIN pad, and a second IC/smart card reader. When IC cards are used as bank cards or for larger electronic purse transactions, online authorization is needed periodically; i.e., when the transaction exceeds a certain amount or number of times used daily. This is advantageous when IC cards are used in conjunction with magstripe cards for bank cards. The POS terminal does not need to be portable in many retail sites where placed at point of sale. The clerk enters sale amount on the POS terminal and then gives the customer the POS terminal for card insert and PIN entry on the key pad of the POS Terminal, or an external PIN pad can be attached when preferred. A second IC card reader can be used to store keys and encrypt data sent to the host.

6. POS Terminal Online—ECR semi-integrated

Figure 11F:
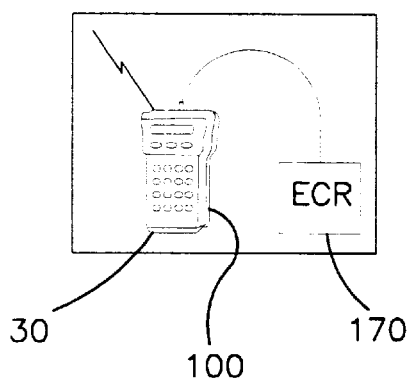

FIG. 11F illustrates the same user environment as shown in FIG. 11E except the POS terminal interfaces to an ECR 170 for transfer of sale amount and receipt printing by the ECR. All host communication is still handled by the POS terminal. In this environment, the POS terminal includes a core unit 30 and a standard communications module 100. This environment is typical with older ECRs that can't handle EFT or when the retail operator chooses to separate the EFT function from the ECR and have it handled by the POS terminal.

7. POS Terminal—Online IC Terminal/Portable

Figure 11G:
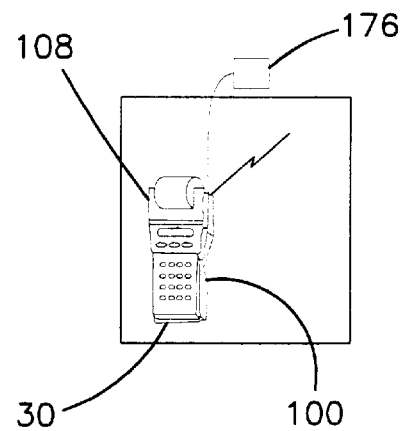

As illustrated in FIG. 11G, in this environment the POS terminal includes a core unit 30, a portable communications module 100 with wireless communication capability such as RF, IR, etc., a battery pack 176, and a charging stand (not shown). An integrated printer is optional. This environment requires portability in addition to the ability to handle large transaction amounts which require periodic online authorization. Typical environments would be restaurants, temporary retail sites, arenas, etc. For example, orders might be taken and paid for while a person is standing in line waiting for their food.

It is to be understood, that even though numerous characteristics and advantages of the invention have been set forth in the foregoing description, together with details of the structure and function of the invention, the disclosure is illustrative only, and changes may be made in detail, especially in matters of shape, size, and arrangement of the parts within the principles of the invention to the full extent indicated by the broad general meaning of the terms in which the appended claims are expressed.

What is claimed is:

1. A modular Point-Of-Sale (POS) terminal apparatus comprising:

a core unit comprising a printed wiring board including a processor and associated basic memory, a keypad for inputting data, an integral display for displaying data from the processor, and plural hardware-based interfaces that, in use, support optional modules which may be connected to said core unit, said core unit hardware-based interfaces including:

a hardware-based magnetic stripe card reader interface for, in use, supporting a magnetic stripe card reading module, a hardware-based smart card module interface for, in uses, supporting a smart card module, a hardware-based memory interface for, in use, supporting an expansion memory module, a hardware-based security module interface for, in use, supporting a security module, and a hardware-based data exchange interface for providing data exchange with a communication unit printed wiring board; and a communication unit including:

a top cover having an opening facing the core unit;

said communication unit printed wiring board including an interface connector extending through the opening to connect to the core unit hardware-based data exchange interface; and a bottom cover, wherein the top cover and the bottom cover define a housing capable of retaining plural optional modules.

2. A modular Point-Of-Sale (POS) terminal apparatus according to claim 1, wherein the communication unit has an input/output module retained between the top cover and the bottom cover, the input/output module interconnecting to the communication unit printed wiring board and providing a plurality of serial ports.

3. A modular Point-Of-Sale (POS) terminal apparatus according to claim 1, wherein the communication unit has a Smart Card Reader (SCR) module retained between the top cover and the bottom cover, the SCR module interconnecting to the communication unit printed wiring board, said SCR module being functionally connected to said core unit hardware-based smart card module interface via said interface connector.

4. A modular Point-Of-Sale (POS) terminal apparatus according to claim 1, wherein the communication unit has a modem module retained between the top cover and the bottom cover, the modem module interconnecting to the communication unit printed wiring board and providing communication interface with a phone line connector.

5. A modular Point-Of-Sale (POS) terminal apparatus according to claim 1, wherein the communication unit has an input/output module retained between the top cover and the bottom cover, the input/output module interconnecting to the communication unit printed wiring board and providing a plurality of serial ports; a modem module retained between the top cover and the bottom cover, the modem module interconnecting to the communication unit printed wiring board and providing communication interface with a phone line connector; and a Smart Card Reader (SCR) module retained between the top cover and the bottom cover, the SCR module interconnecting to the communication unit printed wiring board.

6. A Point-Of-Sale (POS) terminal apparatus according to claim 1, wherein the core unit printed wiring board further includes an interface connector coupled to said fifth hardware-based interface for, in use, connecting to the interface connector of the communication unit printed wiring board.

7. A Point-Of-Sale (POS) terminal apparatus according to claim 6, wherein the core unit has a bottom side, and the interface connector of the core unit is disposed on the bottom side of the core unit.

8. A modular terminal apparatus as in claim 1 wherein said communication unit printed wiring board includes a first communication interface coupled to said interface connector for data exchange with the core printed wiring board hardware-based data exchange interface, multiple further communication interfaces for data exchange with said externally connected peripheral devices, and further communication interfaces for data exchange with said plural optional modules.

9. A modular terminal apparatus as in claim 8 further including an input/output/power printed wiring board coupled to at least one of said core unit printed wiring board and said communication unit printed wiring board, said input/output/power printed wiring board including a power supply that supplies power to at least some of said above-mentioned components, and an electrical connection arrangement for electrically connecting to said externally connected peripheral devices.

10. A modular terminal apparatus as in claim 1 wherein said core unit hardware-based memory interface is configured to interface with static random access memory and flash memory.

11. A modular terminal apparatus as in claim 10 wherein said processor executes an operating system that is downloadable into said static random access memory and/or flash memory.

12. A modular terminal apparatus as in claim 1 wherein one of said plural optional modules is a LAN module that allows said terminal apparatus to communicate over a local area network.

13. A modular terminal apparatus as in claim 1 wherein said keypad comprises a 19-key keypad comprising:
 a twelve-key telephone style numeric pad,
 three soft keys located adjacent the display, said soft keys corresponding to software-defined commands on the display, and
 four additional function keys for initiating application-specific functions.

14. A modular terminal apparatus as in claim 1 wherein said keypad includes a security tamper resisting circuit that, in use, detects opening of the housing.

15. A modular terminal apparatus as in claim 1 wherein said display comprises a bit-mapped liquid crystal display panel.

16. A modular terminal apparatus as in claim 1 wherein said core unit printed wiring board further includes a time division multiplexed bus and a byte bus for communicating with said communication unit printed wiring board.

17. A modular terminal apparatus as in claim 16 wherein said byte bus provides a transaction based data communication allowing for terminal communication expandability.

18. A modular terminal apparatus as in claim 16 wherein said byte bus interfaces to the processor through only two signal lines.

19. A modular terminal apparatus as in claim 1 wherein said core unit printed wiring board includes an application specific integrated circuit providing said core unit hardware-based interfaces.

20. A modular terminal apparatus as in claim 19 wherein said application specific integrated circuit includes:
 reset and power status circuitry,
 display interface circuitry for interfacing with said display,
 keypad interface circuitry for interfacing with said keypad,
 a processor bus interface unit,
 said hardware-based memory interface including memory management and write-protection circuitry,
 a memory bus interface unit,
 a programmable interrupt controller,
 said hardware-based magnetic stripe card reader interface,
 said hardware-based smart card interface,
 said hardware-based security module interface,
 said hardware-based data exchange interface,
 a time division multiplexor channel, and
 a byte bus channel.

21. A modular terminal apparatus as in claim 1 wherein:
 said core unit includes a housing containing at least said processor, said display, said keypad, and said core unit hardware-based interfaces, said housing including an access door;
 said core unit housing accepts a security module for insertion into said housing access door and for coupling to said hardware-based security module interface, said security module including at least a secure memory; and
 said core unit further includes a tamper-resistant mechanism that detects when said access door is opened and triggers erasure of said secure memory in response to said detection.

22. A modular terminal apparatus as in claim 21 further including a battery backed security circuit disposed on said security module.

23. A modular terminal apparatus as in claim 21 wherein said secure memory stores cryptographic keys, and said security module performs encryption/decryption based on said keys.

24. A modular terminal apparatus as in claim 21 wherein said security module includes tamper detection circuitry.

25. A modular terminal apparatus as in claim 1 wherein said core unit includes a housing providing a tamper-resistant barrier, and said core unit further includes a tamper detection circuit that detects when said tamper-resistant barrier has been breached.

26. A modular terminal apparatus as in claim 1 wherein said core unit further includes a security module coupled to said hardware-based security module interface, said security module encrypting a personal identification number inputted via said keypad.

27. A modular terminal base unit capable of being connected to optional modules adding or enhancing functionality to said modular terminal base unit, said modular terminal base unit comprising:
 a processor,
 a memory,
 a display,
 a keypad, and
 an application-specific integrated circuit coupled to at least said processor, said application-specific integrated circuit including display interface circuitry interfacing with said display, keypad interface circuitry interfacing with said keypad, a processor bus interface interfacing with said processor, memory interface circuitry interfacing with said memory, a magnetic stripe card reader interface, a smart card reader interface, a security module interface, and at least one further communication interface for data exchange with at least one external device.

28. A modular terminal base unit as in claim 27 further including:

a housing containing at least said processor, said display, said keypad, said memory and said application specific integrated circuit, said housing including an access door;

a security module for insertion into said housing access door and coupling to said security module interface, said security module including at least a secure memory; and a tamper-resistant mechanism that detects when said access door is opened and triggers erasure of said secure memory in response to said detection.

29. A modular terminal base unit as in claim 28 further including a battery backed security circuit disposed on said security module.

30. A modular terminal base unit as in claim 28 wherein said security module memory stores cryptographic keys, and said security module performs encryption/decryption based on said cryptographic keys.

31. A modular terminal base unit as in claim 28 wherein said security module includes tamper detection circuitry.

* * * * *